United States Patent
Kuno

[19]

[11] Patent Number: 6,061,514
[45] Date of Patent: May 9, 2000

[54] DEVICE FOR GENERATING SOURCE PROGRAMS OF MULTIPLE KINDS OF ASSEMBLER LANGUAGES FROM EXTENDED TREE STRUCTURE CHART BY APPLYING THE SAME SOURCE GENERATION RULES

[75] Inventor: Michiaki Kuno, Kyoto, Japan

[73] Assignee: Sharp Kabushiki Kaisha, Osaka, Japan

[21] Appl. No.: 08/833,644

[22] Filed: Apr. 8, 1997

[30] Foreign Application Priority Data

Apr. 10, 1996 [JP] Japan .................................. 8-088346

[51] Int. Cl.[7] ........................................................ G06F 9/45
[52] U.S. Cl. ........................... 395/702; 395/703; 345/967
[58] Field of Search ..................... 395/701, 702, 395/703; 345/967

[56] References Cited

U.S. PATENT DOCUMENTS

| | | | |
|---|---|---|---|
| 4,831,525 | 5/1989 | Saito et al. | 364/300 |
| 4,860,204 | 8/1989 | Gendron et al. | 364/300 |
| 5,212,634 | 5/1993 | Washizaki et al. | 364/400 |
| 5,761,508 | 6/1998 | Okuno | 395/701 |
| 5,790,863 | 8/1998 | Simoyai | 395/707 |
| 5,854,929 | 12/1998 | Van Praet et al. | 395/705 |

OTHER PUBLICATIONS

Shu, et al. "Instruction–Set Matching and GA–based Selection for Embedded–processor Code Generation," Proc. of Ninth Int'l Conf. on VLSI Design, pp. 73–76, Jan. 1996.

"Development of Computer Programs by Problem Analysis Diagram (PAD)" Y. Futamura, et al., 5th International Conference on Software Engineering, Mar. 9–12, 1981, San Diego, CA, US pp. 325–332.

"Design Specification in Japan: Tree–Structured Charts" M. Aoyama et al., IEEE Software, vol. 6, No. 2, Mar. 1989, Los Alamitos, CA, US, pp. 31–37.

02098731 dated Apr. 1990—Japan (Abstract).

*Primary Examiner*—Tariq R. Hafiz
*Assistant Examiner*—Kakali Chaki

[57] ABSTRACT

A device for generating an assembler source program from a tree structure chart, independently of a type an assembler language, with common automatic generation rules allows a source line description in a condition determination box of the tree structure chart, prepares a table for each target assembler language, and automatically generates the assembler source program matching with the assembler language from the extended tree structure chart, without depending on the type of the assembler language, under the common automatic generation rules with reference to the table prepared for each assembler language. A LONG JUMP instruction and a SHORT JUMP instruction may be determined as different jump instructions.

48 Claims, 74 Drawing Sheets

IF [CONDITION 1] []
THEN [TRUE] [CHART B]
ELSE [FALSE] [CHART C]

if then STRUCTURE

IF [CONDITION 1] []
THEN [TRUE] [CHART B]
ELSE [FALSE]

IF [CONDITION 1] []
THEN [TRUE]
ELSE [FALSE] [CHART C]

repeat until STRUCTURE

REPEAT [ ] [CHART B]
UNTIL [TRUE] [CONDITION 1] [FALSE]

do while STRUCTURE

N+1/2 STRUCTURE

JUMP STRUCTURE

LABEL STRUCTURE

LABEL [LABEL A]

SEQUENTIAL PROCESSING

[LIST A]

if then else STRUCTURE

IF [ ] [LIST A]
THEN [CONDITION 1] [CHART B]
ELSE [CONDITION 2] [CHART C]

REPEAT [ ] [CHART B]
UNTIL [CONDITION 1] [LIST A] [CONDITION 2]

FIG. 13 do while STRUCTURE

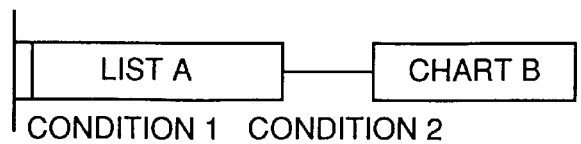

DO [CHART B]
WHILE [CONDITION 1] [LIST A] [CONDITION 2]

FIG. 14

N+1/2 LOOP STRUCTURE

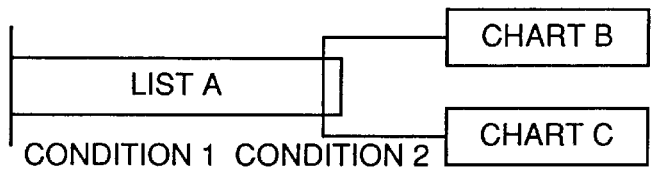

REPEAT [CHART B ] [CHART C]
UNTIL [CONDITION 1] [LIST A] [CONDITION 2]

FIG. 15

REFERENCE TABLE

```
HEADER:   "LINE HEAD CHARACTER STRING"
COMMENT:  "COMMENT CHARACTER STRING"
LABEL:    "LABEL CHARACTER STRING"
JUMP:     "CONDITION 1" , "CONDITION 2" , "CHARACTER STRING 1"
JUMP:     "CONDITION 2" , "CONDITION 1" , "CHARACTER STRING 2"
JUMP:     " " , " " , "CHARACTER STRING 3"
. . . . . . .
```
400

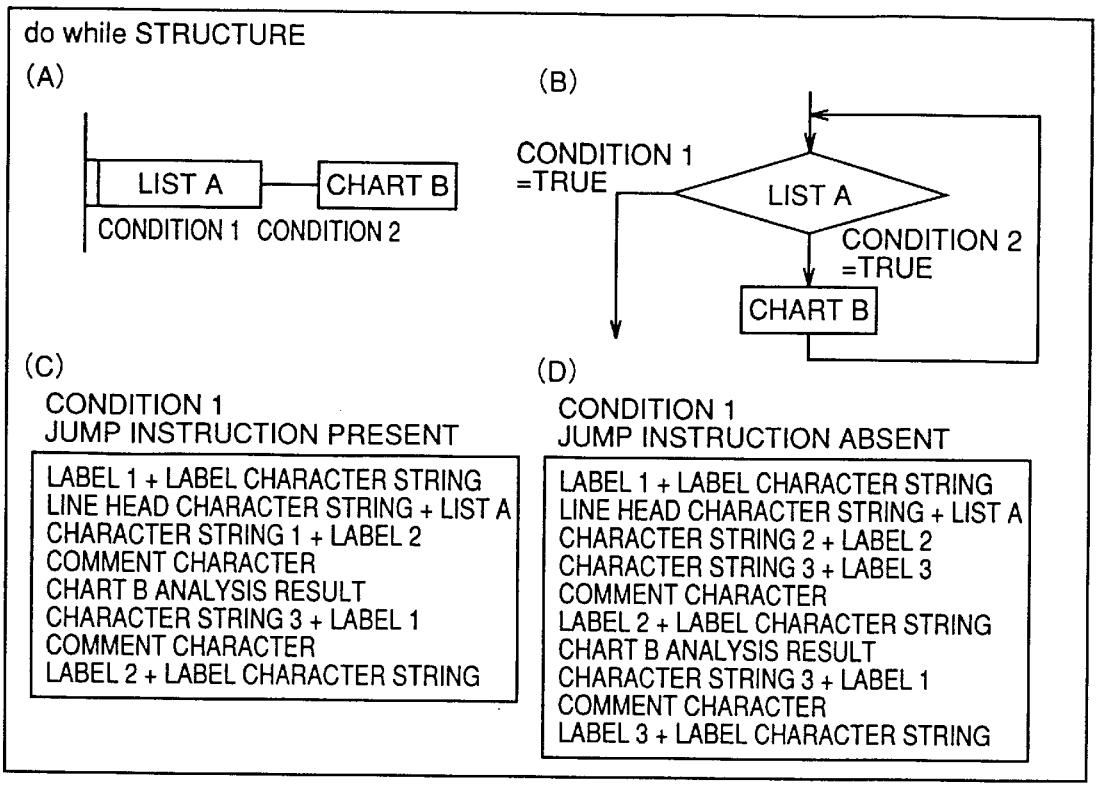
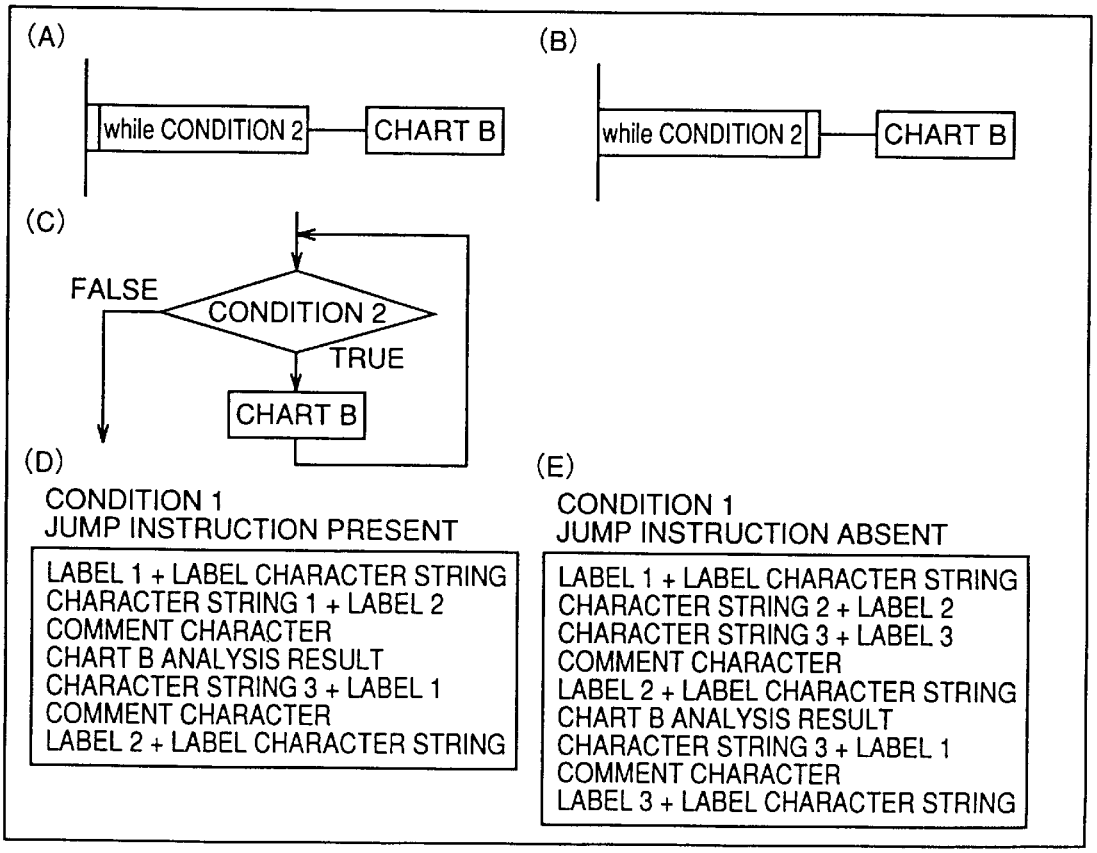

JUMP STRUCTURE (A)

(B) CHARACTER STRING 3 + LABEL A COMMENT CHARACTER

LABEL STRUCTURE (A)

(B) CHART B ANALYSIS RESULT
LABEL A + LABEL CHARACTER STRING
CHART C ANALYSIS RESULT

SEQUENTIAL PROCESSING STRUCTURE (A)

(B) LINE HEAD CHARACTER STRING + LIST A COMMENT CHARACTER

FIG.28

```
1   ;    source generator table 1
2   HEADER:     "          "
3   COMMENT:    ";      "
4   LABEL:      ":"
5   JUMP:       " "  , " " , "         JR     "
6   JUMP:       "C"  , "NC" , "        JR    C,"
7   JUMP:       "NC" , "C"  , "        JR    NC,"
8   JUMP:       "Z"  , "NZ" , "        JR    Z,"
9   JUMP:       "NZ" , "Z"  , "        JR    NZ,"
10  JUMP:       "PO" , "PE" , "        JP    PO,"
11  JUMP:       "PE" , "PO" , "        JP    PE,"
12  JUMP:       "P"  , "M"  , "        JP    P,"
13  JUMP:       "M"  , "P"  , "        JP    M,"
14  JUMP:       "B--=0" , "B--<>0" , " "
15  JUMP:       "B--<>0" , "B--=0" , "    DJNZ    "
```

FIG.41
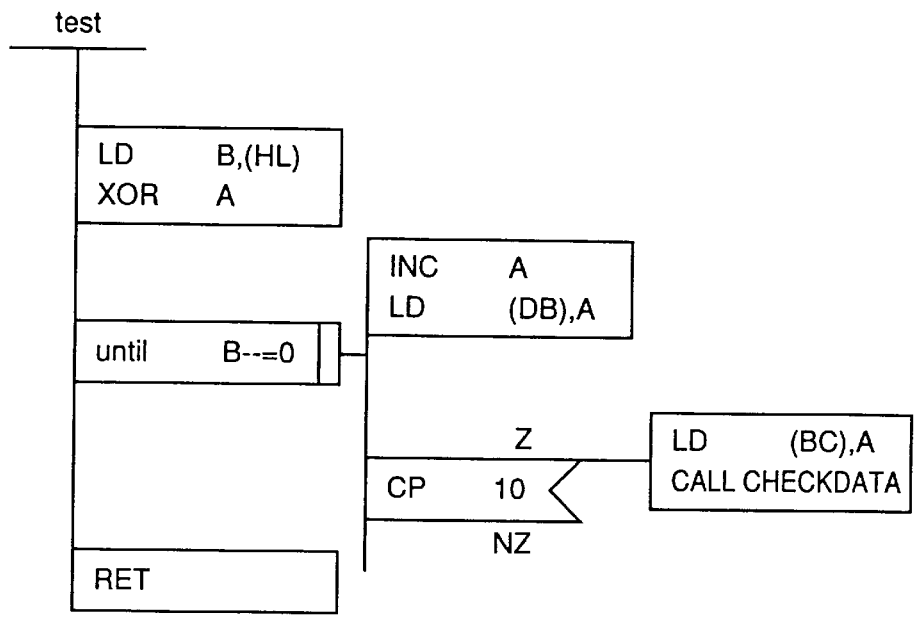
FIG.42
[LABEL[test] [LD   B,(HL) ↓ XOR   A ↓ ] REPEAT
[ [INC   A ↓ LD   (DE),A ↓ ] IF [ ] [CP   10] THE
N [Z] [ [LD   (BC),A ↓ CALL CHECKDATA ↓ ] ] ELSE [NZ]
[ ] ] UNTIL [TRUE] [B--=0] [FALSE] [RET] ]
FIG.43
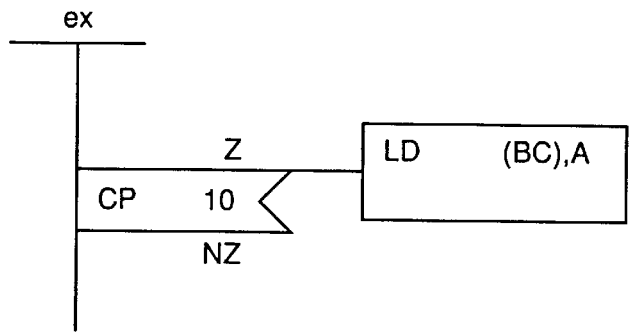
FIG.44
[
LABEL [ex]
IF [ ] [CP   10]
THEN [Z] [ [LD   (BC),A] ]
ELSE [NZ] [ ]
]

```
        INC     A
        LD      (DE),A
;
        CP      10
        JR      NZ,testprog2
;
        LD      (BC),A
        CALL    CHECKDATA
;
testprog2:
        PUSH    A
;
testprog3:
        XOR     A
        ADD     A,B
        LD      B,A
;
        POP     A
        INC     A
        PUSH    A
        JR      Z,testprog4
;
        CALL    WRITEDATA
        JR      testprog3
;
testprog4:
        POP     A
;
```

(B)

```
testprog1:
        INC     A
        LD      (DE),A
;
        CP      10
        JR      NZ,testprog2
;
        LD      (BC),A
        CALL    CHECKDATA
;
testprog2:
        PUSH    A
;
testprog3:
        XOR     A
        ADD     A,B
        LD      B,A
;
        POP     A
        INC     A
        PUSH    A
        JR      Z,testprog4
;
        CALL    WRITEDATA
        JR      testprog3
;
testprog4:
        POP     A
;
        DJNZ    testprog1
;
```

FIG.50

```
;testprog
testprog:
        LD    B,(HL)
        XOR   A
;
testprog1:
        INC   A
        LD    (DE),A
;
        CP    10
        JR    NZ,testprog2
;
        LD    (BC),A
        CALL  CHECKDATA
;
testprog2:
        PUSH  A
;
testprog3:
        XOR   A
        ADD   A,B
        LD    B,A
;
        POP   A
        INC   A
        PUSH  A
        JR    Z,testprog4
;
        CALL  WRITEDATA
        JR    testprog3
;
testprog4:
        POP   A
;
        DJNZ  testprog1
;
        LD    (DE),A
;
        RET
;
```

FIG.51
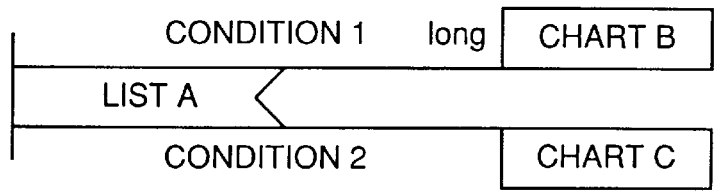
if then else STRUCTURE
[LONG] [
IF [SHORT] [ ] [LIST A]
THEN [LONG] [CONDITION 1] [CHART B]
ELSE [SHORT] [CONDITION 2] [CHART C]
]
FIG.52
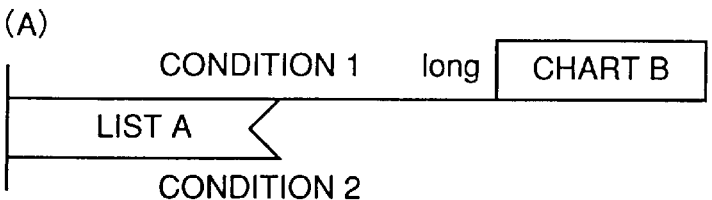
if then STRUCTURE
(A)
[LONG] [
IF [SHORT] [ ] [LIST A]
THEN [LONG] [CONDITION 1] [CHART B]
ELSE [SHORT] [CONDITION 2] [ ]
]
(B)
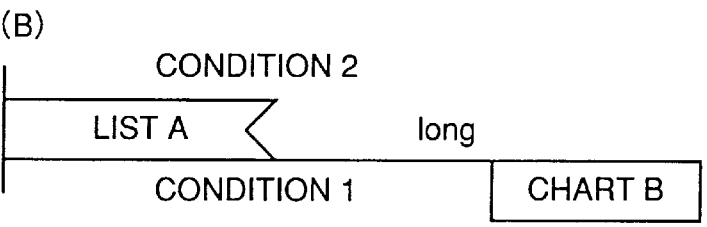
[LONG] [
IF [SHORT] [ ] [LIST A]
THEN [SHORT] [CONDITION 2] [ ]
ELSE [LONG] [CONDITION 1] [CHART B]
]

FIG.61

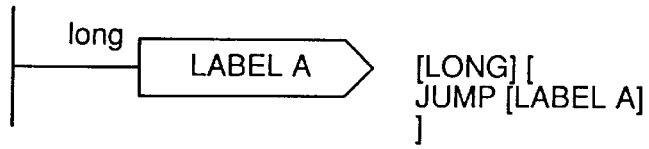

JUMP STRUCTURE

FIG.62

LABEL STRUCTURE

FIG.63

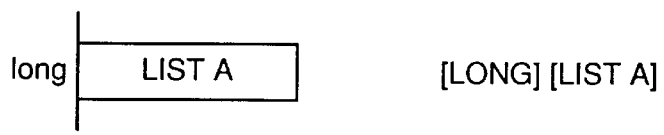

SEQUENTIAL PROCESSING

```
                                                               430
HEADER:    "LINE HEAD CHARACTER STRING"
COMMENT:   "COMMENT CHARACTER"
LABEL:     "LABEL CHARACTER STRING"
JUMP:      "CONDITION 1" , "CONDITION 2" , "CHARACTER STRING 1" , "CHARACTER STRING 4"
JUMP:      "CONDITION 2" , "CONDITION 1" , "CHARACTER STRING 2" , "CHARACTER STRING 5"
JUMP:      " " , " " , "CHARACTER STRING 3" , "CHARACTER STRING 6"
• • • • • •
```

FIG.66 if then STRUCTURE (A) 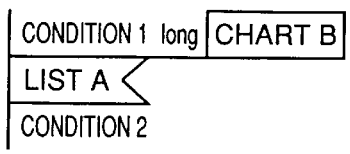

(B) 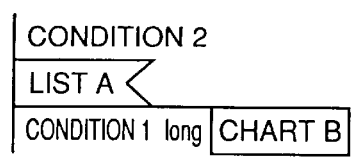

(C) 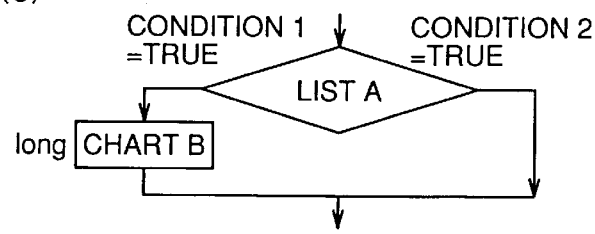

(D)
CONDITION 2
LONG JUMP INSTRUCTION PRESENT

| LINE HEAD CHARACTER STRING + LIST A |
| CHARACTER STRING 5 + LABEL 1 |
| COMMENT CHARACTER |
| CHART B ANALYSIS RESULT |
| LABEL 1 + LABEL CHARACTER STRING |

(E)
CONDITION 1
SHORT JUMP INSTRUCTION PRESENT

| LINE HEAD CHARACTER STRING + LIST A |
| CHARACTER STRING 1 + LABEL 1 |
| CHARACTER STRING 6 + LABEL 2 |
| COMMENT CHARACTER |
| LABEL 1 + LABEL CHARACTER STRING |
| CHART B ANALYSIS RESULT |
| LABEL 2 + LABEL CHARACTER STRING |

(F)
CONDITION 1
LONG JUMP INSTRUCTION PRESENT

| LINE HEAD CHARACTER STRING + LIST A |
| CHARACTER STRING 4 + LABEL 1 |
| CHARACTER STRING 6 + LABEL 2 |
| COMMENT CHARACTER |
| LABEL 1 + LABEL CHARACTER STRING |
| CHART B ANALYSIS RESULT |
| LABEL 2 + LABEL CHARACTER STRING |

(G)
CONDITION 1
JUMP INSTRUCTION ABSENT
CONDITION 2
SHORT JUMP INSTRUCTION PRESENT

| LINE HEAD CHARACTER STRING + LIST A |
| CHARACTER STRING 2 + LABEL 1 |
| CHARACTER STRING 3 + LABEL 2 |
| COMMENT CHARACTER |
| LABEL 1 + LABEL CHARACTER STRING |
| CHARACTER STRING 6 + LABEL 3 |
| COMMENT CHARACTER |
| LABEL 2 + LABEL CHARACTER STRING |
| CHART B ANALYSIS RESULT |
| LABEL 3 + LABEL CHARACTER STRING |

JUMP STRUCTURE

LABEL STRUCTURE

SEQUENTIAL PROCESSING STRUCTURE

```
;    source generator table 2
HEADER:    "         "
COMMENT:   ";         "
LABEL:     ":"
JUMP:      " " , " " , "      JR      " , "      JP      "
JUMP:      "C" , "NC" , "     JR   C," , "    JP   C,"
JUMP:      "NC" , "C" , "     JR   NC," , "   JP   NC,"
JUMP:      "Z" , "NZ" , "     JR   Z," , "    JP   Z,"
JUMP:      "NZ" , "Z" , "     JR   NZ," , "   JP   NZ,"
JUMP:      "PO" , "PE" , "    JP   PO," , "   JP   PO,"
JUMP:      "PE" , "PO" , "    JP   PE," , "   JP   PE,"
JUMP:      "P" , "M" , "      JP   P," , "    JP   P,"
JUMP:      "M" , "P" , "      JP   M," , "    JP   M,"
JUMP:      "B--=0" , "B--<>0" , "      " , "     "
JUMP:      "B--<>0" , "B--=0" , "      DJNZ    " , "     "
```

```
        INC    A
        LD     (DE),A
;
        CP     10
        JR     NZ,longprog4
;
        LD     (BC),A
        CALL   CHECKDATA
;
longprog4:
        PUSH   A
;
longprog5:
        XOR    A
        ADD    A,B
        LD     B,A
;
        POP    A
        INC    A
        PUSH   A
        JR     Z,longprog6
;
        CALL   WRITEDATA
;
        JP     longprog5
;
longprog6:
        POP    A
;
```

(B)

```
longprog1:
        INC    A
        LD     (DE),A
;
        CP     10
        JR     NZ,longprog4
;
        LD     (BC),A
        CALL   CHECKDATA
;
longprog4:
        PUSH   A
;
longprog5:
        XOR    A
        ADD    A,B
        LD     B,A
;
        POP    A
        INC    A
        PUSH   A
        JR     Z,longprog6
;
        CALL   WRITEDATA
;
        Jp     longprog5
;
longprog6:
        POP    A
;
        DJNZ   longprog2
        JR     longprog3
;
longprog2:
        JP     longprog1
;
longprog3:
```

FIG.110

```
;longprog
longprog:
        LD      B,(HL)
        XOR     A
;
longprog1:
        INC     A
        LD      (DE),A
;
        CP      10
        JR      NZ,longprog4
;
        LD      (BC),A
        CALL    CHECKDATA
;
longprog4:
        PUSH    A
;
longprog5:
        XOR     A
        ADD     A,B
        LD      B,A
;
        POP     A
        INC     A
        PUSH    A
        JR      Z,longtprog6
;
        CALL    WRITEDATA
;
        JP      longprog5
;
testprog6:
        POP     A
;
        DJNZ    longprog2
        JR      longprog3
;
longprog2:
        JP      longprog1
;
longprog3:
        LD      (DE),A
;
        RET
;
```

```
;multif
multif:    EQU    S
       LIST1
;
       LIST2
       JR     NC,multif1
;
       LIST3
       JR     NZ,multif2
;
       LIST4
;
multif2:   EQU    S
;
multif1:   EQU    S
;
       LIST5
;
```

```
;multif
multif:    EQU    S
       LIST1
;
       LIST2
       JR     NC,multif1
;
       LIST3
       JR     NZ,multif1
;
       LIST4
;
multif1:   EQU    S
       LIST5
;
```

DEVICE FOR GENERATING SOURCE PROGRAMS OF MULTIPLE KINDS OF ASSEMBLER LANGUAGES FROM EXTENDED TREE STRUCTURE CHART BY APPLYING THE SAME SOURCE GENERATION RULES

BACKGROUND OF THE INVENTION

1. Field of the Invention

The present invention relates to a CASE (Computer Aided Software Engineering) tool for software development of computers and microcomputers, and in particular to a device for automatically generating source programs of an assembler language or program languages having a jump instruction from a structurized macro language or a tree structure chart.

2. Description of the Background Art

FIG. 1 shows an example of a description of a PAD (Problem Analysis Diagram) chart which is a kind of a conventional tree structure chart. In this specification, a "chart" generally means a tree structure chart, and a "list" generally means source lines of a program. Also, "condition 1", "condition 2" or the like generally mean a state of a flag used for determining a condition in the assembler language.

A PAD chart in FIG. 1 is formed of eleven boxes 300, 302, 304, 306, 308, 310, 312, 314, 316, 318 and 320. The PAD chart is executed downward, and the algorithm of specific processing is described in these series of boxes.

In the PAD chart, dedicated boxes are defined correspondingly to program structures such as condition determination and repetition loop. In the example shown in FIG. 1, boxes 306 and 312 are such dedicated boxes. Source lines in these structures are hierarchically described in the boxes at the right of the dedicated boxes. Thus, contents of box 306 are described in boxes 310, 312, 314, 316 and 318, and contents of box 312 are described in box 320.

The PAD chart is executed downward. When a loop or a jump structure appears, the series of boxes described at the right of the structure in question is executed downward. When execution of the series of boxes is completed, the processing returns to the original structure, and the structure is further executed downward. When the processing reaches the lower end of the chart, the execution is finished.

FIG. 2 shows an example of a description of an "if then else" structure in the conventional PAD chart. The PAD chart will now be described below. In FIG. 2 and the following figures which will be described later, an internal storage format of a graphical file of each structure is shown at a lower right portion of the chart.

Referring to FIG. 2, condition 1 is described in a box of an "if then else" structure. If condition 1 is true, a chart B is executed. If condition 1 is false, a chart C is executed. Thereafter, the program is executed further downward. In FIG. 2, "(true)" and "(false)" are mentioned above and below the box of condition 1. This is implicit declaration that the upper is executed if condition 1=true, and that the lower is executed if condition 1=false. Therefore, these expressions are not actually present on the chart.

In a structure shown at (A) in FIG. 3, chart B is executed if condition 1=true, and nothing is executed if condition 1=false. In the case at (B) in FIG. 3, nothing is executed if condition 1=true, and chart C is executed if condition 1=false.

In both the cases at (A) and (B) in FIG. 3, when execution of the "if then" structure is completed, the program is executed further downward.

FIG. 4 shows an example of a description of a "repeat until" structure. In this structure, chart B is first executed, and then true or false of condition 1 is determined. When condition 1=false, chart B is executed again. If condition 1=true, the "repeat until" structure is completed, and the program is executed further downward.

FIG. 5 shows examples of a description of a "do while" structure. FIG. 5 shows two examples (A) and (B) of a description. These two examples differs from each other only in a representation manner of the box, and more specifically in that vertical lines are added to the left and right sides of the "do while" structure box, respectively, and do not differ from each other in the actual execution order of the program. In the "do while" structure, true or false of condition 2 is first determined. If condition 2=true, chart B is executed, and the control returns to the top for determining condition 2. If condition 2=false, the "do while" structure is finished without executing chart B, and the program is executed further downward. FIG. 5 differs from FIG. 4 in that chart B is first executed at least once in FIG. 4, but chart B may not be executed at all in FIG. 5.

FIG. 6 is an example of a description of an "N+½" structure. This structure includes an escape from a loop. In this structure, chart B is first executed, and then true or false of condition 1 is determined. If condition 1=true, the "N+½" structure is finished. If condition 1=false, chart C is executed, and the control returns to execution of chart B. When "N+½" structure is finished, the program will be executed further downward.

FIG. 7 shows an example of a description of a jump structure. This structure unconditionally jumps to a label A in the program.

FIG. 8 shows a label structure. This structure defines a label name indicating a position in the program.

FIG. 9 is an example of a sequential processing structure. This structure is used for describing processing not accompanied with condition determination and jump.

In the general tree structure charts described above, the jump structure and the loop structure are represented in graphical forms, and only the determination conditions are described in the boxes for graphical forms of the jump and loop.

In the assembler language, condition determination part and jump instruction utilizing results of the determination are often present apart from each other in the source, or are often present over a plurality of lines. Therefore, if it is allowed to describe only determination conditions in a box, as is done in the conventional tree structure chart, unnaturalness becomes remarkable if the tree structure chart is written with the assembler language.

Meanwhile, the assembler language itself has the following problems peculiar to it. In languages such as FORTRAN, C, BASIC, PASCAL and COBOL, grammar/notation are standardized and structurized. Therefore, source lists of these languages can be generated from tree structure charts relatively easily by using dedicated algorithms corresponding to the languages, respectively. However, in the assembler languages used for microcomputer development, there are various kinds of representation manners and commands depending on types of CPUs, and there is no standardized language system. Since hardware depends on the CPUs, there are many instructions, flags and registers which cannot be standardized. Therefore, if the program executed by a microcomputer is to be represented by a tree structure chart, different expressions depending on CPUs must be used. Therefore, in order to automatically generate a source list of the assembler language from such a tree structure chart, it is necessary to prepare a dedicated automatic source generation processing system for each CPU, resulting in an inefficient work.

Some of the assembler language systems used for microcomputer development include both of complementary condition determination instructions, and the other assembler language systems include only one of them. These depend on types of CPUs in various manners. Therefore, it is difficult to generate automatically the source list from the tree structure chart regardless of the types of CPUs, and each CPU requires a dedicated processing system. This also requires an inefficient work for automatic generation of the source program in the assembler language.

For automatic generation of the assembler source from a tree structure chart described in the assembler language, it is necessary to design different assembler automatic source generation systems depending on CPUs, respectively, as described above. For different CPUs, different assembler automatic source generation systems must be designed even for the same processing, respectively, which also results in an insufficient work.

For some CPUs, there are prepared two kinds of jump instructions, which allow jump through whole the address space (which will be referred to as a "LONG JUMP" instruction) and allow jump only by about 128 bytes forward and rearward from a program counter (which will be referred to as a "SHORT JUMP" instruction), respectively. In general, the SHORT JUMP instruction is smaller in byte number than the LONG JUMP instruction, and allows faster execution. Also, the SHORT JUMP instruction advantageously has a smaller program size. Therefore, in the assembler language differentiating these instructions can have a smaller program size and can execute the program in an improved manner.

However, in the conventional tree structure chart, there is no way of differentiating the jump instructions corresponding to the assembler language. Therefore, it is extremely difficult to perform automatic generation of the source list of the assembler language differentiating such instructions from the tree structure chart. As an example of the measure for the above purpose, a processing system may be prepared where the LONG JUMP instruction and SHORT JUMP instruction are automatically determined based on the byte number of the instruction in the source program. However, it is inefficient to prepare the processing system for the foregoing differentiation corresponding to the respective CPUs, and such a system cannot be actually employed.

When the source program is automatically generated, labels which overlap with each other are often generated in the source list on the algorithm of automatic generation. Generation of the labels in the overlapped fashion causes not only an undesirable increase in program size but also difficulty in understanding of program.

SUMMARY OF THE INVENTION

Accordingly, it is an object of the invention to provide a device, which can generate assembler language source programs corresponding to assembler languages for various CPUs from the same tree structure chart regardless of types of the CPUs.

Another object of the invention is to provide a device which can generate source programs corresponding to various assembler languages from the same tree structure chart regardless of whether an instruction system in the assembler language is provided with both of complementary condition determination instructions or only one of them.

Still another object of the invention is to provide a device which can effectively utilize an assembler language, if the LONG JUMP instruction and the SHORT JUMP instruction are prepared therein, and can generate source programs from the same tree structure chart correspondingly to various assembler languages.

An additional object of the invention is to provide a source program generation device, which can prevent overlapping of labels in a generated source program, and thereby allows easy understanding of a source list.

The present invention provides a device for generating a source program of any assembler language based on an extended tree structure chart. The extended tree structure chart is extended to allow the source line description in the box related to the branch and allow description of the corresponding determination condition in each box related to the branch. This device includes a memory for storing a table describing a description form of an instruction in a target assembler language in accordance with a format common to different assembler languages, and a module for generating the source program in the assembler language. This module generates the source program in the assembler language based on the extended tree structure chart in accordance with a predetermined conversion procedure independent of a type of the assembler language. The module for generation is operable, for generation of the source program from a certain box, to generate an instruction suitable for the target assembler language with reference to a description form of the instruction in the table based on the source line description and the description of the determination condition in the corresponding box.

According to this device, the description form of the instruction in the target assembler language is tabulated with the format common to different assembler languages. In accordance with the predetermined conversion procedure independent of the types of the assembler languages, the source program in the assembler language is generated from the extended tree structure chart. Since the table is referred to for this generation, the source program is generated in the format suitable for different assembler languages. By maintaining the table, it is possible to generate the source programs suitable various types of assembler languages corresponding to different CPUs from the same extended tree structure chart with the common source generation rules.

In an aspect of the invention, the table also describes a relationship between complementary condition determination instructions in the target assembler language. The module for generation includes a module operable, for generation of the source program from the box describing branch, to generate the branch instruction matching with the target assembler language by determining a utilizable branch instruction with reference to the description form of the branch instruction in the table and a relationship between the complementary condition determination instructions based on the source line description and the description of the determination condition in the corresponding box.

In another assembler language system corresponding to a different CPU, even if one of the complementary condition determination instructions is not present, a substitute condition determination instruction can be found by referring to the table. Therefore, regardless of whether the assembler language system has only one of the complementary condition determination instructions or both of them, the assembler language source program can be generated from the same extended tree structure chart with the common source generation rules.

According to another aspect of the invention, an assembler language source program generating device generates a source program of an any assembler language based on a tree chart extended to allow description in a common format for different assembler languages by allowing description of differentiation between a LONG JUMP instruction and a SHORT JUMP instruction in a box related to a branch instruction and allowing source line description in the box related to branch. This device includes a memory for storing a table describing a description form of the instruction in the target assembler language in accordance with a format common to different assembler languages. The table stores the LONG JUMP instruction and the SHORT JUMP instruction as separate instructions. The device further includes a module for generating the source program in the assembler language based on the tree structure chart, without depending on a type of the assembler language, in accordance with a predetermined conversion procedure differentiating the LONG JUMP instruction and the SHORT JUMP instruction from each other. The module for generation is operable, for generation of the source program from a certain box, to generate an instruction matching with the target assembler language with reference to a description form of the instruction in the table based on the source line description in the corresponding box and the description relating to differentiation between the LONG JUMP instruction and the SHORT JUMP instruction.

Correspondingly to different CPUs, there are an assembler language systems differentiating the LONG JUMP instruction and the SHORT JUMP instruction from each other and an assembler language system not differentiating the same from each other. The differentiation is reflected in the table. According to the invention, differentiation between the LONG JUMP instruction and the SHORT JUMP instruction can be described in the extended tree structure chart. Therefore, if the LONG JUMP instruction and the SHORT JUMP instruction are to be differentiated from each other, an appropriate source program can be generated by employing the same in a differentiated manner by referring to the table. If no differentiation between the instructions is present in the assembler language system, an appropriate substitute instruction can be found by referring to the table. Regardless of whether the assembler language differentiates the LONG JUMP instruction and the SHORT JUMP instruction from each other or not, the source program can be generated from the same tree structure chart with common source generation rules.

According to still another aspect of the invention, an assembler source program generating device generates a source program of an arbitrary assembler language based on an extended tree structure chart extended to allow source line description in a box related to condition determination and allow each box to describe a determination condition for the box related to the condition determination. This device includes a memory for storing a table describing a description form of an instruction in a target assembler language in accordance with a format common to different assembler languages, and a module for generating the source program in the assembler language based on the tree structure chart in accordance with a predetermined conversion procedure independent of a type of the assembler language. The module for generation may generate a label line in the source program for generating the source program from a certain box. This device further includes a successive label detecting module for detecting a plurality of labels generated substantially successively in the source program by the module for generation, and a label deleting module for deleting the plurality of successively generated labels detected by the successive label detecting module except for one, e.g., a last one.

In the generation of the assembler language source program from the extended tree structure chart, a plurality of labels may be substantially successively generated due to automatic generation. However, these labels are detected, and the successive labels except for a specific one, e.g., last one are deleted. Thus, the ultimately generated source list can be simple, and is easy to understand.

According to yet another aspect of the invention, a machine-executable program stored in a machine-readable storage medium generates a source program in any assembler language based on an extended tree structure chart. The extended tree structure chart is extended to allow the source line description in the box related to branch and the description of the corresponding determination condition in each box related to the branch. The program includes a table describing a description form of an instruction in a target assembler language in accordance with a format common to different assembler languages, and a module for generating the source program in the assembler language. The module for generation generates the source program in the assembler language in accordance with a predetermined conversion procedure independent of a type of the assembler language based on the extended tree structure chart. The module for generation is operable, for generation of the source program from a certain box, to generate an instruction suitable for the target assembler language with reference to a description form of the instruction in the table stored in the memory module based on the source line description and the description of the determination condition in the corresponding box.

According to a further aspect of the invention, a machine-executable program stored in a readable storage medium generates a source program in any assembler language based on an extended tree structure chart extended to allow description in a common format for different assembler languages by allowing description of differentiation between a LONG JUMP instruction and a SHORT JUMP instruction in a box related to a branch instruction and allowing a source line description in the box related to branch. The program includes a table describing a description form of an instruction in a target assembler language in accordance with the format common to the different assembler languages. This table stores the LONG JUMP instruction and the SHORT JUMP instruction as separate instructions. The program further includes a module for generating the source program in the assembler language based on the tree structure chart, without depending on a type of the assembler language, in accordance with a predetermined conversion procedure differentiating the LONG JUMP instruction and the SHORT JUMP instruction from each other. The module for generation is operable, for generation of the source program from a certain box, to generate an instruction suitable for the target assembler language with reference to a description form of the instruction in the table based on the source line description in the corresponding box and the description relating to differentiation between the LONG JUMP instruction and the SHORT JUMP instruction.

According to an additional aspect of the invention, a machine-executable program stored in a machine-readable storage medium generates a source program in any assembler language based on an extended tree structure chart extended to allow source line description in a box related to condition determination and description, in each box, of a determination condition for the box related to the condition determination. The program includes a table describing a description form of an instruction in a target assembler language in accordance with a format common to the different assembler languages, and a module for generating the source program in the assembler language based on the tree structure chart in accordance with a predetermined conversion procedure independent of a type of the assembler language. The module for generation may generate a label line in the source program for generating the source program from a certain box. This program further includes a successive label detecting module for detecting a plurality of labels generated substantially successively in the source program by the module for generation, and a label deleting module for deleting the plurality of successively generated labels detected by the successive label detecting module except for one, e.g., a last one.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 shows an extended tree structure chart of a "do while" structure.

FIG. 14 shows an extended tree structure chart of an "N+½" structure.

FIG. 15 shows a general format of a table used in a first embodiment.

FIG. 20 shows automatic generation rules of an assembler source program of a "do while" structure.

FIG. 21 shows automatic generation rules of an assembler source program of a "do while" structure.

FIG. 28 shows a specific table used in the first embodiment.

FIG. 41 is a tree structure chart diagram showing a portion of the tree chart structure in FIG. 40.

FIG. 42 shows a storage format of a graphical file of the tree structure chart in FIG. 41.

FIG. 43 shows still another part of the tree structure chart.

FIG. 44 schematically shows a storage format of a graphical file of the tree structure chart in FIG. 43.

FIGS. 45–49 show steps of automatic generation of the assembler source program from the tree structure chart.

FIG. 50 shows an ultimately generated assembler source program.

FIG. 51 shows an extended tree structure chart of an "if then else" structure in the second embodiment.

FIG. 52 shows an extended tree structure chart of an "if then" structure in the second embodiment.

FIG. 61 shows an extended tree structure chart of a jump structure in the second embodiment.

FIG. 62 shows an extended tree structure chart of a label structure in the second embodiment.

FIG. 63 shows an extended tree structure chart of a sequential processing structure in the second embodiment.

FIG. 64 shows a general format of a table used in the second embodiment.

FIG. 66 shows rules of automatic generation of an assembler source program from an "if then" structure in the second embodiment.

FIGS. 105–109 show steps of automatically generating an assembler source program from a tree structure with the device of the second embodiment.

FIG. 110 shows an assembler source program ultimately obtained with the device of the second embodiment.

DESCRIPTION OF THE PREFERRED EMBODIMENTS

First Embodiment

Prior to description of a device according to the invention, a manner of expressing a tree structure chart used in the device will now be described below with reference to FIGS. 10–14. This expression manner has such distinctive features that description of a program list in a condition determination box is allowed, and determination conditions for branching are described at an appropriate location outside the box. Each structure will be described below with reference to FIGS. 10–14. The branch conditions may be determination conditions such as C (carry, overflow), NC (non-carry), Z (zero) and NZ (non-zero).

Figure 10:
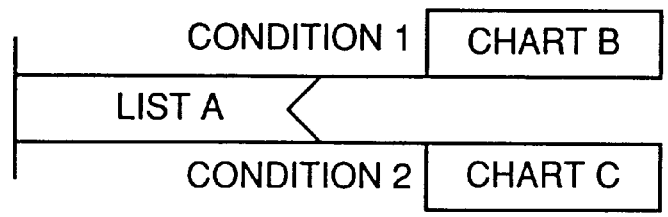
FIG. 10 shows a chart of an "if then else" structure in an extended format.

FIG. 10 shows an example of a description of an "if then else" structure. As shown in FIG. 10, a program list A can be described in a condition determination box, and a condition determination program over multiple lines can be described. As shown in FIG. 10, branch conditions "condition 1" and "condition 2" are allowed to be described above and below the condition determination box, respectively. In these figures, an internal storage format of each chart is shown at a lower right position of the corresponding chart.

In the example shown in FIG. 10, when the result of execution of list A shows that condition 1 is true, the chart B is executed. If condition 2 is true, the chart C is executed. When execution of this "if then else" structure is finished, the program is executed further downward. It can be considered as follows. Since description of the list A in the condition determination box is allowed as described above, this expression manner allows the box itself to have a determining function in contrast to the prior art, in which the determination box can perform only determination of true and false.

It may be considered that condition 1 and condition 2 shown in FIG. 10 are complementary to each other. The conditions having such a relationship will be referred to as mutually opposite conditions. If two conditions are mutually opposite conditions, and particularly, if only one of them (e.g., condition 1) is described, condition description of the other (e.g., condition 2) may be omitted, because the latter can be processed as the case of condition 1=false.

Figure 11:
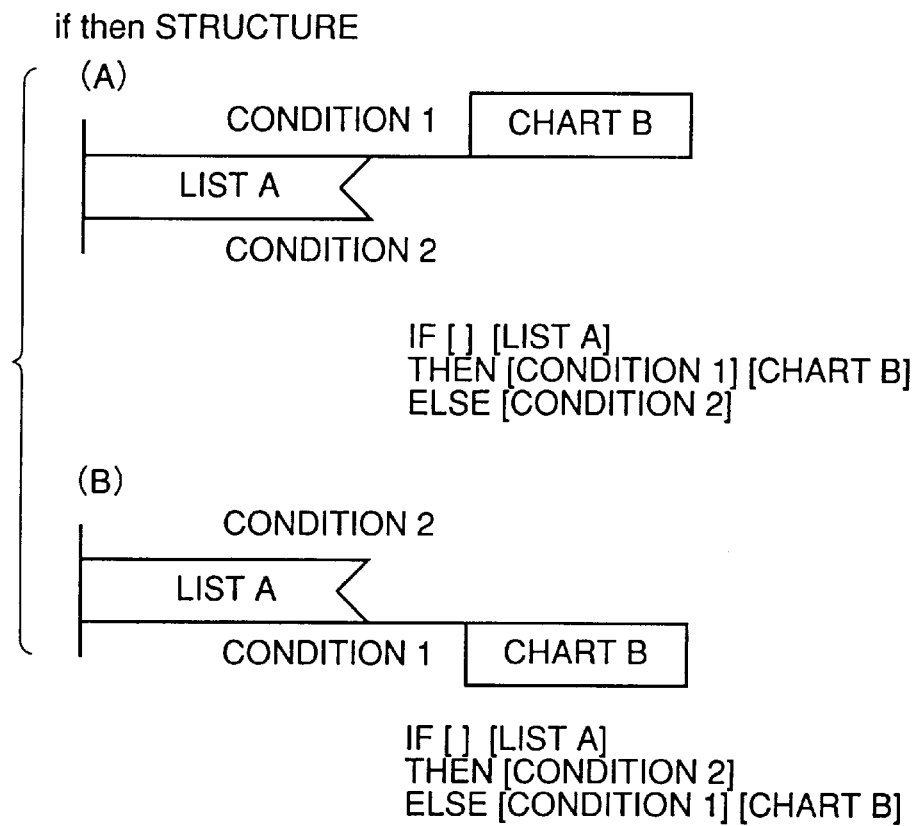
FIG. 11 shows an extended tree structure chart of the "if then" structure.

FIG. 11 shows an example of a description of an "if then" structure. FIG. 11 shows, at (A) and (B), different expression forms of the "if then" structure, although both have the same algorithm. Referring to (A) or (B) in FIG. 11, list A in the condition determination box is first executed, and chart B is executed if condition 1=true. If condition 2=true (equal to condition 1=false), the "if then" structure is finished without executing anything, and the program is executed further downward.

Figure 12:
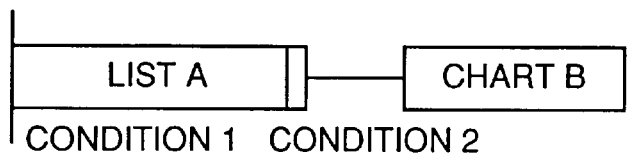
FIG. 12 shows an extended tree structure chart of a "repeat until" structure.

FIG. 12 shows an example of a description of a "repeat until" structure. In this structure, it is allowed to described the list A in the condition determination box, and the loop end condition and loop continuation condition are described at lower left and lower right positions of the box, respectively. According to the structure shown in FIG. 12, list A is executed after executing chart B. If condition 1=true, the "repeat until" structure is finished. If condition 2=true, program starting from chart B is executed. When execution of this structure is finished, the program is executed further downward.

FIG. 13 shows an example of a description of a "do while" structure. In the "do while" structure shown in FIG. 13, it is allowed to describe list A in the condition determination box, and the loop end condition and the loop continuation condition are described at lower left and lower right positions of the box, respectively. In the structure shown in FIG. 13, list A is first executed, and, if condition 1=true, the "do while" structure is finished. If condition 2=true, chart B is executed, and program starting from list A is executed again. When execution of this structure is finished, the program is executed further downward.

FIG. 14 shows an example of an "N+½" structure. In this structure, it is allowed to describe list A in the condition determination box, and the loop end condition and loop continuation condition are described at the lower left and lower right positions of the box, respectively. In the example of the description shown in FIG. 14, list A is executed after execution of chart B. If condition 1=true, the "N+½" structure is finished. If condition 2=true, chart C is executed, and then chart B is executed again. When this structure is finished, the program is executed further downward.

According to this new expression manner, as described above, it is allowed to describe the determination conditions outside the chart box. It is possible to describe the source list in the condition determining box, which allows easy description of the tree structure chart with the assembler language. Further, source program generation for various assembler languages is allowed with the same program generation system, as will be described later.

FIG. 15 shows a general form of a table to be referred to in automatic generation of an assembler source according to the invention. When actually used, this is handled as a table file or a data table for reference which is stationarily assembled in the program. In the assembler language source program automatic generation device according to the invention, it is possible to deal with various assembler languages corresponding to CPUs by maintenance of this table 400.

Description will now be given on description rules in table 400 shown in FIG. 15.

At 1st line in table 400 shown in FIG. 15, a description "HEADER:" is followed by a definition of a line head character string to be inserted before an instruction at an assembler instruction line. This character string is generally formed of a space or a tag character.

At 2nd line, the description of "COMMENT:" is followed by a definition of comment characters to be used at the head of the comment line. This may be ";".

At 3rd line, the description of "LABEL:" is followed by a definition of a character string to be used after a label symbol in the label definition line. This character string is generally ":".

At 4th and 5th lines, the description of "JUMP:" is followed by a definition relating to a condition determination instruction and opposite condition determination jump instruction which are referred to for condition determination jump. In this case, the opposite condition determination jump instruction is an instruction for determining the opposite condition of the condition determined by the condition determination jump instruction. Description rules of these lines are as follows. The description of "JUMP:" is followed by three character strings, i.e., condition expression on the tree structure chart, opposite condition expression on the tree structure chart and assembler jump instruction in this order.

In FIG. 15, the 4th and 5th lines provide the relationship of opposite conditions. At 4th line, a series of definitions related to condition 1 is made, and a series of definitions related to condition 2 is made at 5th line.

By combination of the 4th and 5th lines, the jump instruction corresponding to condition 1=true and the assembler condition instruction corresponding to condition 1=false can be obtained easily as follows:

It is apparent from the description at 4th line that the assembler jump instruction corresponding to condition 1=true is a character string 1.

The assembler jump instruction corresponding to condition 1=false can be obtained as follows: First, from the description at 4th line, it is obtained that the opposite condition of condition 1 is condition 2. A line describing condition 2 is searched for in the table. In this case, the description relating to condition 2 is found at 5th line in table 400. It is easily understood that the assembler jump instruction corresponding to condition 2=true is a character string 2. Since condition 2=true is equal to condition 1=false, character string 2 is obtained as the assembler jump instruction in the case of condition 1=false.

In the line starting from "JUMP:", if character string 1 or character string 2 is a null character, this represents that a corresponding instruction is not present. Thus, it is possible to easily define or refer to whether the corresponding instruction is present or not by finding whether character string 1 or character string 2 is a null character or not.

At 6th line in table 400 shown in FIG. 15, there is represented a method of defining the absolute jump instruction. The absolute jump instruction is an instruction having no condition. As shown at 6th line, therefore, both the condition expression and opposite condition expression include null characters. Thereby, it is indicated that an absolute jump instruction not having a condition is a character string 3.

Tree structure charts shown in FIGS. 10 to 14 have distinctive features that a list can be described in a condition determination box and a determination condition of a condition determination box can be described near the box. In this specification, such a tree structure chart is called an extended tree structure chart.

If contents of table 400 shown in FIG. 15 are used for the above extended tree structure chart, the assembler program can be generated from the extended tree structure chart. Also, the same program generation rules are used for various CPUs, and table 400 shown in FIG. 15 is varied depending on the type of CPU, whereby the assembler program corresponding to the CPU can be generated.

Figure 9:
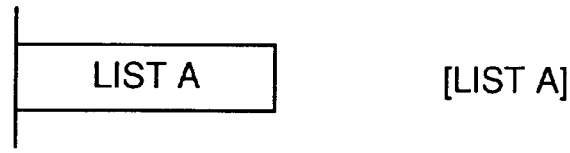
FIG. 9 shows a chart of sequential processing in the conventional format.

In this embodiment, it is predicated that contents of the list described in the tree structure chart box are described in the format of the assembler language instruction. In this case, the sequential processing shown in FIG. 9 can be converted into assembler sources, as it is. In this case, it is allowed to use both the tree structure charts shown in FIGS. 4–8 and FIGS. 10–14, and it is premised that the structures require the assembler jump instructions, and these rules are established such that the assembler source list is generated according to the execution order of these tree structures by automatic generation of the optimum assembler jump instruction and optimum jump target label name. In this case, the source generation rules are formed of combinations of characters used in the tree structure, character strings defined at the table in FIG. 15 and label names generated automatically at appropriate timings. Therefore, by applying the tree structure chart and the table shown in FIG. 15, the source program can be generated with the source generation rules.

The label names are automatically generated, and more specifically are generated by applying successive numbers to trailing ends of appropriate character strings in the respective charts in this and following embodiments. Any character string may be employed as the label name. For easy understanding, one may use a name assigned to the corresponding chart.

As already described, the extended tree structure chart used in this invention allows the conventional description format in FIGS. 4–9 and the description format in FIGS. 10–14.

Generally in the assembler language, a jump instruction corresponding to a certain condition is not always present. Therefore, in order to generate a source program whatever the assembler language may be, automatic source generation rules are established such that attention is paid to only one of the conditions in the condition branch portion of each chart, and that two cases are both contemplated. In one case, the assembler jump instruction corresponding to the above one condition is present, and in the other case, the above condition is not present. Before describing the embodiments of the invention, a specific example of rules relating to how the source programs are generated for respective tree structures will be described below.

In the following figures, "condition 1 JUMP instruction present" means that "There is an assembler jump instruction which jumps if condition 1=true". "Condition 1 JUMP instruction absent" means that "There is no assembler jump instruction which jumps if condition 1 true".

Figure 16:
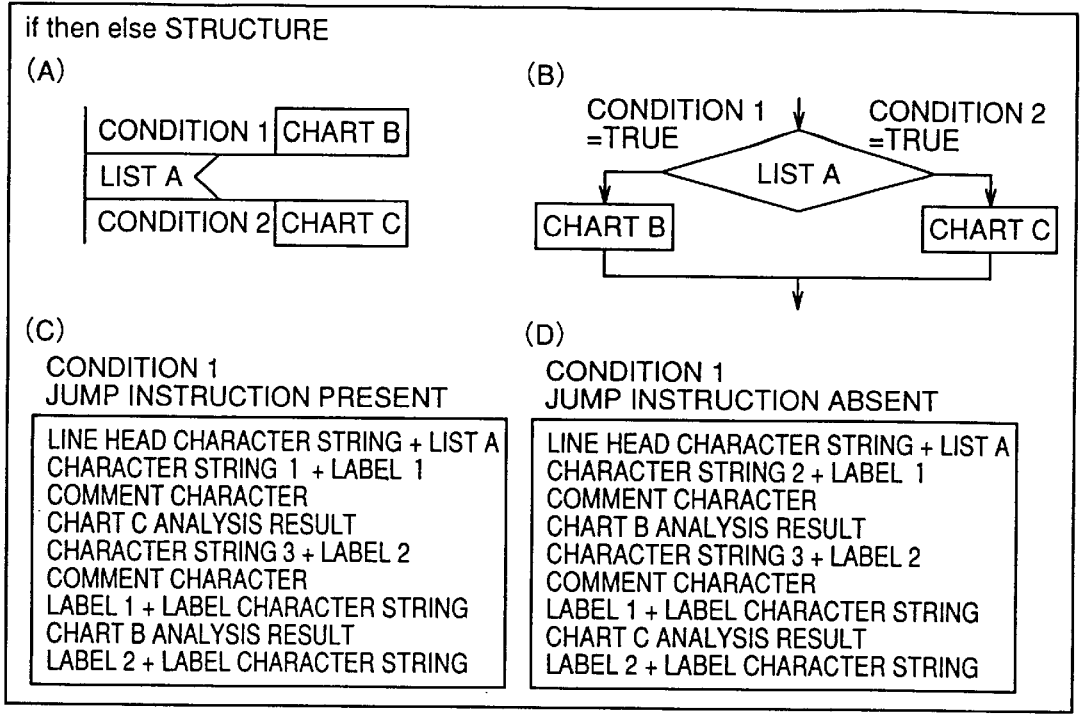
FIG. 16 shows assembler program automatic generation rules of an "if then else" structure in the first embodiment.

FIG. 16 shows automatic source generation rules for an "if then else" structure. More specifically, FIG. 16 shows at (A) the "if then else" tree structure, and FIG. 16 shows at (B) a flowchart thereof. FIG. 16 also show, at (C) and (D), automatic source generation rules in the case where the condition 1 JUMP instruction is present and that the condition 1 JUMP instruction is not present, respectively. Whether the condition 1 JUMP instruction is present or not can be determined by referring to the contents of table 400 shown in FIG. 15 as already described.

The rules at (C) in FIG. 16 will now be described below. The source generation rules at (C) are for the case where an assembler jump instruction corresponding to condition 1=true is present. The 1st line at (C) in FIG. 16 represents rules in which list A in the condition determination box is replaced with the assembler language. List A generally includes a plurality of assembler instruction lines. Source coding of list A can be achieved by adding a character string, which is defined as "line head character string" in table 400 shown in FIG. 15, to the head of each instruction.

The 2nd line at (C) in FIG. 16 is an assembler jump instruction indicating jump to automatically generated label 1 if condition 1=true. This assembler jump instruction is obtained by such description that character string 1 defined at the line of an appropriate jump instruction is followed by automatically generated label 1, as shown in table 400 in FIG. 15.

The 3rd line at (C) in FIG. 16 is a comment line. The comment line is formed of only a comment character string, and is used as an appropriate delimiter line in the program.

The 4th line at (C) in FIG. 16 is an automatic assembler source generation result of chart C which is executed if condition 2=true.

The 5th line is generated for jumping to the end of "if then else" structure after execution of chart C. As this jump instruction, the absolute jump instruction shown at 6th line in table 400 in FIG. 15 is used. As a destination, label 2 is automatically generated, and is appended to this absolute jump instruction.

The 6th line is a comment line. The 7th line is a label line indicating a head of chart B to be executed if condition 1=true. This line is formed of automatically generated label 1 and a label character string representing that this line is a label. This label character string is defined by a format represented at the 3rd line in table 400 in FIG. 15.

The 8th line at (C) in FIG. 16 is an automatic assembler source generation result of chart B which is executed if condition 1=true. The 9th line is a label line generated at the last position of execution of the "if then else" structure. This label name includes a label character string representing that the label 2 is automatically generated, and this line is the label line. This label character string is also defined by a format described at 3rd line in table 400 in FIG. 15.

FIG. 16 shows, at (D), source generation rules in the case where an assembler jump instruction corresponding to condition 1=true is not present. In FIG. 16, (D) differs from (C) in that the assembler jump instruction of condition 1=true is not used, and the assembler jump instruction corresponding to condition 2=true equivalent to condition 1=false is used for automatically generating the source list. This is performed by utilizing the fact that at least one of the complementary instructions, i.e., assembler jump instructions corresponding to the mutually opposite conditions is necessarily present regardless of the assembler language.

The "if then else" structure can automatically generate a corresponding assembler source list by using one of (C) or (D) in FIG. 16. Selection of (C) and (D) in FIG. 16 may be determined based on whether a JUMP instruction in the case of condition 1=true is present or not.

Figure 17:
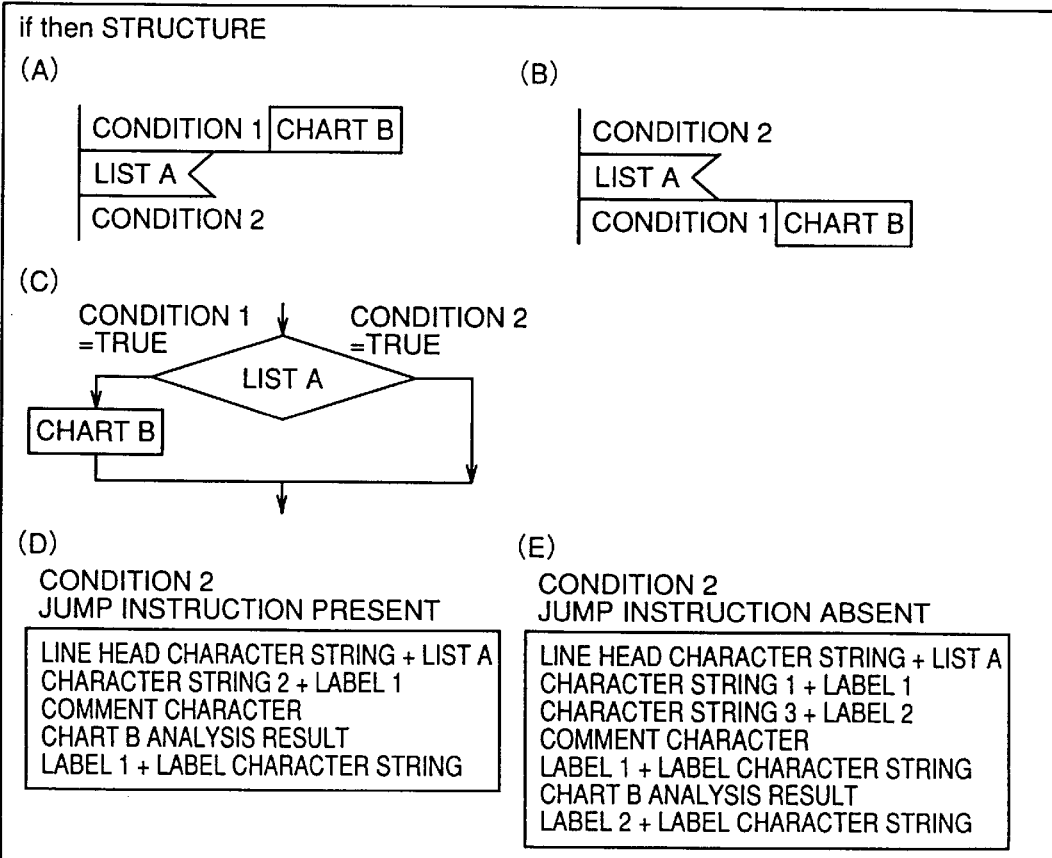
FIG. 17 shows automatic generation rules of an assembler source program of an "if then" structure.

FIG. 17 shows automatic source generation rules for an "if then" structure. Rules at (A) and (B) in FIG. 17 both relate to "if then" tree structures, and rules at (C) in FIG. 17 is its flowchart representation. Either of (A) and (B) in FIG. 17 means "Execute list A, and, if condition 1=true, execute chart B is executed. If condition 2=true (condition 1=false), execute nothing".

FIG. 17 shows, at (D) and (E), automatic source generation rules corresponding to the "if then tree" structure. (A) and (B) in FIG. 17 represent the algorithmically same processing, because the difference is only that the position of the processing (chart B), which is executed after the condition determination, in the tree structure is modified in order to describe all the variations in expression of the "if then" tree structure.

The automatic source generation rules shown at (D) and (E) in FIG. 17 are source generation rules in the case where an assembler jump instruction corresponding to condition 2=true is present, and source generation rules in the case where an assembler jump instruction corresponding to condition 2=true is not present. Contents of description at each line in the source generation rules are the same as those at (C) and (D) in FIG. 16. Therefore, these will not be described below except for special cases.

Figure 18:
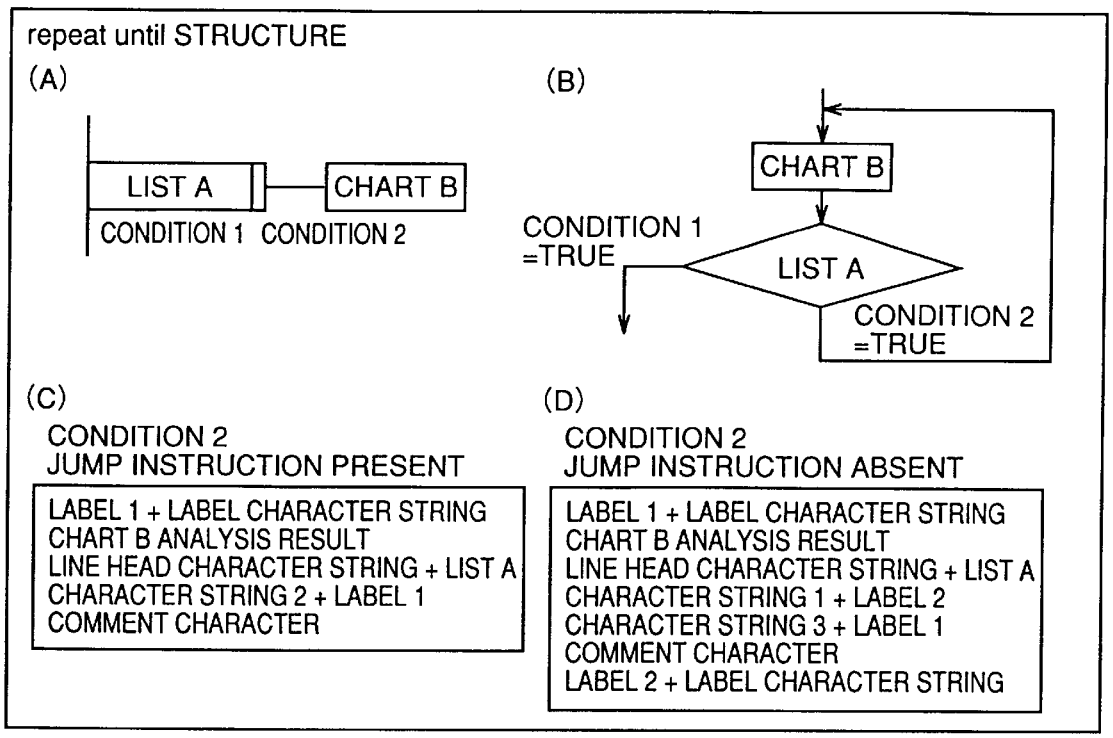
FIG. 18 shows automatic generation rules of an assembler source program of a "repeat until" structure.
Figure 19:
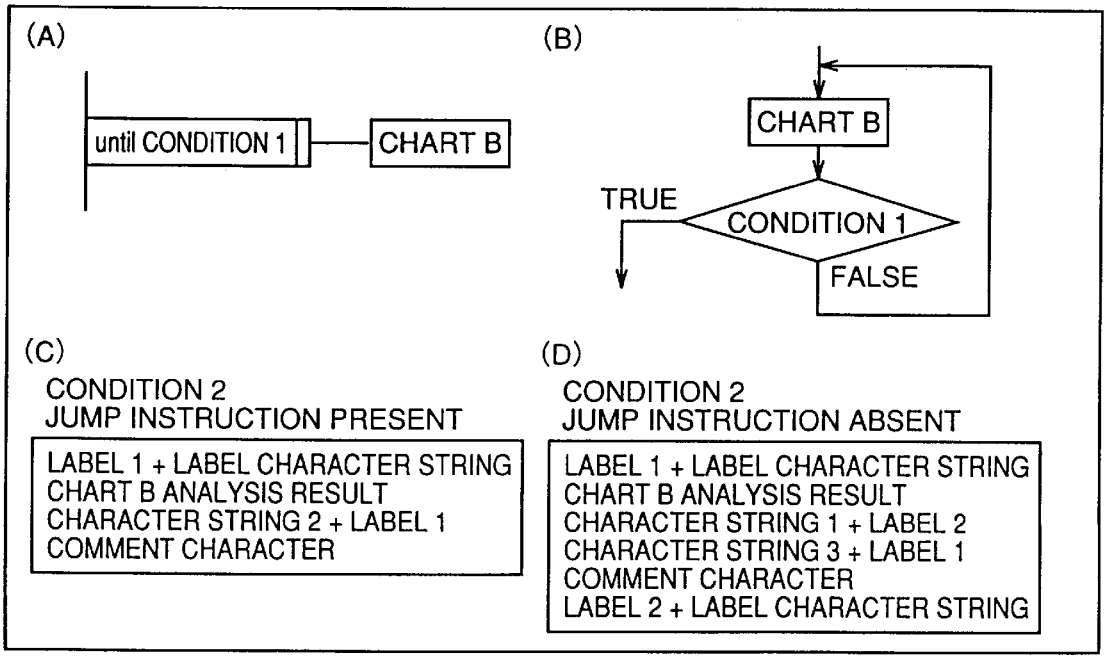
FIG. 19 shows automatic generation rules of an assembler source program of a "repeat until" structure.

FIGS. 18 and 19 show automatic source generation rules for a "repeat until" structure. FIG. 18 corresponds to the extended tree structure chart shown in FIG. 12, and FIG. 19 corresponds to the structure shown in FIG. 4.

The "repeat until" structure at (A) in FIG. 18 is equivalent to the flowchart at (B) in FIG. 18. If the assembler jump instruction corresponding to condition 2=true is present, the automatic source generation rules at (C) in FIG. 18 are used. If the assembler jump instruction corresponding to condition 2=true is not present, the automatic source generation rules shown at (D) in FIG. 18 are used. Thereby, the assembler source is automatically generated.

The "repeat until" structure at (A) in FIG. 19 is equivalent to the flowchart at (B) in FIG. 19. If the assembler jump instruction corresponding to condition 2=true is present, the automatic source generation rules shown at (C) in FIG. 19 are used. If the assembler jump instruction corresponding to condition 2=true is not present, the automatic source generation rules shown at (D) in FIG. 19 are used. Thereby, the assembler source is automatically generated.

FIGS. 20 and 21 show automatic source generation rules corresponding to a "do while" structure. FIG. 20 corresponds to the "do while" structure of the extended tree structure chart shown in FIG. 13, and FIG. 21 corresponds to the tree structure chart shown in FIG. 5.

The "do while" structure shown at (A) in FIG. 20 is equivalent to the flowchart at (B) in FIG. 20. Depending on presence and absence of the assembler jump instruction corresponding to condition 1=true, the automatic source generation rules shown at (C) or (D) in FIG. 20 is used to generate the assembler source automatically.

Figure 1:
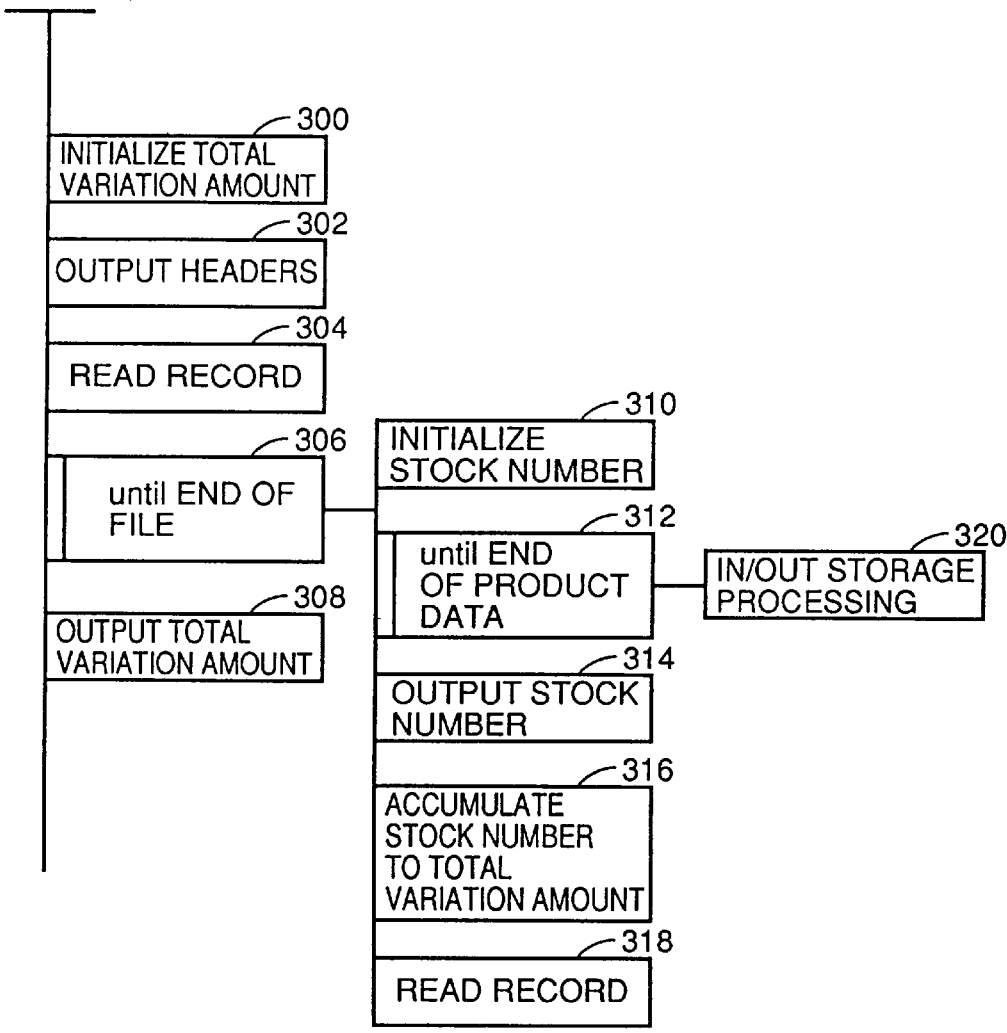
FIG. 1 shows an example of a PAD chart in a conventional format.
Figure 2:
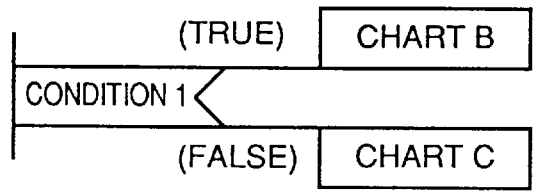
FIG. 2 shows a chart of an "if then else" structure in the conventional format.
Figure 3:
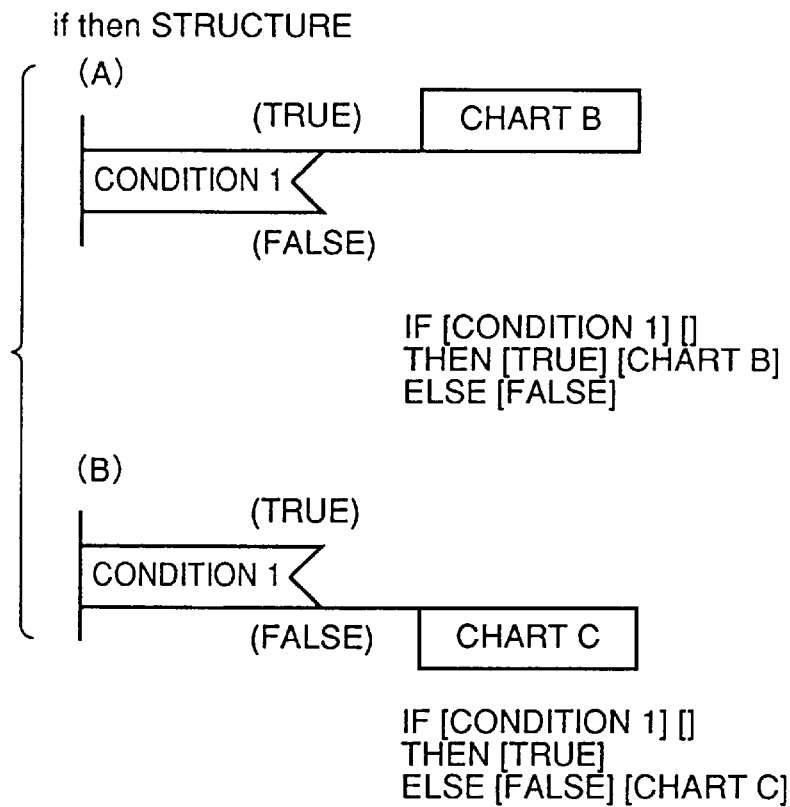
FIG. 3 shows a chart of an "if then" structure in the conventional format.
Figure 4:
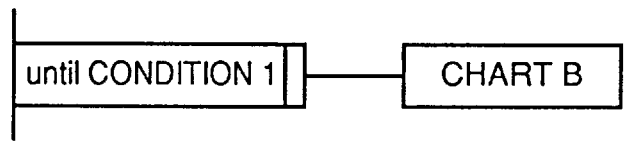
FIG. 4 shows a chart of a "repeat until" structure in the conventional format.
Figure 5:
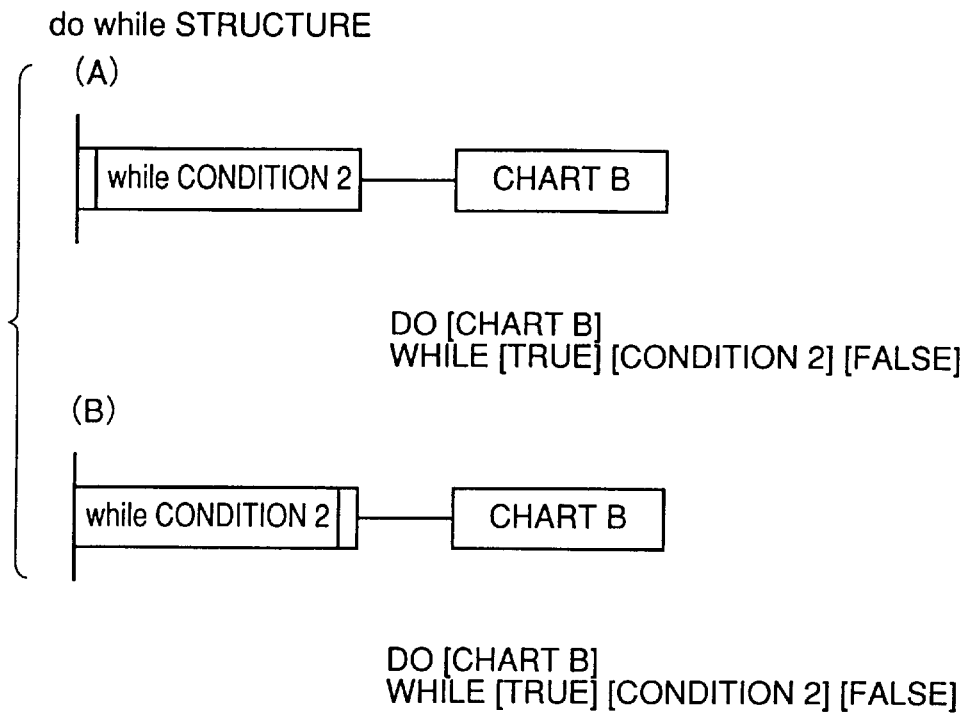
FIG. 5 shows a chart of a "do while" structure in the conventional format.
Figure 6:
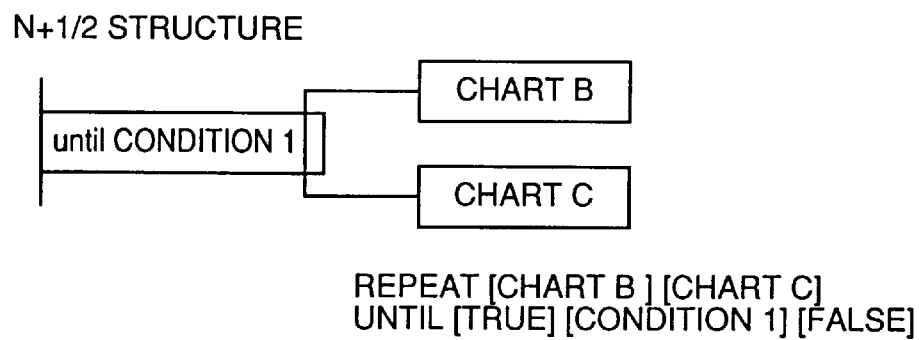
FIG. 6 shows a chart of an "N+½" structure in the conventional format.

Rules at (A) and (B) in FIG. 21 correspond to the structures shown at (A) and (B) in FIG. 5, respectively. They differ only in the form of the condition determination box, and their algorithm is equivalent to the flowchart shown at (C) in FIG. 21. Depending on presence and absence of the assembler jump instruction corresponding to condition 1=true, the automatic source generation rules shown at (D) or (E) in FIG. 21 are used to generate the assembler source automatically.

Figure 22:
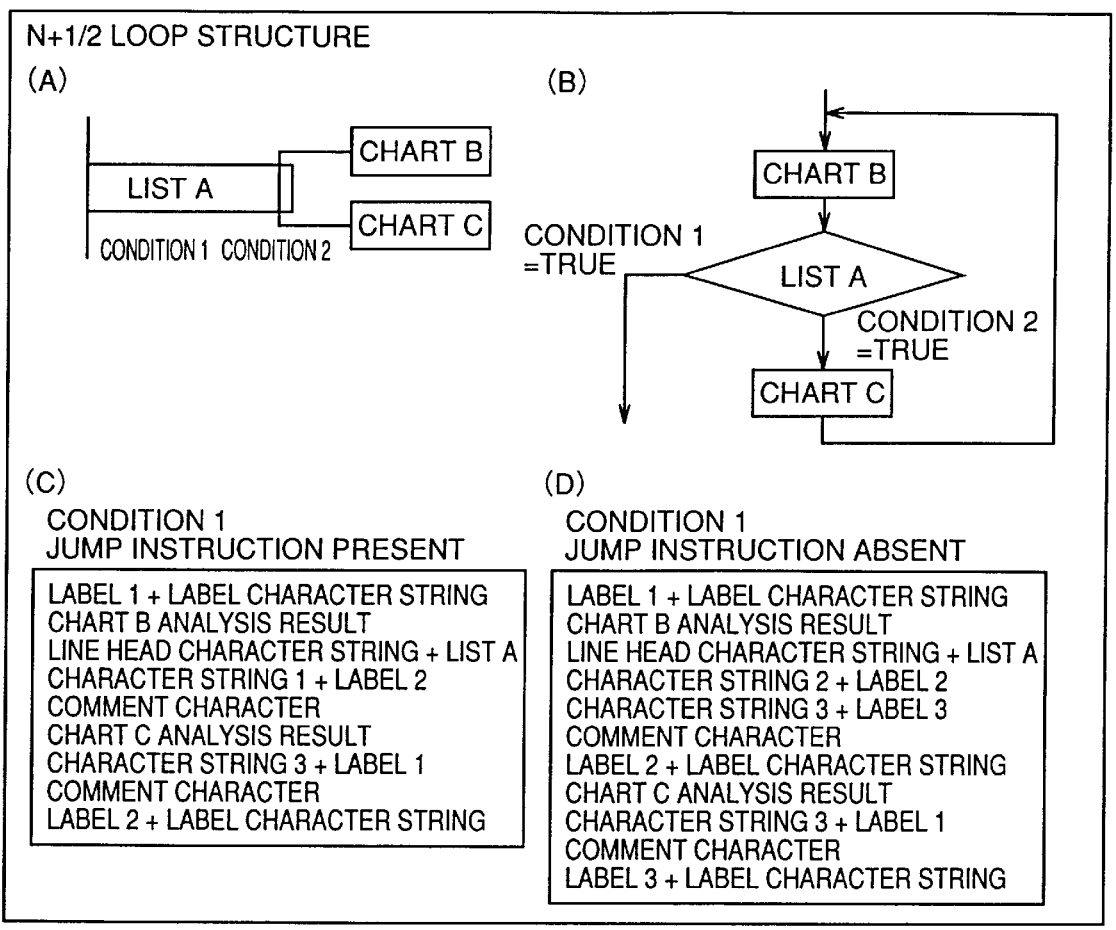
FIG. 22 shows automatic generation rules of an assembler source program of an "N+½" structure.
Figure 23:
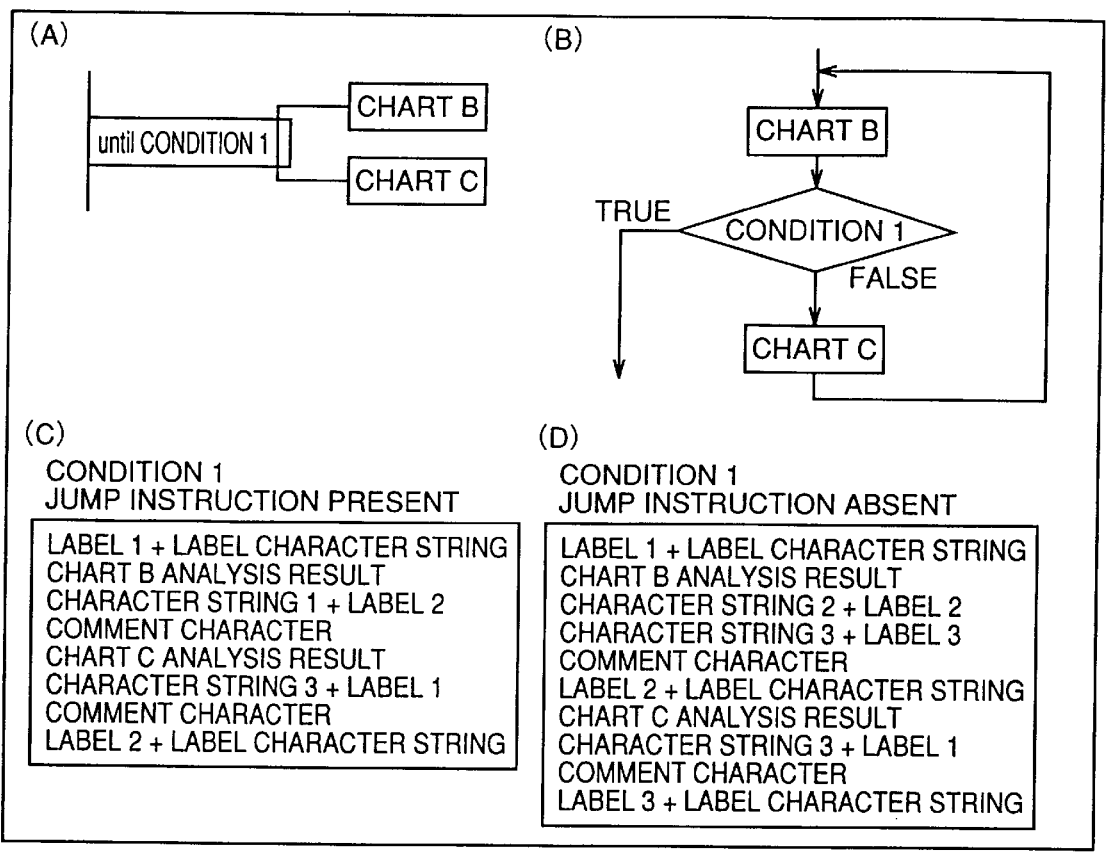
FIG. 23 shows automatic generation rules of an assembler source program of an "N+½" structure.

FIGS. 22 and 23 show automatic source generation rules corresponding to an "N+½" structure. FIG. 22 relates to the "N+½" structure in the extended tree structure chart shown in FIG. 14. FIG. 23 corresponds to the tree structure chart shown in FIG. 6.

The "N+½" structure shown at (A) in FIG. 22 is equivalent to the flowchart at (B) in FIG. 22. Depending on presence and absence of the assembler jump instruction corresponding to condition 1=true, the automatic source generation rules shown at (C) or (D) in FIG. 22 are used to generate the assembler source automatically.

The "N+½" structure shown at (A) in FIG. 23 is equivalent to the flowchart at (B) in FIG. 23. Depending on presence and absence of the assembler jump instruction corresponding to condition 1=true, the automatic source generation rules shown at (C) or (D) in FIG. 23 are used to generate the assembler source automatically.

Figure 7:
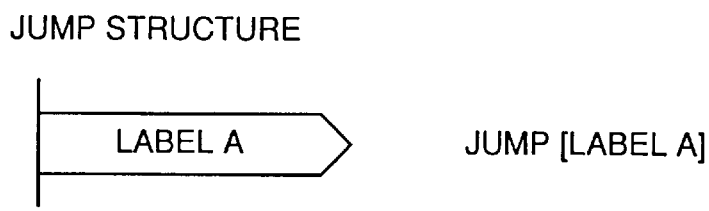
FIG. 7 shows a chart of a jump structure in the conventional format.
Figure 8:
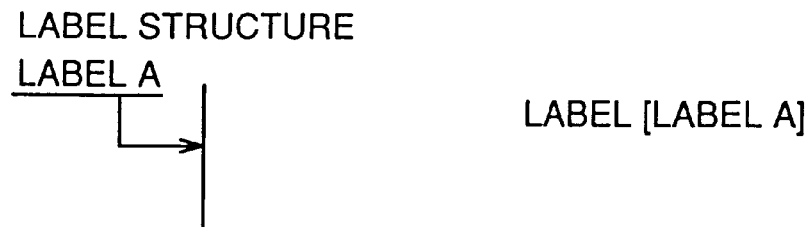
FIG. 8 shows a chart of a label structure in the conventional format.
Figure 24:
FIG. 24 shows automatic generation rules of an assembler source program of a jump structure in the first embodiment.

FIG. 24 shows automatic source generation rules related to the jump structure shown in FIG. 7. This structure unconditionally jumps. Therefore, an absolute jump instruction defined in the format described at 6th line in table 400 in FIG. 15 is used. Thus, character string 3 represented at the line of absolute jump instruction is used to generate a jump instruction line and a comment line as shown at (B) in FIG. 24.

Figure 25:
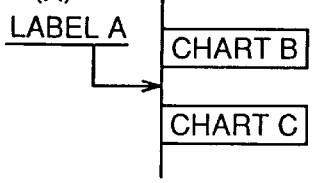
FIG. 25 shows automatic generation rules of an assembler source program of a label structure in the first embodiment.

FIG. 25 shows automatic source generation rules related to a label structure. This label structure corresponds to the label structure shown in FIG. 8. FIG. 25 shows, at (A), the case where chart B and chart C are present above and below the label, respectively. In the automatic source generation, a label line is inserted between analysis results of chart B and C as shown at (B) in FIG. 25. This label line is used for describing the jump destination in the jump structure shown in FIG. 24.

Figure 26:
FIG. 26 shows automatic generation rules of an assembler source program of a sequential processing structure in the embodiment.

FIG. 26 shows automatic source generation rules relating to the sequential processing structure already described. This sequential processing structure corresponds to the structure shown in FIG. 9. The automatic source generation rules in this case include a line formed by adding to the head of the list A a line head character string defined by the format at the 1st line in table 400 in FIG. 15, and a comment line formed of comment characters, as shown at (B) in FIG. 26.

Description will be given on an embodiment of the device, which automatically generates the assembler source program from the foregoing extended tree structure chart using the table and the automatic source generation rules already described. The processing which will be described below are achieved by software on a computer, and the processing is shown in flowcharts. A part of the processing has a structure allowing recursive call.

Figure 27:
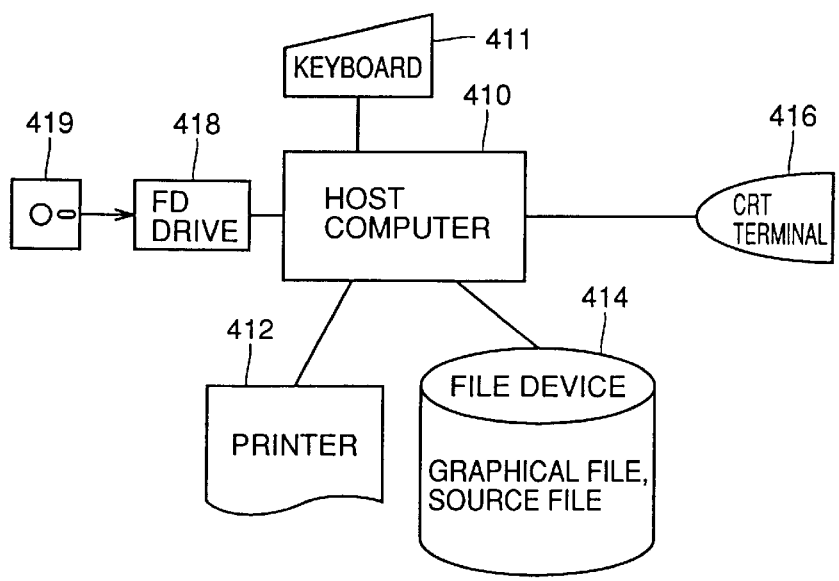
FIG. 27 is a block diagram of a computer system implementing a device of the embodiment of the invention.

FIG. 27 shows a structure of a typical computer system for implementing this device. Referring to FIG. 27, this system includes a host computer 410, which includes a CPU (Central Processing Unit), a main memory, an input/output control device and others, as well as a keyboard 411, a printer 412, a file device 414, a flexible disk (FD) drive 418 and a CRT (Cathode Ray Tube) terminal 416 which are connected to host computer 410. Host computer 410 may have a typical structure. File device 414 is provided for storing the tree structure chart as a graphical file and storing generated source files. The table for conversion corresponding to the assembler language may be stored, e.g., in file device 414, and may be read onto a memory of host computer 410, or may be prepared as a table fixed in software. This software is stored in file device 414, and can be distributed via an FD 419 which can be read/write via FD drive 418.

FIG. 28 shows a table 420 for generating a source program of an assembler language corresponding to a microprocessor called "Z-80", which is an example of a typical microcomputer. "Z-80" is a typical 8-bit general-purpose CPU, and its instruction system is well known.

The 1st line in table 420 shown in FIG. 28 is a comment line, and is not especially pertinent to the automatic source generation. The 2nd line defines a line head character string inserted into a head of the assembler command line. In this embodiment, eight spaces are used as the character string.

The third line defines the comment characters inserted to the head of the comment line. In this embodiment, ";" and four spaces are used. The 4th line defines the character string added to the end of the label in the label line. In this embodiment, ":" is used.

Lines from 5th line to 15th line define jump instructions related to a series of condition branches. The 5th line defines a jump instruction "JR". Null characters are defined in both the condition and opposite condition. Therefore, this jump instruction "JR" is an absolute jump instruction.

Sixth and seventh lines define condition branch instructions related to a condition flag "C" (carry). The conditions "C" and "NC" are opposite conditions with respect to each other. It is assumed that, if C=true, jump instruction "JR C," is employed, and, if NC=true, jump instruction "JR NC," is employed.

Eighth and ninth lines define condition branch instructions related to a condition flag "Z" (zero). The conditions "Z" and "NZ" (non-zero) are opposite conditions with respect to each other. It is assumed that, if Z=true, a jump instruction "JR Z," is employed, and, if NZ=true, a jump instruction "JR NZ," is employed.

Tenth and eleventh lines define condition branch instructions related to condition flags "PO" and "PE". The conditions "PO" and "PE" are opposite conditions with respect to each other. It is assumed that, if PO=true, a jump instruction "JP PO," is employed, and, if PE=true, a jump instruction "JP PE," is employed.

Twelfth and thirteenth lines define condition branch instructions related to condition flags "P" and "M". The conditions "P" and "M" are opposite conditions with respect to each other. It is assumed that, if P=true, a jump instruction "JP P," is employed, and, if M=true, a jump instruction "JP M," is employed.

Fourteenth and fifteenth lines define condition branch instructions related to conditions "B--=0" and "B--< >0". The conditions "B--=0" and "B--< >0" are opposite conditions with respect to each other. A jump instruction corresponding to "B--=0"=true is not present. If "B--< >0"=true, a jump instruction "DJNJ" is employed. Conditions "B--=0" and "B--< >0" specifically describe such conditions that, if the value of the B register of Z-80 goes to 0 by subtracting 1 therefrom, it represents "B--=0"=true, and if not 0, it represents "B--< >0"=true".

FIGS. 29–39 show flowcharts of software for the automatic assembler source program generation executed on host computer 410 in FIG. 27. In this embodiment, the assembler source program for Z-80 is generated as described above. However, the flowcharts in FIGS. 29–39 do not depend on the types of the assembler languages to be handled. This can be achieved only by replacing table 420 shown in FIG. 28 with a table corresponding to another assembler language. The flowcharts shown in FIGS. 29–39 will be described below. These flowcharts are provided for achieving source program automatic generation rules shown in FIGS. 16–26.

Figure 29:
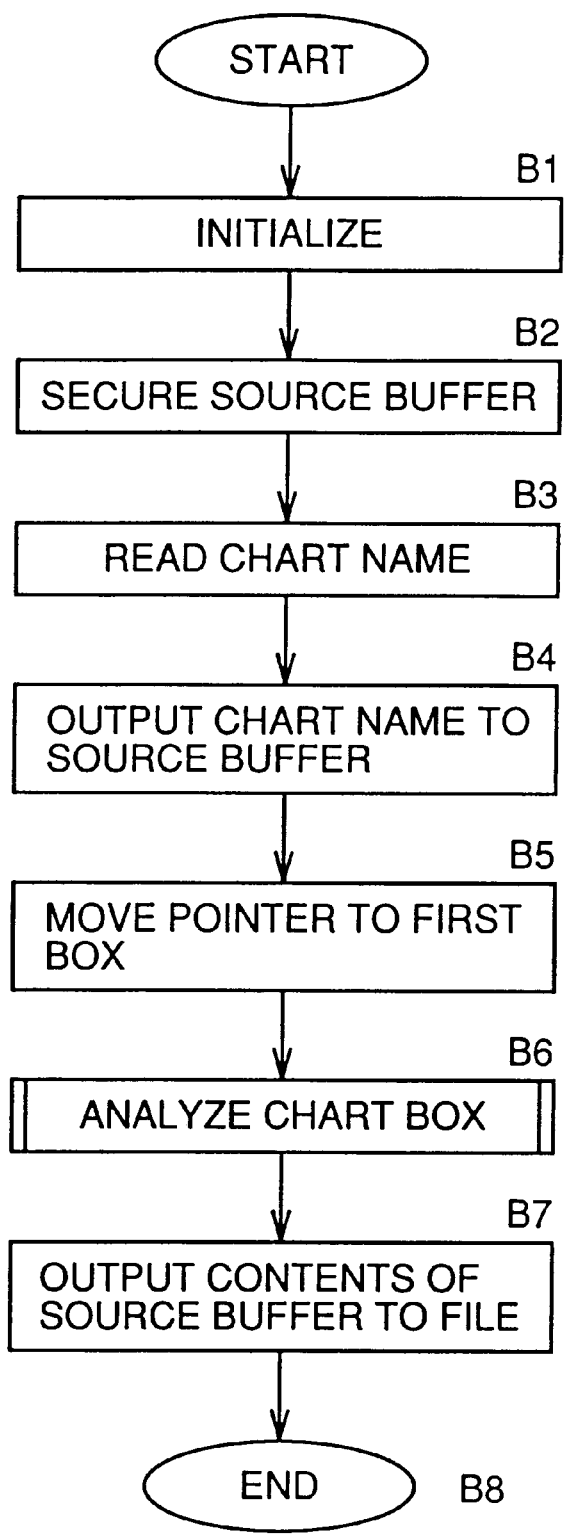
FIG. 29 is a main program flowchart of an assembler source program automatic generation processing of the first embodiment.

Referring to FIG. 29, initialization at step B1 is first executed in the main program of the automatic generation algorithm. In this initialization, initial setting is effected on various arguments such as a pointer indicating respective boxes of the tree structure chart and a pointer at the source program part.

At subsequent step B2, processing is performed for ensuring a source buffer for temporarily storing an automatically generated source program.

At step B3, chart name information of the tree structure chart which is stored in the file device taking the form of a graphical file is read out. In this operation, the tree structure chart to be converted can be specified, for example, by selecting desired one in the list of the tree structure chart names displayed on a screen with a mouse pointer. The read chart name is stored as a label name character string to be used in the generated assembler source.

At step B4, the stored label name character string is output to the source buffer as the head label name of the generated program character strings. At B5, the pointer indicating a component of the tree structure chart is moved to the first box in the tree structure chart. This first box is the box already stored immediately after the chart name information.

At B6, processing is executed for actually and automatically generating the assembler program from the tree structure chart. This processing will be described later more in detail with reference to FIG. 30 and the followings.

When automatic generation of assembler program 2 at B6 is completed, contents of the source buffer storing the generated program are output to the file device at B7. In this case, the output has a format of a program source file. At step B8, the automatic generation processing is finished.

Figure 30:
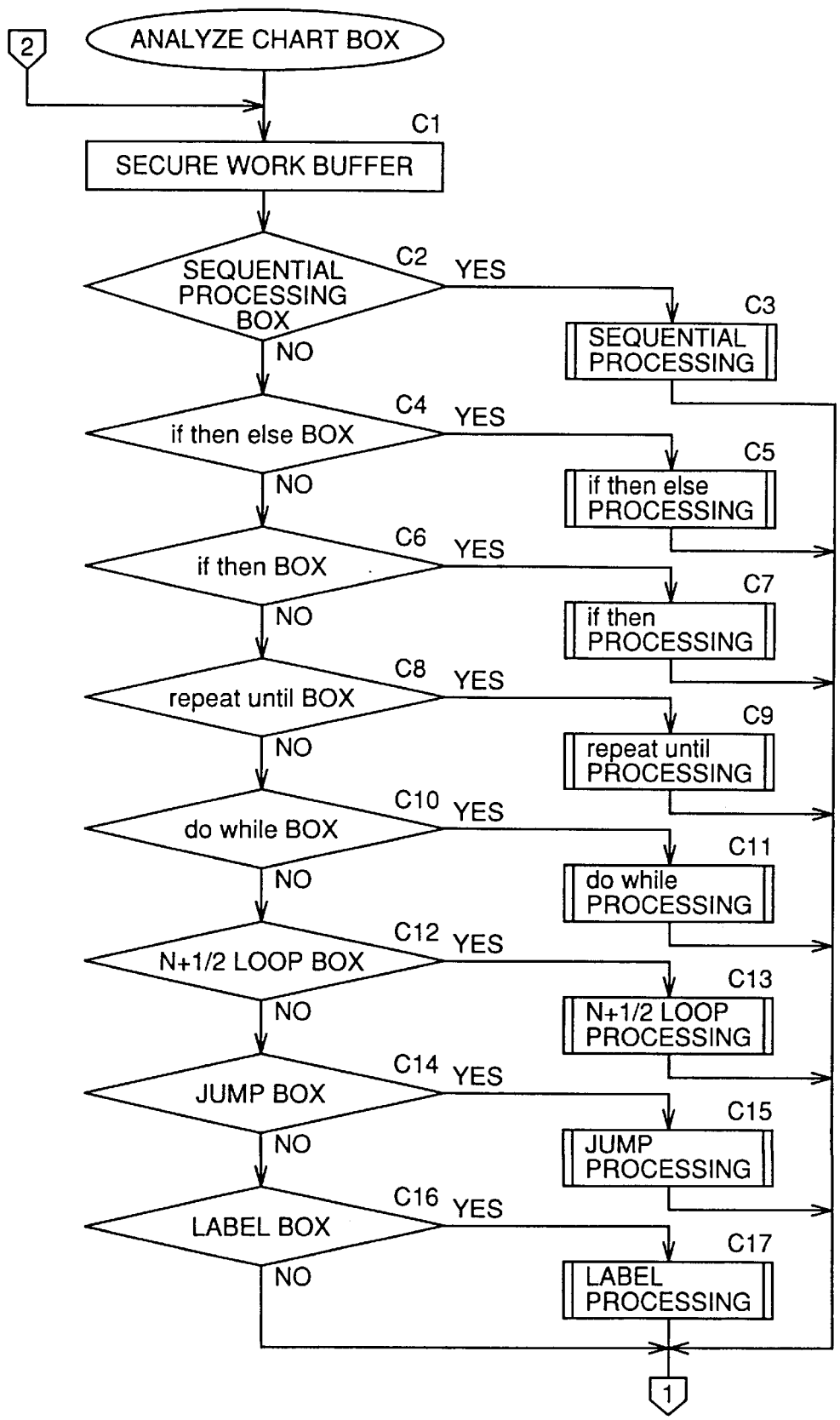
FIG. 30 is a flowchart of a chart box analysis subroutine processing.
Figure 31:
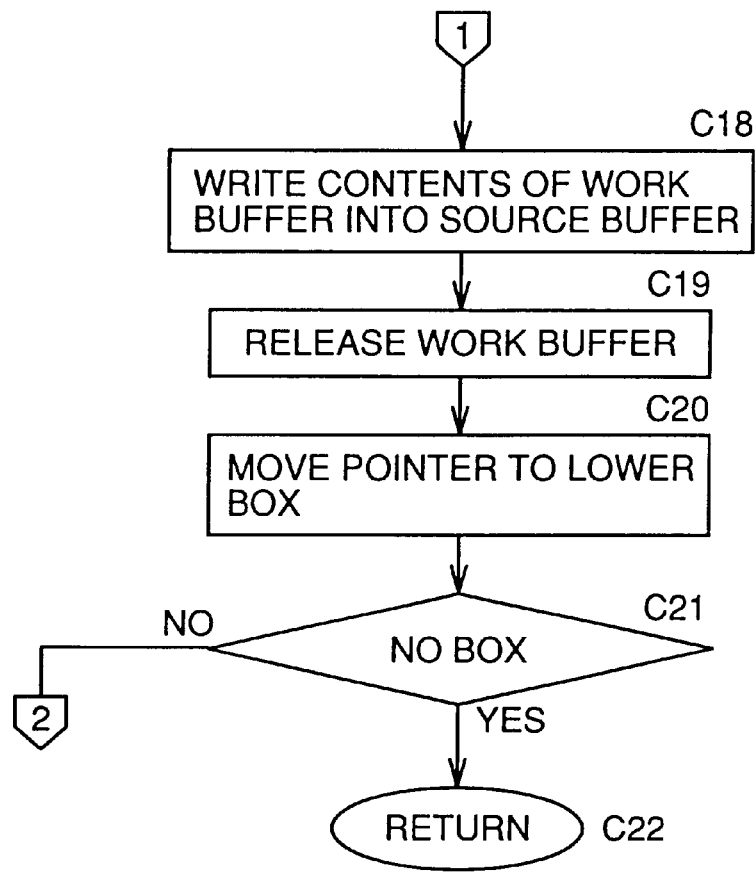
FIG. 31 is a flowchart of a chart box analysis subroutine processing.

FIGS. 30 and 31 are flowcharts of the chart box analysis processing for actually generating the assembler source from the tree structure chart read out at B6 in FIG. 29. As already described, this algorithm allows recursive call. Therefore, at step C1 in the chart box analysis processing, a work buffer for temporarily storing the assembler source is secured in the file device. Thus, upon every chart box analysis processing, the work buffer for this processing is secured.

Then, it is determined by condition determination parts at steps C2, C4, C6, C8, C10, C12, C14, and C16 which one of the tree structure charts in FIGS. 16–26 matches the box indicated by the box represented by the pointer indicating the tree structure box component, and the tree structure chart analysis routines corresponding to the determined tree structure charts are called at step C3, C5, C7, C9, C11, C13, C15 and C17, respectively.

The tree structure analysis processing routine thus called includes a sequential processing routine (C3) for analyzing a sequential processing structure, an "if then else" processing routine (C5) for analyzing an "if then else" structure, an "if then" processing routine (C7) for analyzing an "if then" structure, a "repeat until" processing routine (C9) for analyzing a "repeat until" structure, a "do while" structure processing routine (C11) for analyzing a "do while" structure, an "N+½" processing routine (C13) for analyzing an "N+½" structure, a JUMP processing routine (C15) for analyzing a JUMP structure, and a label processing routine (C17) for analyzing a label structure.

When these analysis routine is finished, the analysis results are stored in the work buffers as assembler sources.

Referring to FIG. 31, contents of this work buffer are therefore added to the source buffer at step C18.

Further, at C19, work buffers which are required no longer are analyzed, and the pointer indicating the tree structure chart is moved to the next box at C20.

At C21, it is determined whether a tree structure box is present at a location indicated by the pointer or not. If the tree structure box is present, the control jumps to C1 in FIG. 30 to continue the analysis. If the tree structure box is not present, the control advances to C22, and the subroutine returns.

As already described, the chart box analysis processing shown in FIGS. 30 and 31 can be called not only from the main program in FIG. 29 but also from the subroutines called in FIG. 30, and therefore is a recursive subroutine. When the chart box analysis processing is called from these subroutines, the processing returns the analysis result to the corresponding subroutines, respectively.

Figure 32:
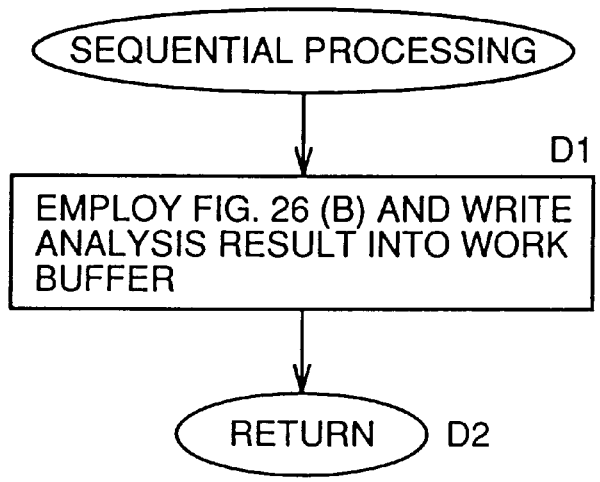
FIG. 32 is a flowchart of a subroutine of sequential processing.

FIG. 32 shows subroutine processing for converting the sequential processing structure called at C3 shown in FIG.

30 into the assembler source. At step D1 in this processing, automatic generation rules at (B) in FIG. 26 are employed to generate and write the assembler source list into the work buffer. In the processing for the above purpose, as shown at (B) in FIG. 26, a line head character string (obtained from table) is first written into the head of the list A in the box of the tree structure chart shown at (A) in FIG. 26. Then, as a delimiter of the algorithm, a comment line formed of a comment character string is written into the work buffer, and then the control advances to D2 for return.

Figure 33:
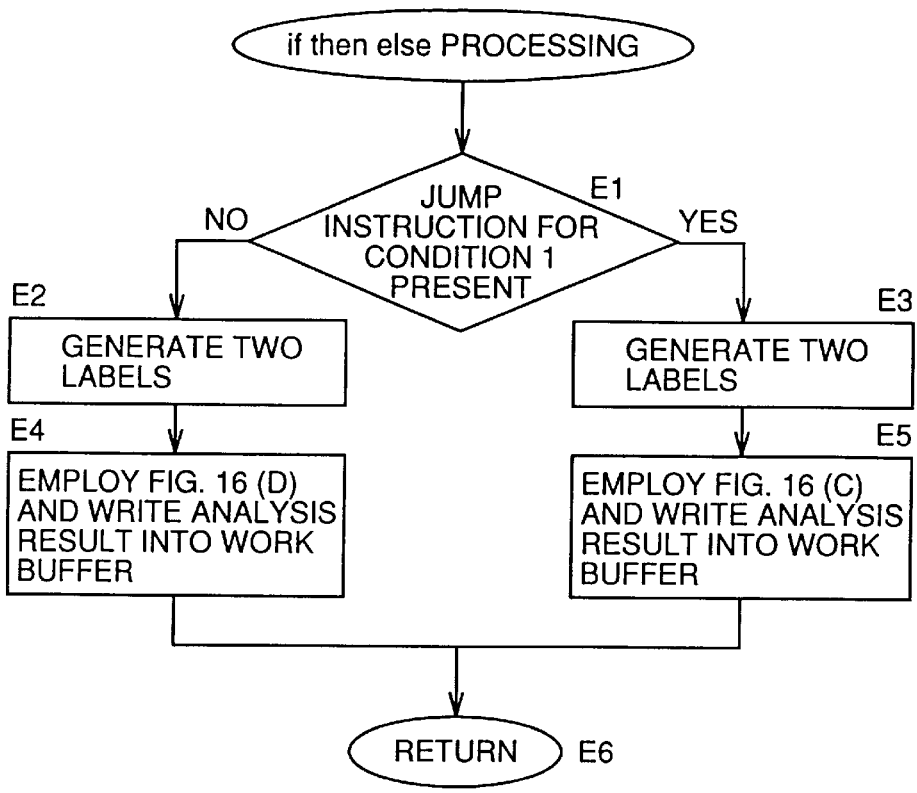
FIG. 33 is a flowchart of an automatic generation subroutine of an assembler source program from an "if then else" structure.

FIG. 33 shows a flowchart of subroutine processing for converting the "if then else" structure called at step C5 in FIG. 30 into the assembler source. First, at step E1, it is determined whether a jump instruction corresponding to condition 1=true is present or not by referring to table 420 in FIG. 28. More specifically, it is determined whether lines in table 420 in FIG. 28 contain a line starting from "JUMP:" with definition of "condition 1", "condition 2" and "character string" or not. When it is determined that the corresponding jump instruction is present, control advances to step E3. If the jump instruction is not present, the control advances to step E2.

At step E3, two new label names to be used later are generated for the case where a jump instruction corresponding to condition 1=true is present. The control advances to step E5, at which the assembler source is generated by employing the automatic generation rules shown at (C) in FIG. 16. The assembler source thus generated is written into the work buffer. Terms "chart C analysis result" and "chart B analysis result" at 4th line and 8th line at (C) in FIG. 16 mean the assembler sources, which are automatically generated from chart B structure and chart C structure included in the "if then else" structure at (A) in FIG. 16 by recursively calling the chart box analysis subroutine shown in FIG. 30, respectively.

In this recursive calling, the chart box analysis subroutine is called with the current work buffer specified as the output destination source buffer. The chart box analysis subroutine uses the specified current work buffer as the source buffer for writing at step C18 in FIG. 31. Thus, the automatically generated assembler sources of chart B and chart C are output to the current work buffer, and then are returned from the chart box analysis subroutine to the subroutine in FIG. 33. In the figures which will be referred to later, similar descriptions of "chart B analysis result", "chart C analysis result" or the like represent the same contents as the above. Therefore, they will not be described in detail.

Referring again to FIG. 33, when processing at step E5 is finished, the control advances to E6, and the subroutine is finished.

When the jump instruction corresponding to condition 1=true is not present, the control advances from step E1 to step E2 to generate two labels to be used later. At step E4, the generation rules at (D) in FIG. 16 are used to generate an assembler source. The assembler source thus generated is stored in the work buffer. After E4, the control advances to E6, and the subroutine is finished.

Figure 34:
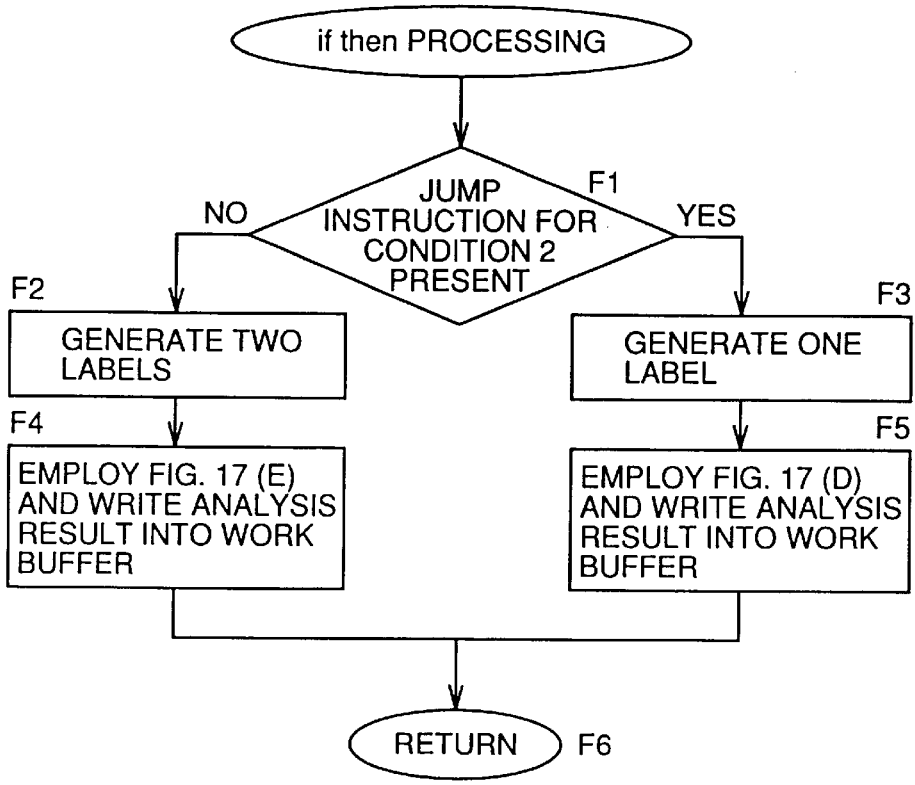
FIG. 34 is a flowchart of a subroutine of processing for generating an assembler source program from an "if then" structure in the first embodiment.

FIG. 34 shows a subroutine processing for converting the "if then" structure called at C7 in FIG. 30 into the assembler source. First at F1, it is determined whether a jump instruction corresponding to condition 2=true is present or not. If the jump instruction corresponding to condition 2=true is present, the control advances to step F3. If not, the control advances to step F2.

If the jump instruction corresponding to condition 2=true is present, one new label name to be used at step F3 is generated. Then, at step F5, the automatic generation rules shown at (D) in FIG. 17 are employed to generate the assembler source. The assembler source thus generated are written into the work buffer. Thereafter, the control advances to F6, and this subroutine is finished.

If the jump instruction corresponding to condition 2=true is not present, two new label names to be used at step F2 are generated. At F4, the automatic generation rules shown at (E) in FIG. 17 are employed to generate the assembler source. The assembler source thus generated are written into the work buffer. The control advances to step F6, and this subroutine is finished.

Figure 35:
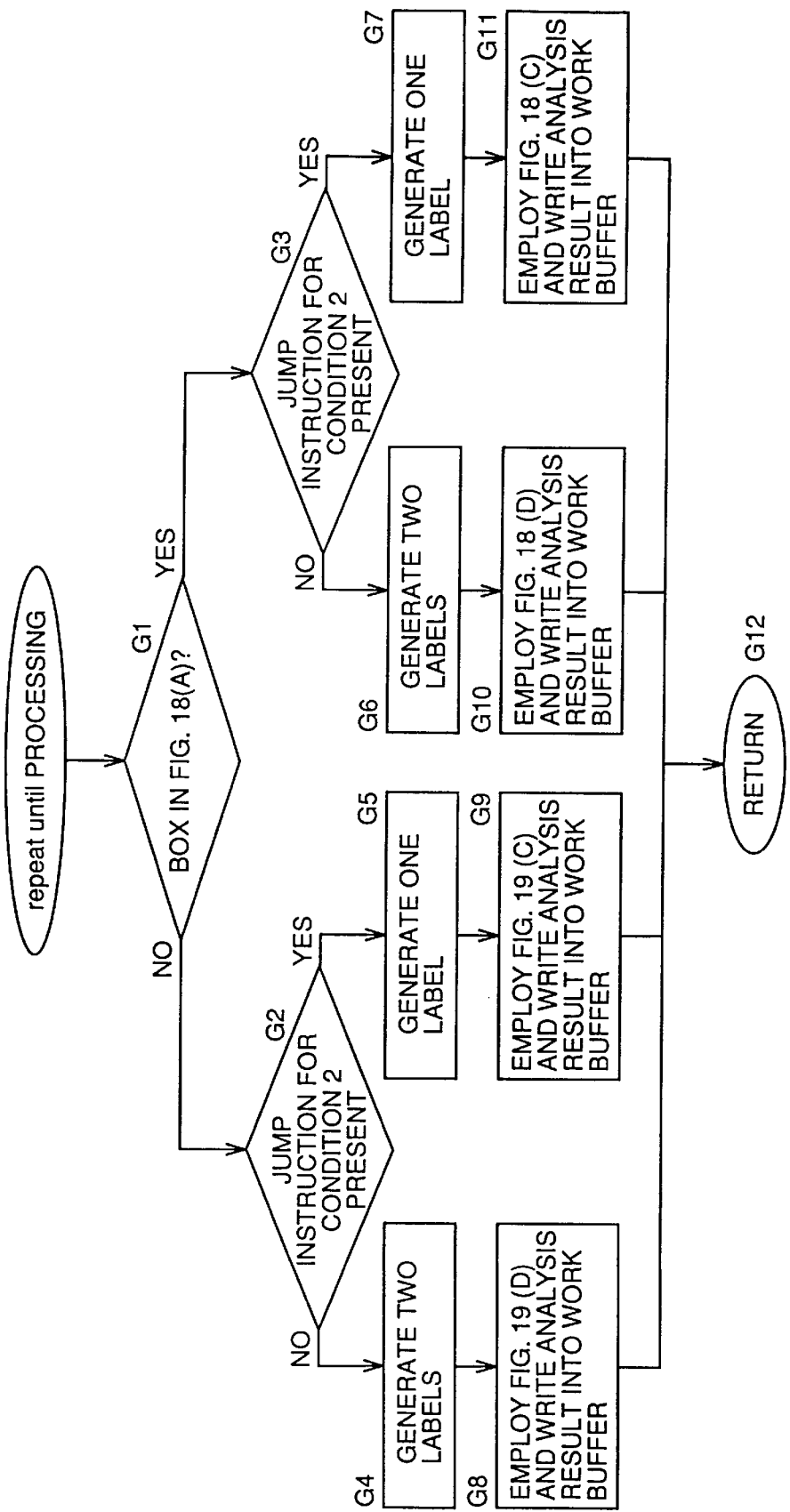
FIG. 35 is a flowchart of a subroutine of processing for generating an assembler source program from a "repeat until" structure in the first embodiment.

FIG. 35 shows subroutine processing for converting the "repeat until" structure called at C9 in FIG. 30 into the assembler source. First at step G1, it is determined whether the target box is the box shown at (A) in FIG. 18. If the target box is the box at (A) in FIG. 18, the control advances to G3. If not, it is determined that the target box is the box shown at (A) in FIG. 19, and the control advances to G2.

At G3, it is determined whether a jump instruction corresponding to condition 2=true is present or not. If the corresponding jump instruction is present, the control advances to step G7. If not, the control advances to step G6.

At step G7, one new label name to be used later is generated. Then at G11, the automatic generation rules at (C) in FIG. 18 are employed, and the generated assembler source is written into the work buffer. Then, the control advances to G12, and the subroutine is finished.

If it is determined at G3 that the jump instruction corresponding to condition 2=true is not present, two new label names are generated at G6. Thereafter, at G10, the automatic generation rules shown at (D) in FIG. 18 are employed to generate the assembler source. The generated assembler source is written into the work buffer. Thereafter, the control advances to step G12, and this subroutine is finished.

When it is determined at G1 that the target box is not the box at (A) in FIG. 18, it is determined that the target box is the box at (A) in FIG. 19, and it is determined at step G2 whether the jump instruction corresponding to condition 2=true is present or not. If the corresponding jump instruction is present, the control advances to step G5, and otherwise to G4.

If the corresponding jump instruction is present, one new label name to be used later is generated at step G5. Then, at step G9, the assembler source is generated by employing (C) in FIG. 19, and is written into the work buffer. Thereafter, the control advances to step G12, and this subroutine is finished.

If it is determined at step G2 that the jump instruction corresponding to condition 2=true is not present, two new label names which will be used at step G4 are generated. At G8, the automatic generation rules at (D) in FIG. 19 are employed to generate and write the assembler source into the work buffer. Thereafter, this subroutine is finished at step G12.

Figure 36:
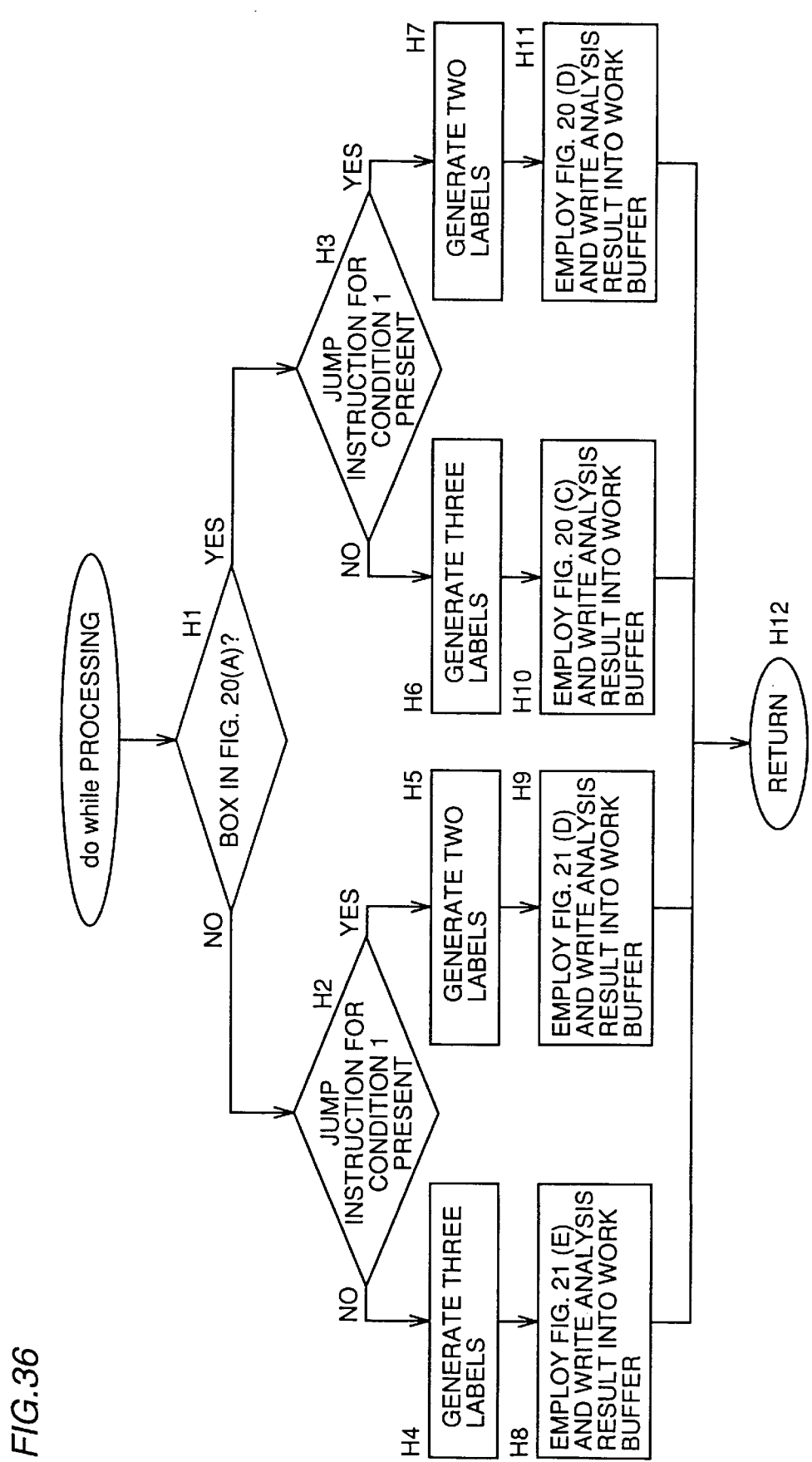
FIG. 36 is a flowchart of a subroutine of processing for generating an assembler source program from a "do while" structure in the first embodiment.
Figure 37:
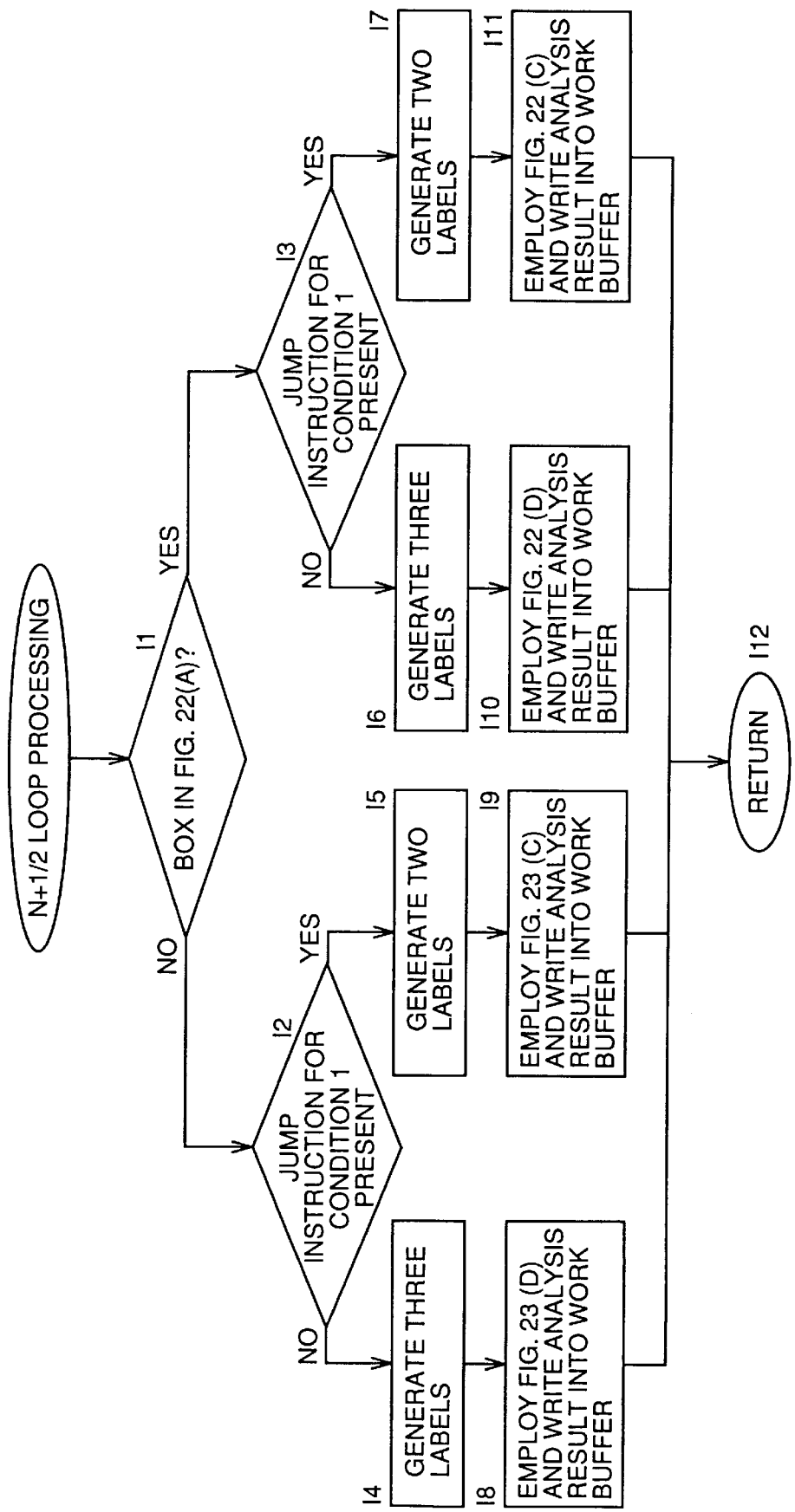
FIG. 37 is a flowchart of a subroutine of processing for generating an assembler source program from an "N+½" structure in the first embodiment.

FIG. 36 is a flowchart of subroutine processing for converting the "do while" structure called at step C11 in FIG. 30 into the assembler source. FIG. 37 is a flowchart of the subroutine processing for converting the "N+½" structure called at step C13 in FIG. 30 into the assembler source. Both the procedures in FIGS. 36 and 37 are substantially the same as the procedures in FIG. 35, and are different from it only in forms of the target boxes and the corresponding automatic generation rules. Therefore, FIGS. 36 and 37 will not be described below in detail.

Figure 38:
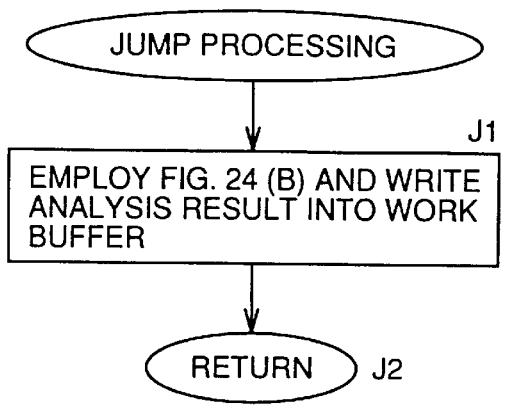
FIG. 38 is a flowchart of a subroutine of processing for generating an assembler source program from a jump structure in the first embodiment.

FIG. 38 is a flowchart of the subroutine processing for converting the JUMP structure called at C15 in FIG. 30 into the assembler source. Referring to FIG. 38, the automatic generation rules shown at (B) in FIG. 24 are first employed at step J1 to generate the assembler source. The assembler source thus generated is written into the work buffer, and this subroutine processing is finished at step J2.

Figure 39:
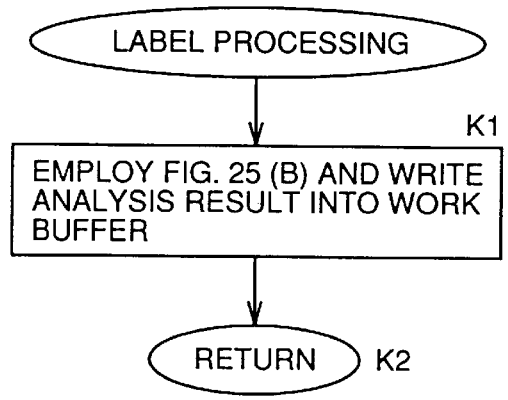
FIG. 39 is a flowchart of a subroutine of processing for generating an assembler source program from a label structure in the first embodiment.

FIG. 39 is a flowchart of the subroutine processing for converting the label structure called at C17 in FIG. 30 into the assembler source. At step K1, the automatic generation rules at (B) in FIG. 25 are employed to generate and write the assembler source into the work buffer. Then, the control advances to K2, and this subroutine is finished.

Figure 40:
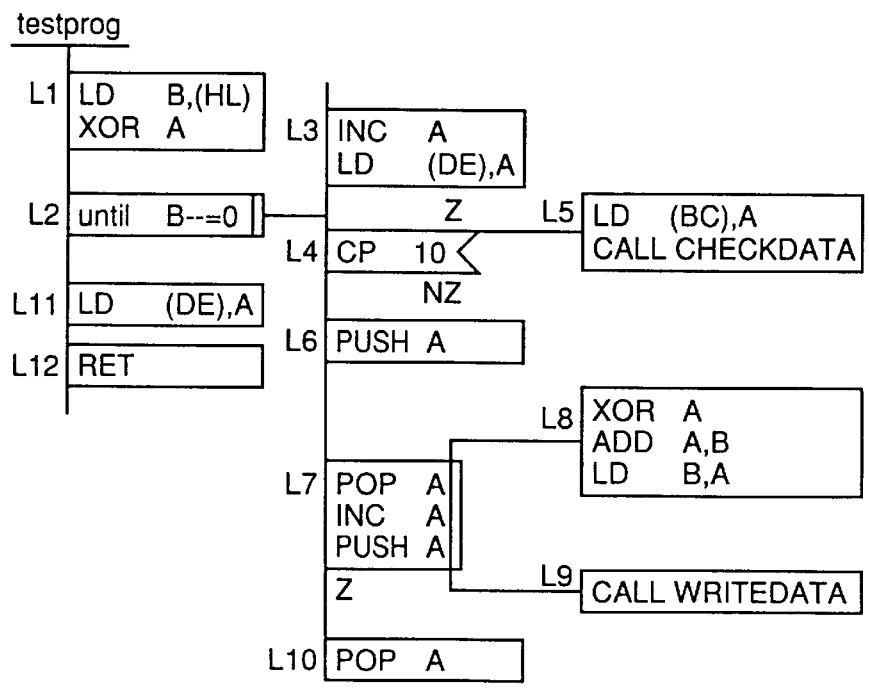
FIG. 40 shows an example of a tree structure chart converted into an assembler source program by the device of the first embodiment.

Description will be given on an example for actually converting the tree structure chart into the assembler source with the assembler language program generation device described above. FIG. 40 shows an example of an extended tree structure chart. The module name of this chart is "testprog".

FIG. 41 shows the left half of the tree structure chart in FIG. 40, and FIG. 42 shows a graphical file format of storage of this tree structure chart. In FIG. 42, downward arrows represent "Return" and/or "Line Feed".

Further, FIG. 43 shows a box of "CP" among the boxes shown in FIG. 41, and FIG. 44 shows, in a plain manner, the storage format of the graphical file of this box.

The device of the invention reads such graphical files, and converts the same into the assembler source program.

At the left side of each of FIGS. 45–48, there is shown a conversion target portion of the tree structure chart, and, at the right side, there is shown an automatically generated assembler source program.

Figure 45:
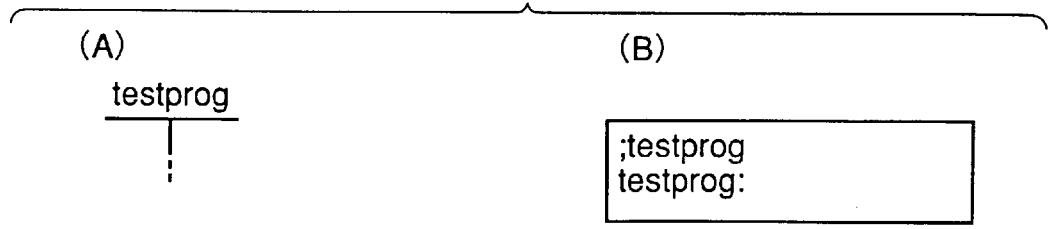
Figure 46:
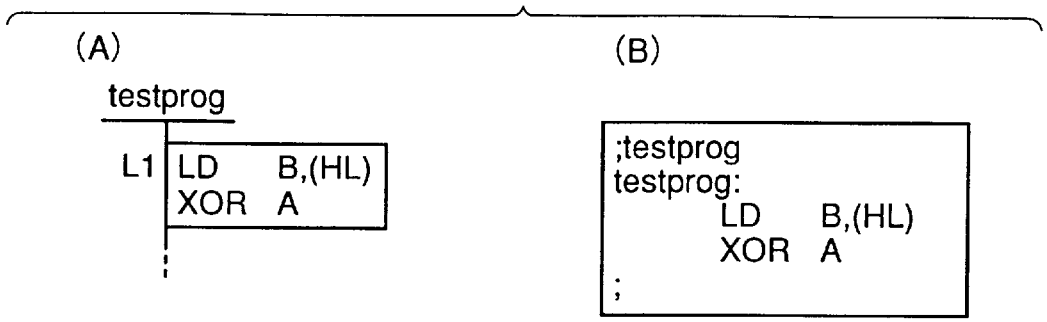

First, assembler automatic source generation main program is activated. This program is shown in FIG. 29. After initializing arguments and securing a source buffer, the chart name "testprog" of tree structure chart in FIG. 40 is read, and outputted into the source buffer, as shown in FIG. 45. The right portion in FIG. 45 shows contents of the source buffer at this time.

Subsequently, the chart box analysis processing shown in FIG. 30 is executed. The first tree structure among the tree structure charts is the sequential processing box L1 shown at the left portion in FIG. 46. Therefore, in accordance with the processing in FIG. 32, the assembler source is generated. The result outputted into the source buffer at C18 in FIG. 31 is shown at the right portion in FIG. 46.

The tree structure to be processed subsequently is a "repeat until" structure L2 shown at the left portion in FIG. 47. Since this box is the box at (B) in FIG. 53, the control advances to G2 in FIG. 35. Referring to table 420 in FIG. 28, it is understood that the condition jump instruction corresponding to the opposite condition of "B--=0", i.e., the condition "B--< >0"=true is present (at the final line in table 420). Therefore, the determination result of G2 is YES, and the control advances to G5 and G9. By performing the source generation according to (C) in FIG. 19 at G9, the work buffer contents shown at the right portion in FIG. 47 is obtained.

Figure 47:
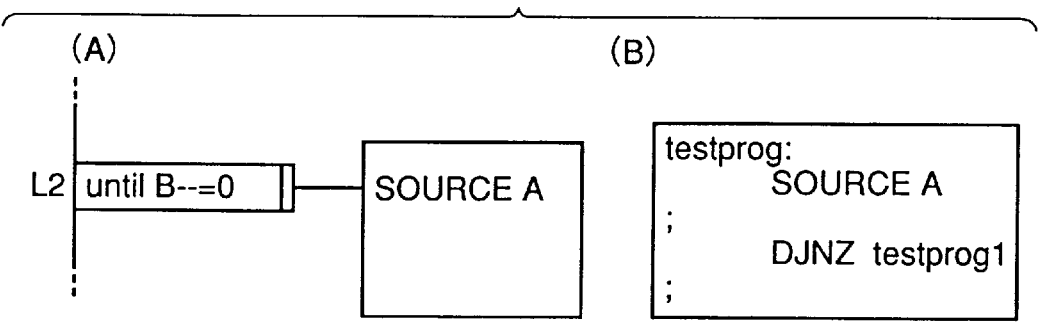
Figure 48:
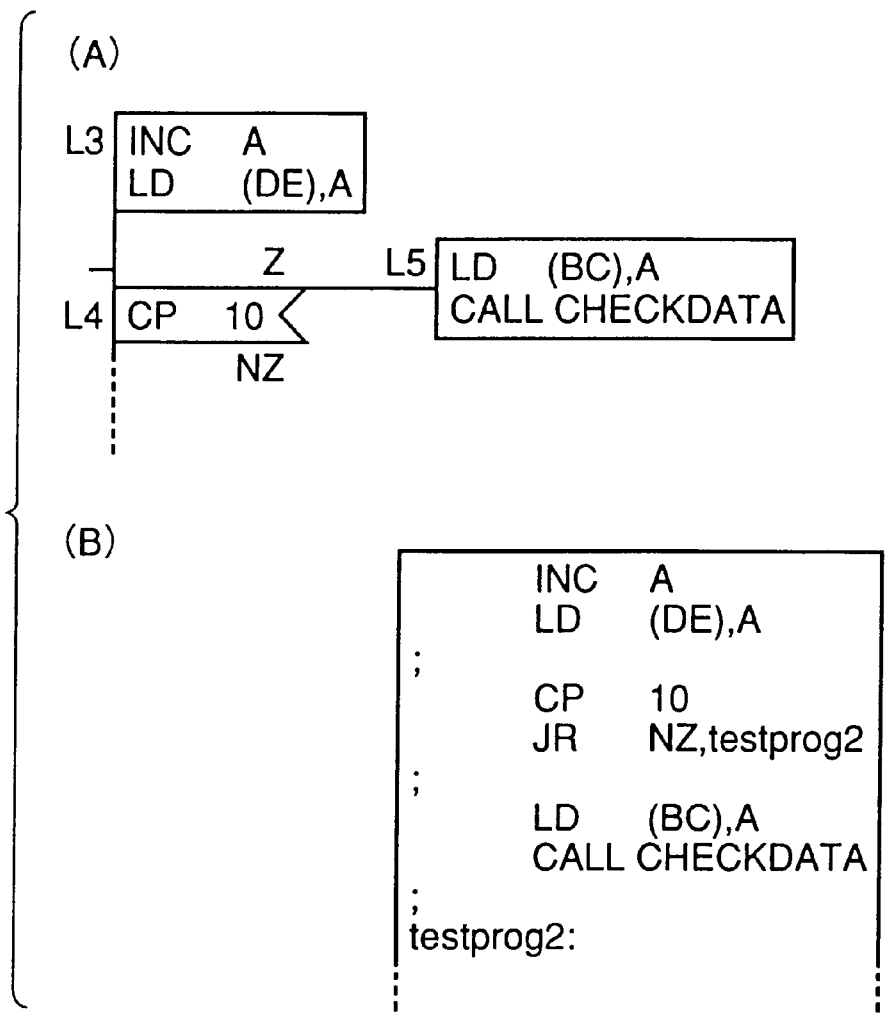

However, this "repeat until" structure contains the tree structures from L3 to L10 shown in FIG. 40 (corresponding to the portion of "source A" at the right portion in FIG. 47), so that a second work buffer is secured, and the chart box analysis processing routine in FIG. 30 is recursively called. The recursively called chart box analysis routine further analyzes the tree structures of these boxes L3–L10, and performs automatic source generation to output the source to the work buffer. An upper portion in FIG. 48 shows a portion of the recursively analyzed chart, and a lower portion in FIG. 48 shows a source analysis result of a portion of the chart output to the work buffer.

In this manner, the assembler sources are automatically generated from the boxes L3–L10 of the tree structure chart, and are sent to the second work buffer. The results are shown at (A) in FIG. 49. FIG. 49 shows, at (B), the assembler source of the whole "repeat until" structure L2 generated in the work buffer. The assembler source at (B) in FIG. 49 is further sent to the source buffer at C18 in FIG. 31.

FIG. 50 shows the assembler source program list which is automatically generated from the tree structure chart shown in FIG. 40 and is output to the source file. This assembler source is the result of conversion of the tree structure chart shown in FIG. 40.

Second Embodiment

The conventional tree structure chart cannot express a difference between the LONG JUMP instruction and the SHORT JUMP instruction. The tree structure chart is extended to include at a portion thereof a clear description for differentiating these instructions from each other so as to clarify where the LONG JUMP instruction is required in the processing. An extended tree structure chart notation achieving the above will now be described below. The second embodiment is employed for generating the assembler source from the tree structure chart thus extended.

In the following embodiment, a source list of a size, over which only the LONG JUMP instruction can jump, is clearly indicated by thick line added to the left end of the source list box as well as an expression of "long" near the box. Referring to FIGS. 51–63, the manner of describing this extended tree structure chart will be described below.

The chart in FIG. 51 shows that only the LONG JUMP instruction can jump over the chart B structure in the "if then else" structure. Also, it shows that, since only the LONG JUMP instruction can jump over the chart B structure, only the LONG JUMP instruction can jump over the whole "if then else" structure. A storage format for storing this chart as a graphical file is shown at a lower portion in FIG. 51. In FIG. 52 and the following figures, the storage format of the graphical files corresponding to the respective charts are shown at the lower right positions of the figures.

Figure 53:
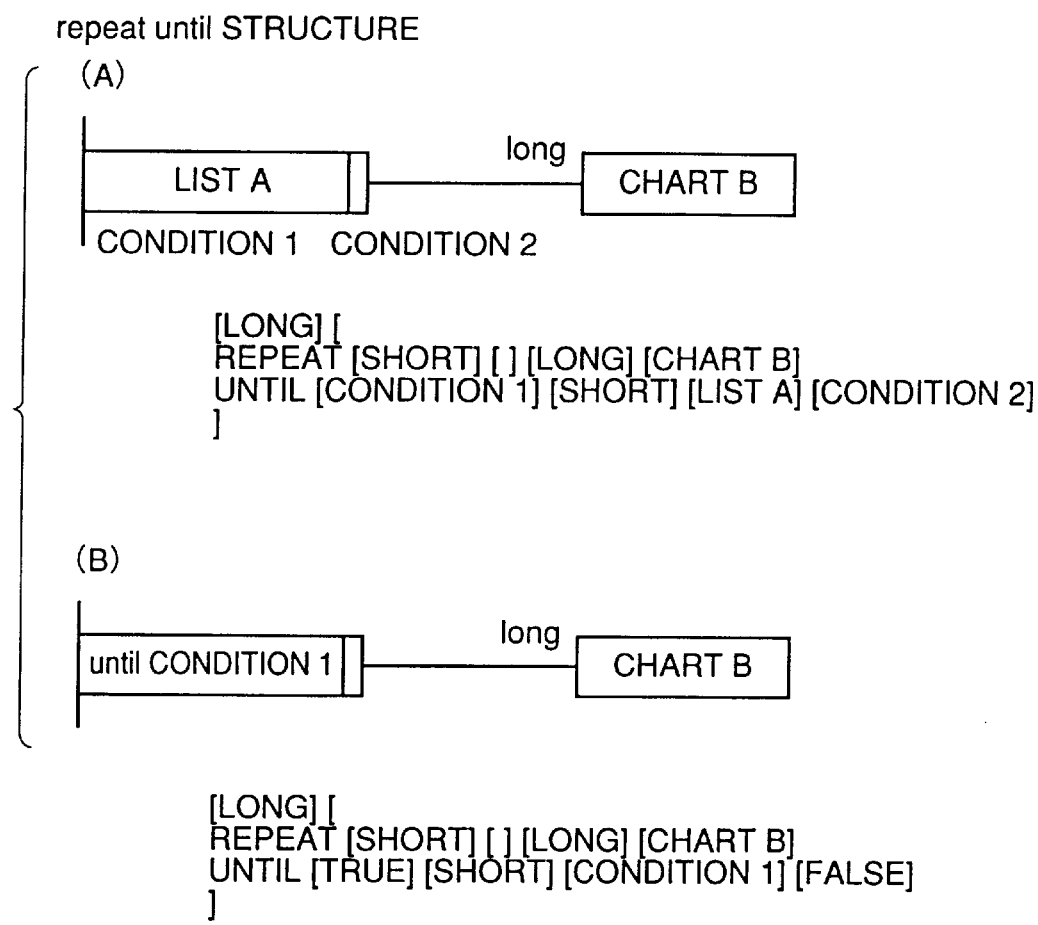
FIG. 53 shows an extended tree structure chart of a "repeat until" structure in the second embodiment.
Figure 54:
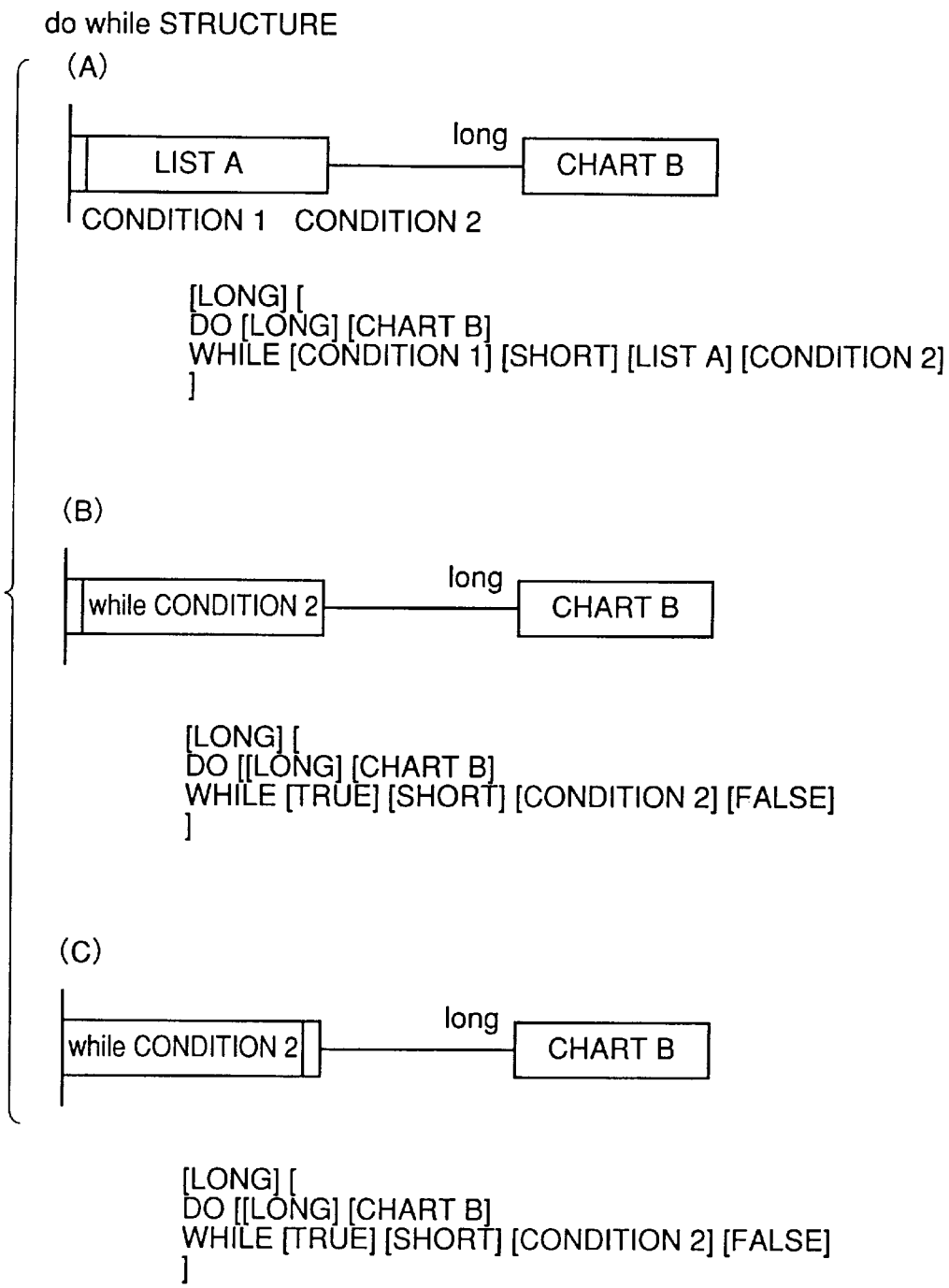
FIG. 54 shows an extended tree structure chart of a "do while" structure in the second embodiment.

Both of (A) and (B) in FIG. 52 show that only the LONG JUMP instruction can jump over the chart B structure in the "if then" structure and thus the whole "if then" structure. The tree structure chart at (A) and (B) in FIG. 53 show that only the LONG JUMP instruction can jump over the chart B structure in the "repeat until" structure. The tree structure charts at (A), (B) and (C) in FIG. 54 show that only the LONG JUMP instruction can jump over the chart B structure in the "do while" structure and thus the whole "do while" structure.

Figure 55:
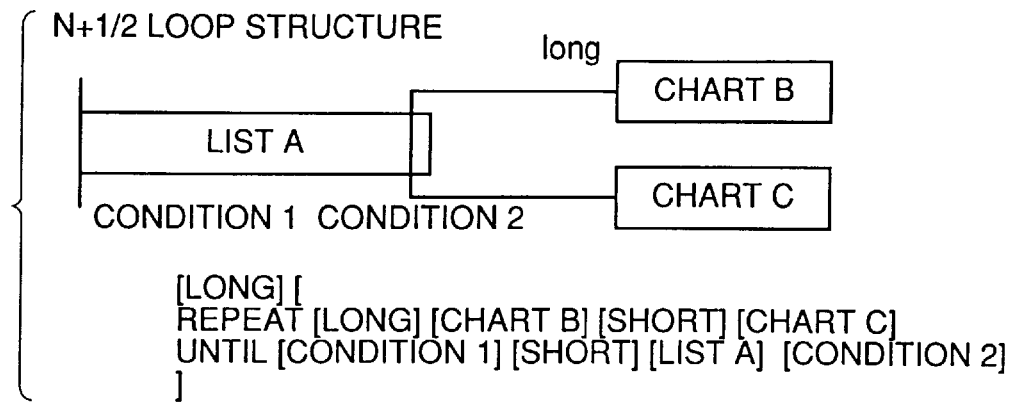
FIGS. 55–60 show extended tree structure charts of an "N+½" structure in the second embodiment.
Figure 56:
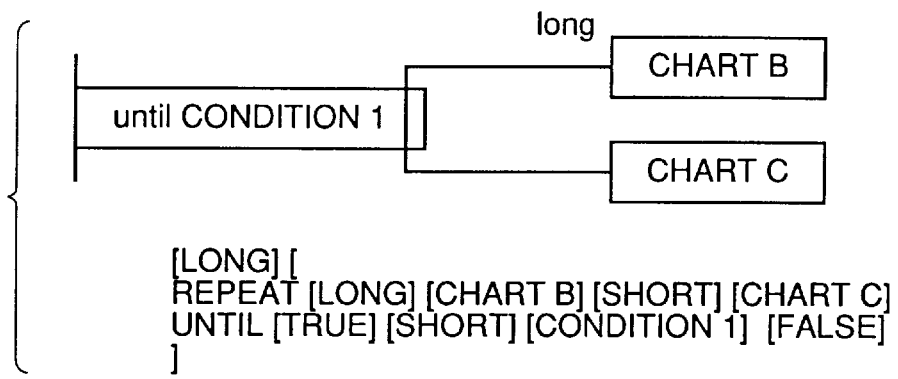
Figure 57:
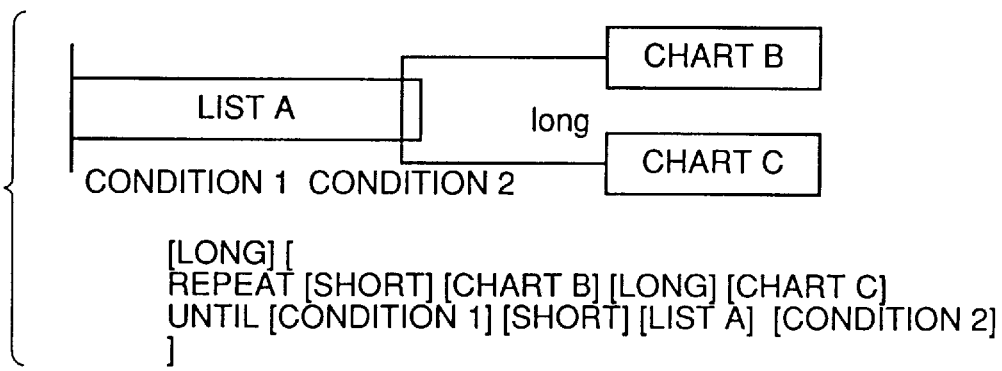
Figure 58:
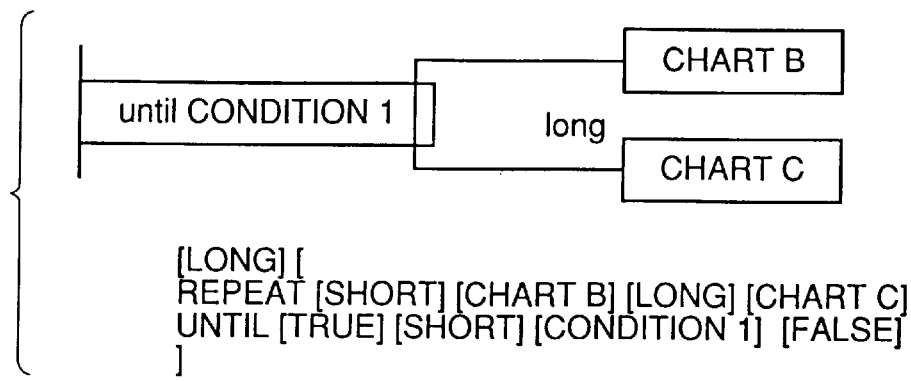
Figure 59:
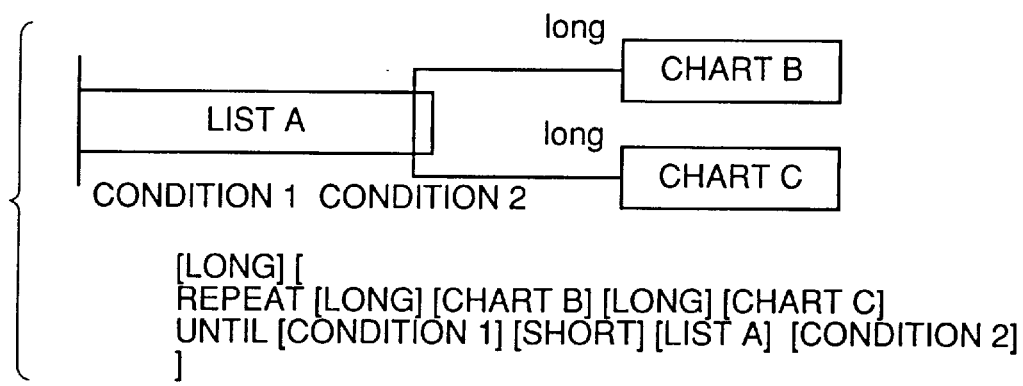
Figure 60:
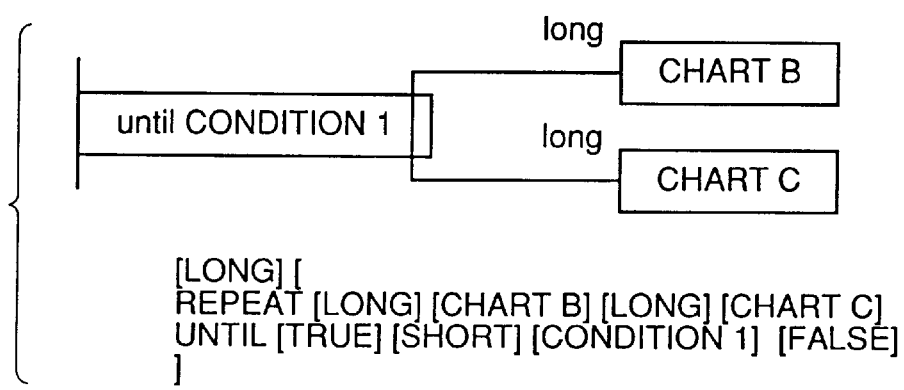

All the FIGS. 55–60 relate to an "N+½" structure. In particular, FIGS. 55 and 56 show that only the LONG JUMP instruction can jump over the chart B structure and thus the whole "N+½" structure. FIGS. 57 and 58 show that only the LONG JUMP instruction can jump over the chart C structure and thus the whole "N+½" structure. FIGS. 59 and 60 show that only the LONG JUMP instruction can jump over the chart B structure, the chart C structure and thus the whole "N+½" structure.

FIG. 61 shows a chart representing the jump structure itself, and more specifically shows that the jump instruction used therein is the LONG JUMP instruction. FIG. 62 shows a description of the label structure, but the LONG JUMP is not specified in the label structure. FIG. 63 shows a chart of sequential processing. In the chart of the sequential processing, thick line is used at the left end of the box, and characters of "long" are mentioned at its left side so as to represent that only the LONG JUMP instruction can jump over the list A.

As described above, the LONG JUMP instruction and the SHORT JUMP instruction are differentiated from each other according to the description of the extended tree structure chart, and the assembler source list is generated from this chart with reference to a table, of which format is shown in FIG. 64. A table 430 shown in FIG. 64 corresponds to table 400 (FIG. 15) used in the first embodiment, but additionally contains information relating to the LONG JUMP instruction and SHORT JUMP instruction.

In table 400 of the first embodiment, the assembler jump instruction corresponding to condition 1=true is represented by character string 1 as can be seen at 4th line. In this second embodiment, however, items of the assembler jump instructions are increased to two in number. As can be seen at 4th line in FIG. 64, it is determined that two strings, i.e., character strings 1 and 4 are defined as the assembler jump instructions corresponding to condition 1=true. Character string 1 is an assembler SHORT JUMP instruction corresponding to condition 1=true, and character string 4 is an assembler LONG JUMP instruction corresponding to condition 1=true.

At 5th line in FIG. 64, the assembler SHORT JUMP instruction corresponding to condition 2=true equivalent to condition 1=false is defined by a character string 2, and the assembler LONG JUMP instruction corresponding to the same is defined by a character string 5. At 6th line, the assembler SHORT JUMP instruction for unconditional jump is defined by character string 3, and the assembler LONG JUMP instruction for the same is defined by character string 6.

In this manner, the SHORT JUMP instruction and the LONG JUMP instruction are defined in the table as the assembler jump instructions corresponding to "a certain condition=true", whereby the assembler LONG JUMP instruction and SHORT JUMP instruction can be easily obtained in accordance with the results of various types of condition determination.

General-purpose source program generation rules, which are required for generating the assembler source program appropriately using the LONG JUMP instructions and SHORT JUMP instructions for various kinds of CPUs, can be obtained from the extended tree structure chart, which allows differentiation between the LONG JUMP instruction and SHORT JUMP instruction as shown in FIGS. 51–63, with reference to table 430 shown in FIG. 64. These general-purpose assembler source program generation rules (algorithm) will be described below. The assembler source program generation rules which will be described below are based on the automatic generation rules for a series of source programs used in the first embodiment, and are additionally adapted to take into consideration the differentiation between the LONG JUMP instruction and SHORT JUMP instruction peculiar to the assembler language.

FIGS. 65–79 show the automatic generation rules used in the device of the second embodiment together with the corresponding tree structure charts and the flowcharts equivalent to the respective tree structure charts. In these figures, description of "condition 1 SHORT JUMP instruction present" means that a jump instruction performing SHORT JUMP with "condition 1=true" is present.

"Condition 1 SHORT JUMP instruction absent" means that a jump instruction performing SHORT JUMP with "condition 1=true" is not present.

"Condition 2 JUMP instruction absent" means that neither SHORT JUMP instruction nor LONG JUMP instruction performing JUMP with "condition 2=true" is not present. In the case where "condition 1 SHORT JUMP instruction absent" and "condition 2 LONG JUMP instruction present" are mentioned in one generation rule, this means that this generation rule can be applied to the case where both the conditions are under AND condition. Thus, the foregoing condition means that "the jump instruction performing SHORT JUMP with condition 1=true is absent, and the jump instruction performing LONG JUMP with condition 2=true is present".

If a plurality of generation rules are defined in one chart, the application priority increases in the alphabetic order of added characters in the figure The purpose of this is to assign a higher priority to the rule which reduces a line number and a byte number of the generated assembler source program. For example, among generation rules (C)–(F) in FIG. 65, (C) is first applied. If the condition is not satisfied, (D) is applied. If neither (C) nor (D) is not satisfied, (E) is applied. If (E) is not satisfied, (F) is applied. In this manner, the generation rules are alphabetically applied.

Figure 65:
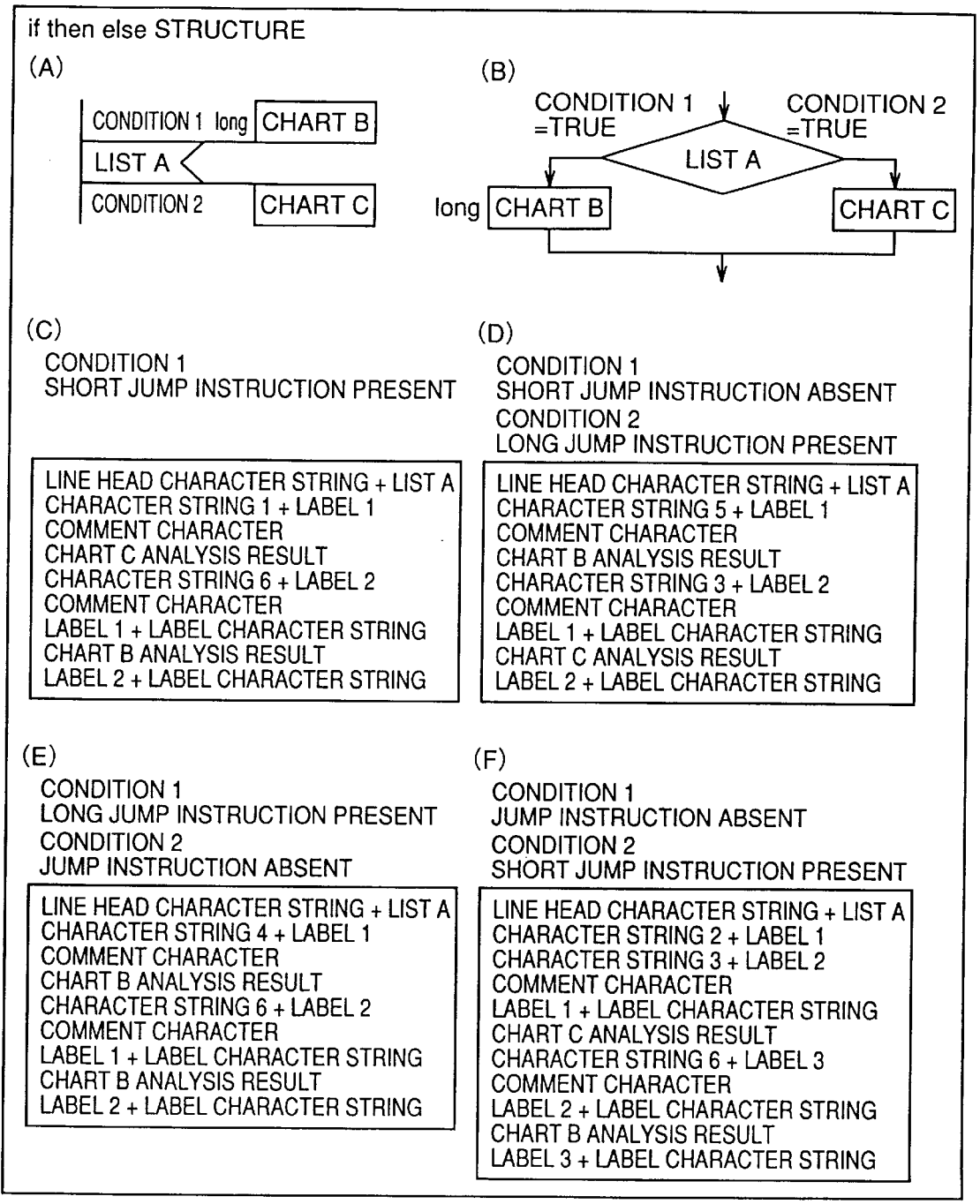
FIG. 65 shows rules of automatic generation of an assembler source program from an "if then else" structure in the second embodiment.

FIG. 65 shows automatic source generation rules corresponding to an "if then else" structure. Rules at (A) in FIG. 65 correspond to the tree structure chart in FIG. 51, and is equivalent to a flowchart at (B) in FIG. 65. In accordance with presence and absence of a SHORT JUMP instruction and a LONG JUMP instruction corresponding to condition 1=true as well as a SHORT JUMP instruction and a LONG JUMP instruction corresponding to condition 2=true, the assembler source is automatically generated with the automatic source generation rules shown at (C)–(F) in FIG. 65.

FIG. 66 shows automatic source generation rules corresponding to an "if then" structure. FIG. 66 shows, at (A), the rules corresponding to (A) in FIG. 52, and FIG. 66 shows, at (B), the rules corresponding to (B) in FIG. 52. These are different from each other only in that the location of processing (chart B), which is executed after condition determination, in the tree structure is varied in order to describe all the variations in the "if then" tree structure. They are algorithmically equal to each other and are equivalent to the flowchart at (C) in FIG. 66. The automatic source generation rules shown at (D)–(G) in FIG. 66 each are applied depending on presence and absence of the SHORT JUMP instruction and the LONG JUMP instruction corresponding to condition 1=true and condition 2=true.

Figure 67:
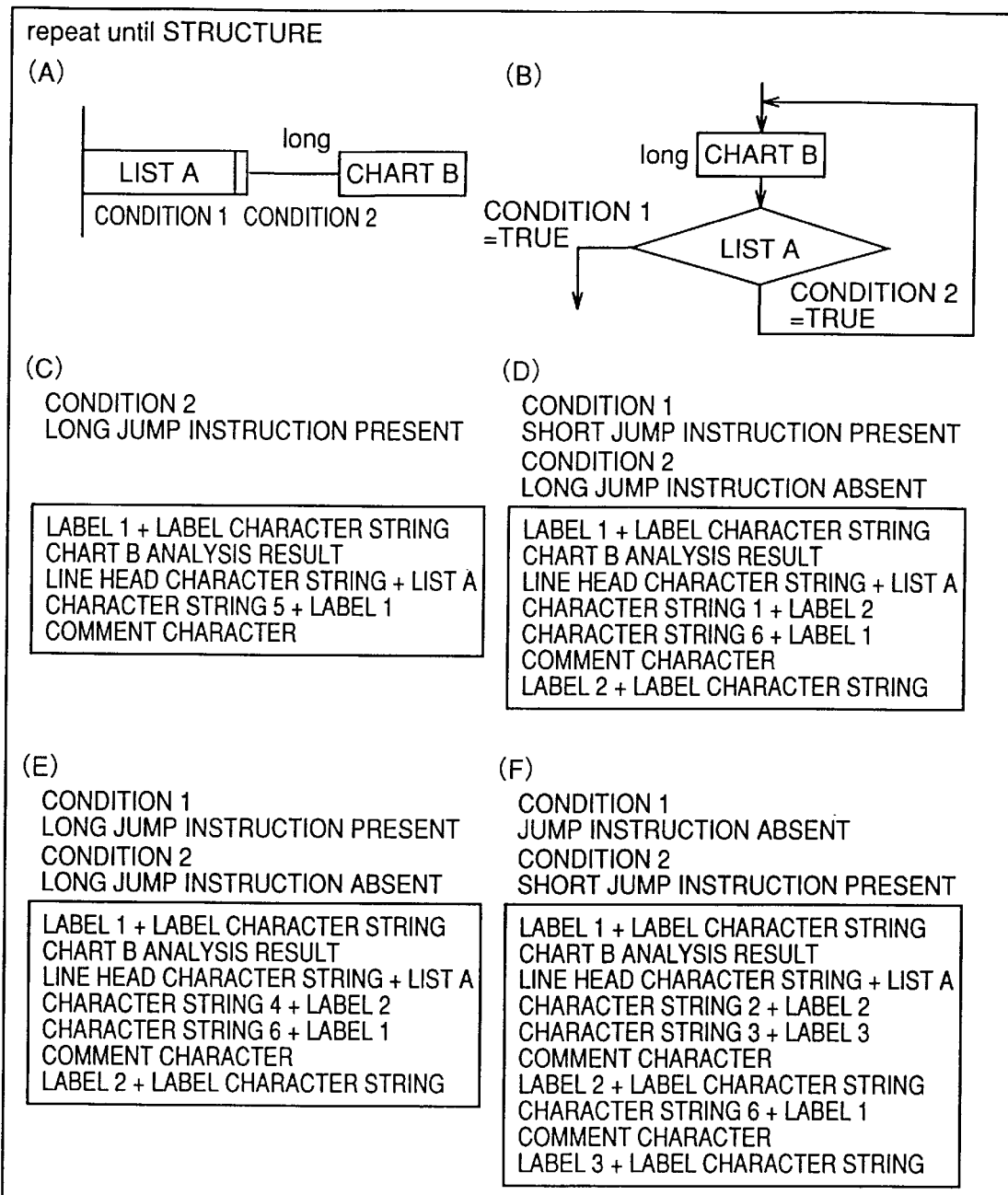
FIGS. 67 and 68 show rules of automatic generation of an assembler source program from a "repeat until" structure in the second embodiment.
Figure 68:
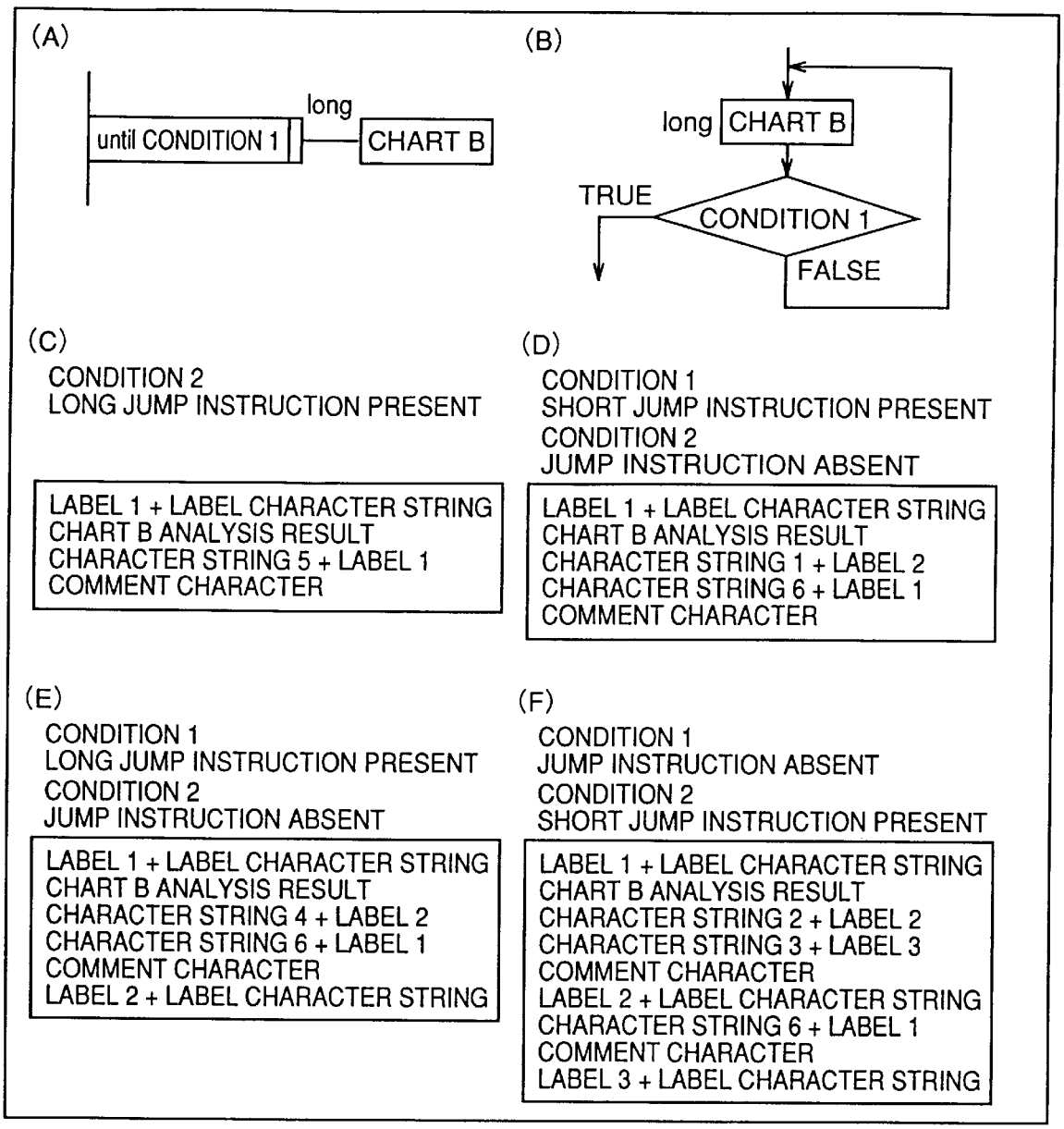

FIGS. 67 and 68 show automatic source generation rules corresponding to a "repeat until" structure. Rules at (A) in FIG. 67 correspond to (A) in FIG. 53, and rules at (A) in FIG. 68 corresponds to (B) in FIG. 53.

The tree structure chart at (A) in FIG. 67 is equivalent to the flowchart at (B) in FIG. 67. The automatic source generation rules at (C)–(F) in FIG. 67 are applied depending on presence and absence of the SHORT JUMP instructions and LONG JUMP instructions corresponding to condition 1=true and condition 2=true, respectively.

The tree structure at (A) in FIG. 68 is equivalent to the flowchart at (B) in FIG. 68. Depending on the presence and absence of the SHORT JUMP instructions and LONG JUMP instructions corresponding to condition 1=true and condition 2=true, respectively, the automatic source generation rules shown at (C)–(F) in FIG. 68 are applied to generate the assembler source automatically.

Figure 69:
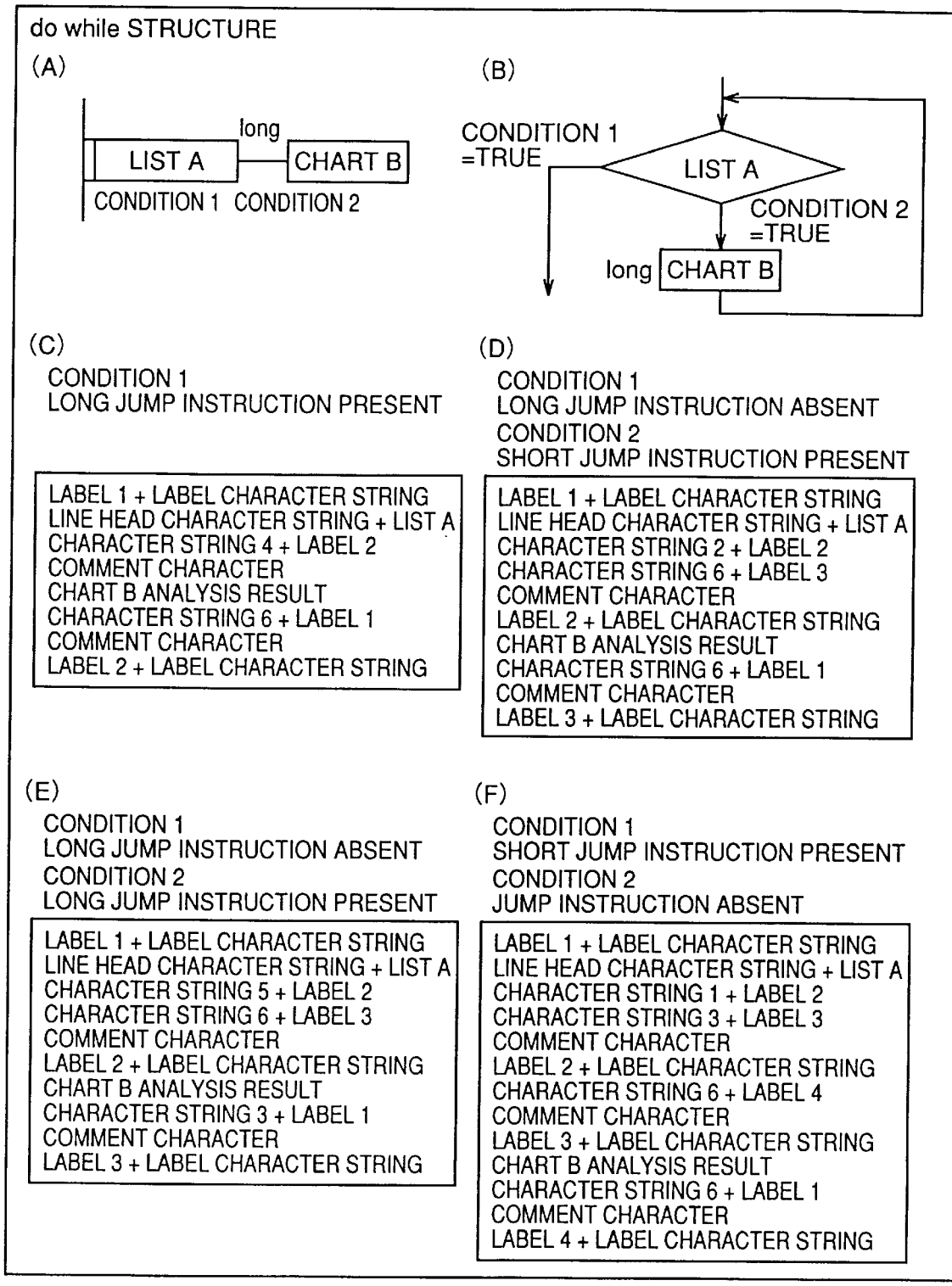
FIGS. 69 and 70 show rules of automatic generation of an assembler source program from a "do while" structure in the second embodiment.
Figure 70:
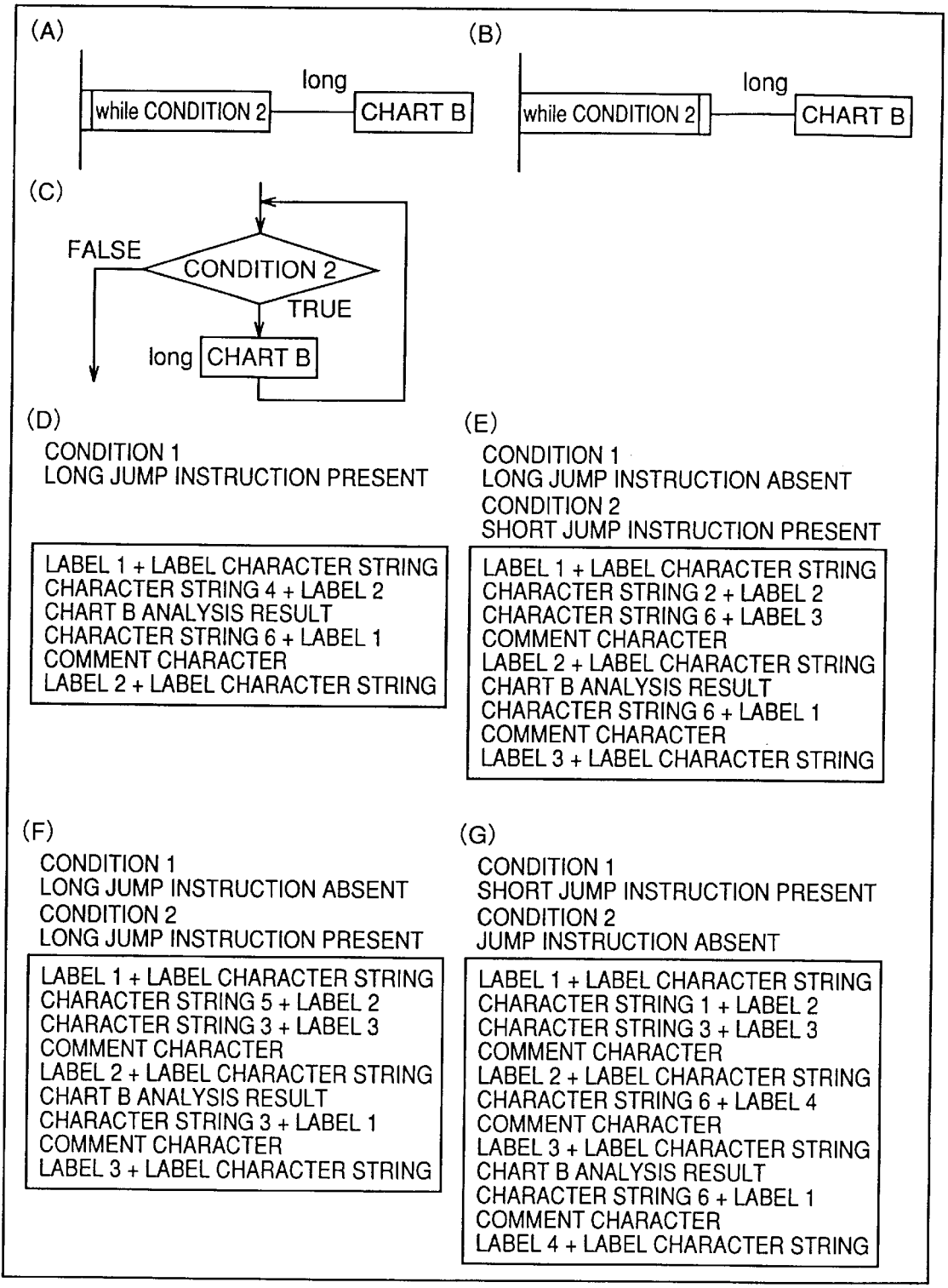

FIGS. 69 and 70 each show automatic source generation rules corresponding to a "do while" structure. Rules at (A) in FIG. 69 corresponds to the tree structure chart at (A) in FIG. 54. (A) and (B) in FIG. 70 correspond to the tree structure charts at (B) and (C) in FIG. 54, respectively.

The tree structure chart at (A) in FIG. 69 is equivalent to the flowchart at (B) in FIG. 69. The "do while" structure at (A) in FIG. 69 internally includes chart B which requires a LONG JUMP instruction for jumping. Depending on presence and absence of the SHORT JUMP instructions and LONG JUMP instructions corresponding to condition 1=true and condition 2=true, the automatic source generation rules shown at (C)–(F) in FIG. 69 are applied to generate the assembler source automatically.

Each of (A) and (B) in FIG. 70 is equivalent to the flowchart shown at (C) in FIG. 70. Depending on presence and absence of the SHORT JUMP instructions and LONG JUMP instructions corresponding to condition 1=true and condition 2=true, the automatic source generation rules shown at (D)–(G) in FIG. 70 are applied to generate automatically the assembler source.

FIGS. 71–76 show automatic source generation rules corresponding to an "N+½" structure.

Figure 71:
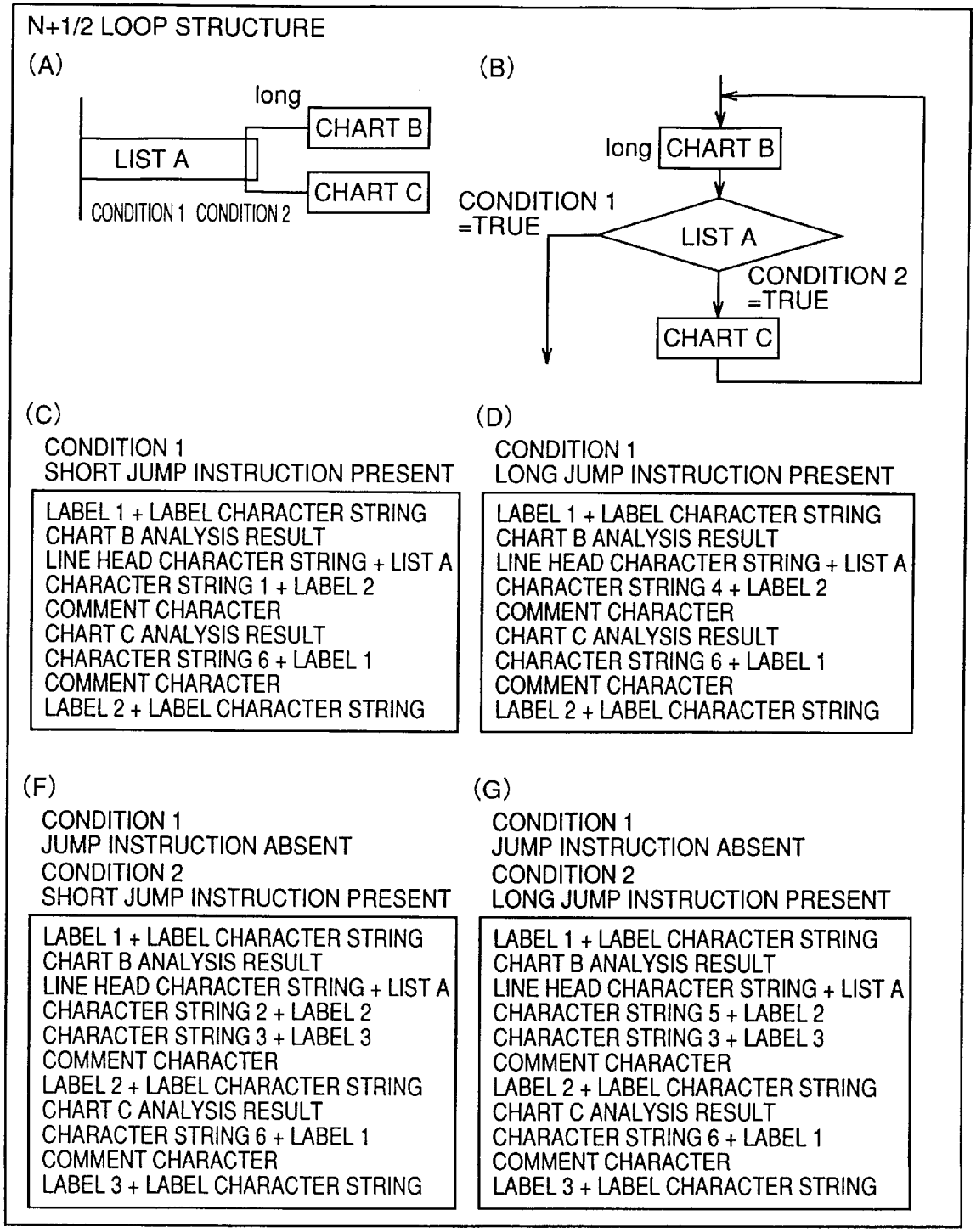
FIGS. 71–76 show rules of automatic generation of an assembler source program from an "N+½" structure in the second embodiment.

The "N+½" structure shown at (A) in FIG. 71 is the structure shown in FIG. 55, and is equivalent to the flowchart shown at (B) in FIG. 71. This "N+½" structure internally includes chart B requiring a LONG JUMP instruction for jumping. Depending on presence and absence of SHORT JUMP instructions and LONG JUMP instructions corresponding to condition 1=true and condition 2=true, the rules at (C)–(F) in FIG. 71 are applied to generate the assembler source automatically.

Figure 72:
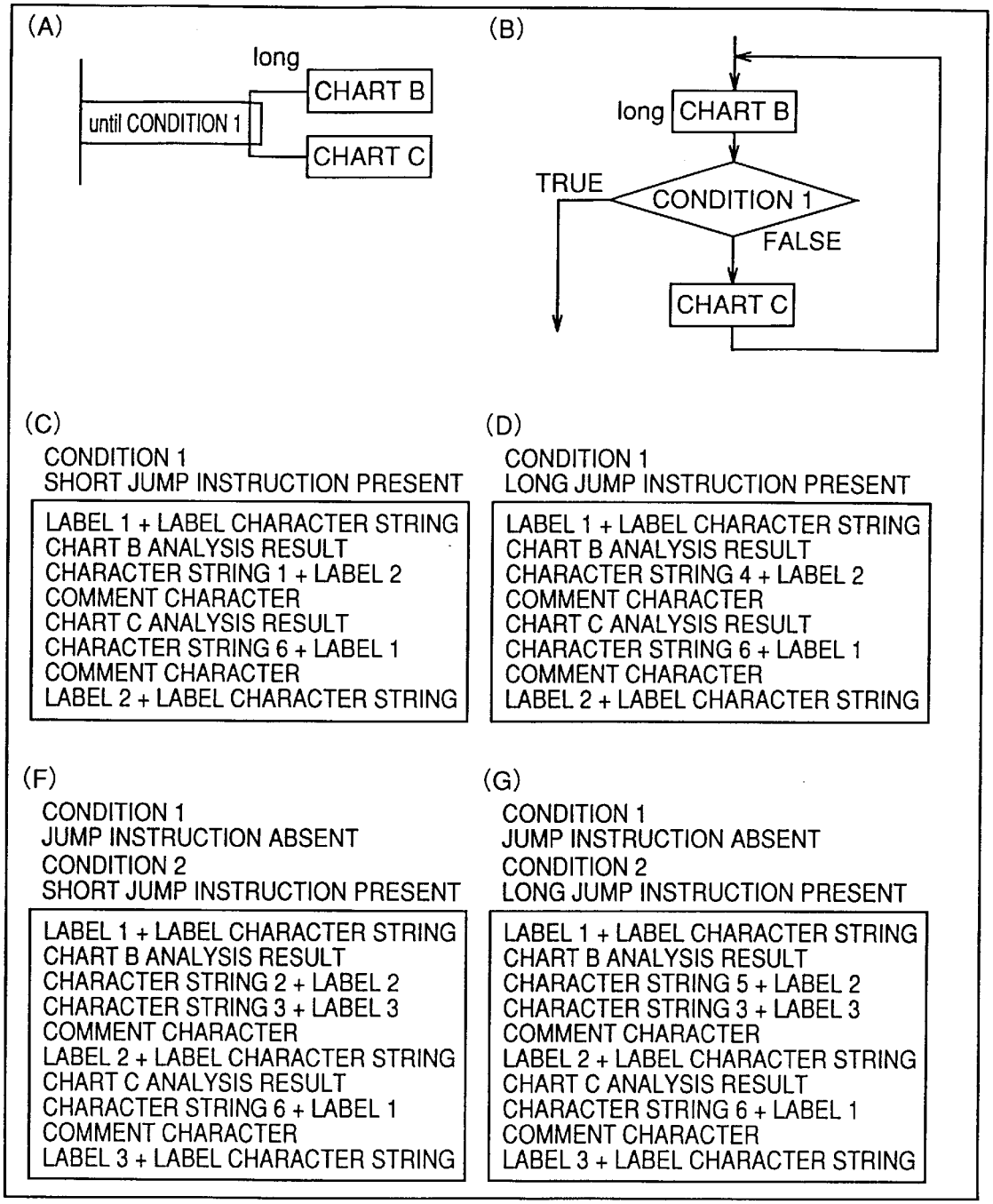

Rules at (A) in FIG. 72 correspond to FIG. 56. This "N+½" structure internally includes chart B requiring a LONG JUMP instruction for jumping, and is equivalent to the flowchart at (B) in FIG. 72. Depending on presence and absence of the SHORT JUMP instructions and LONG JUMP instructions corresponding to condition 1=true and condition 2=true, this structure automatically generates the assembler source by applying the automatic source generation rules shown at (C)–(F) in FIG. 72.

Figure 73:
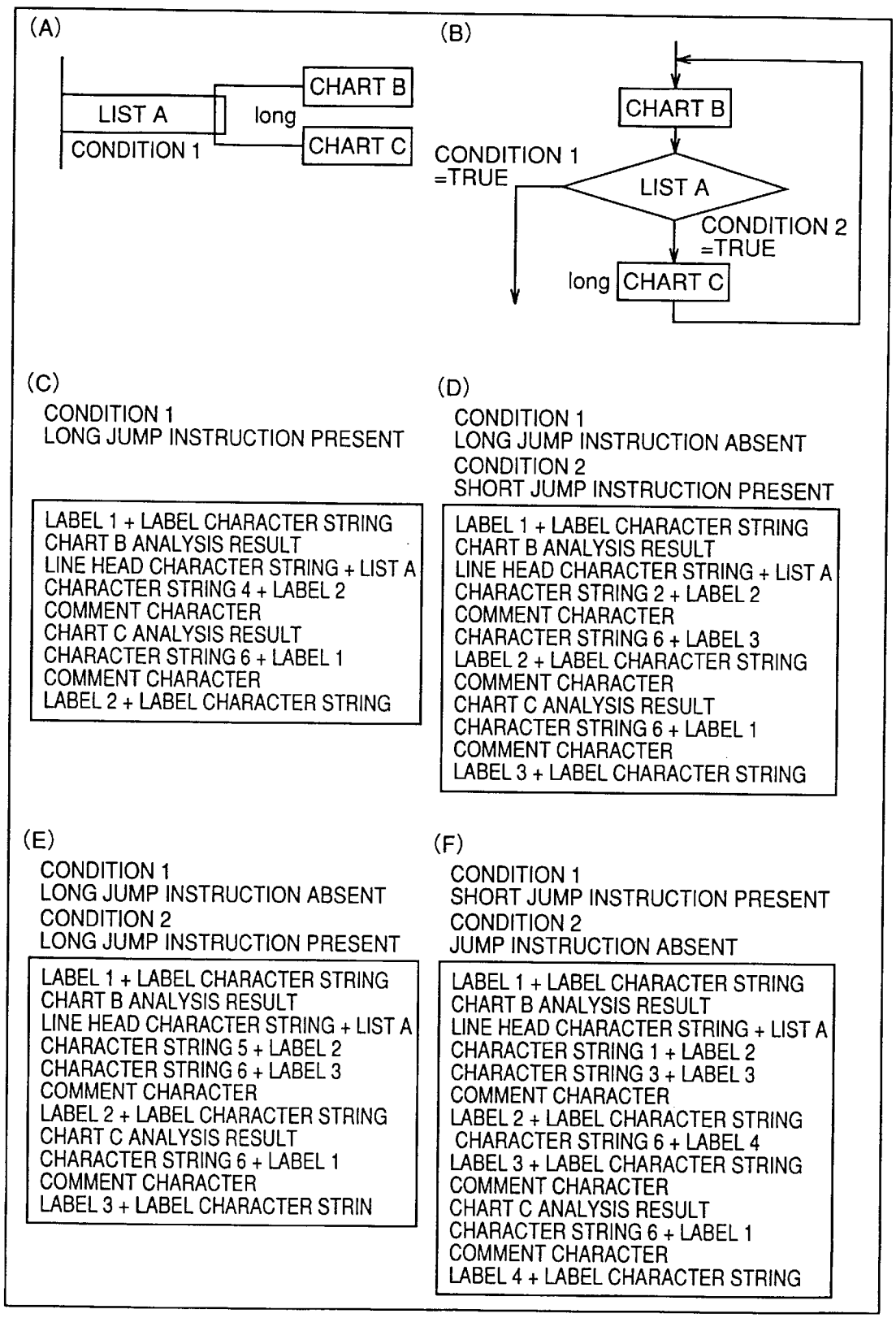

The rules at (A) in FIG. 73 correspond to the "N+½" structure shown in FIG. 57. This "N+½" structure internally includes chart C requiring a LONG JUMP instruction for jumping, and is equivalent to the flowchart at (B) in FIG. 73. Depending on presence and absence of the SHORT JUMP instructions and LONG JUMP instructions corresponding to condition 1=true and condition 2=true, this structure automatically generates the assembler source by applying the automatic source generation rules shown at (C)–(F) in FIG. 73.

Figure 74:
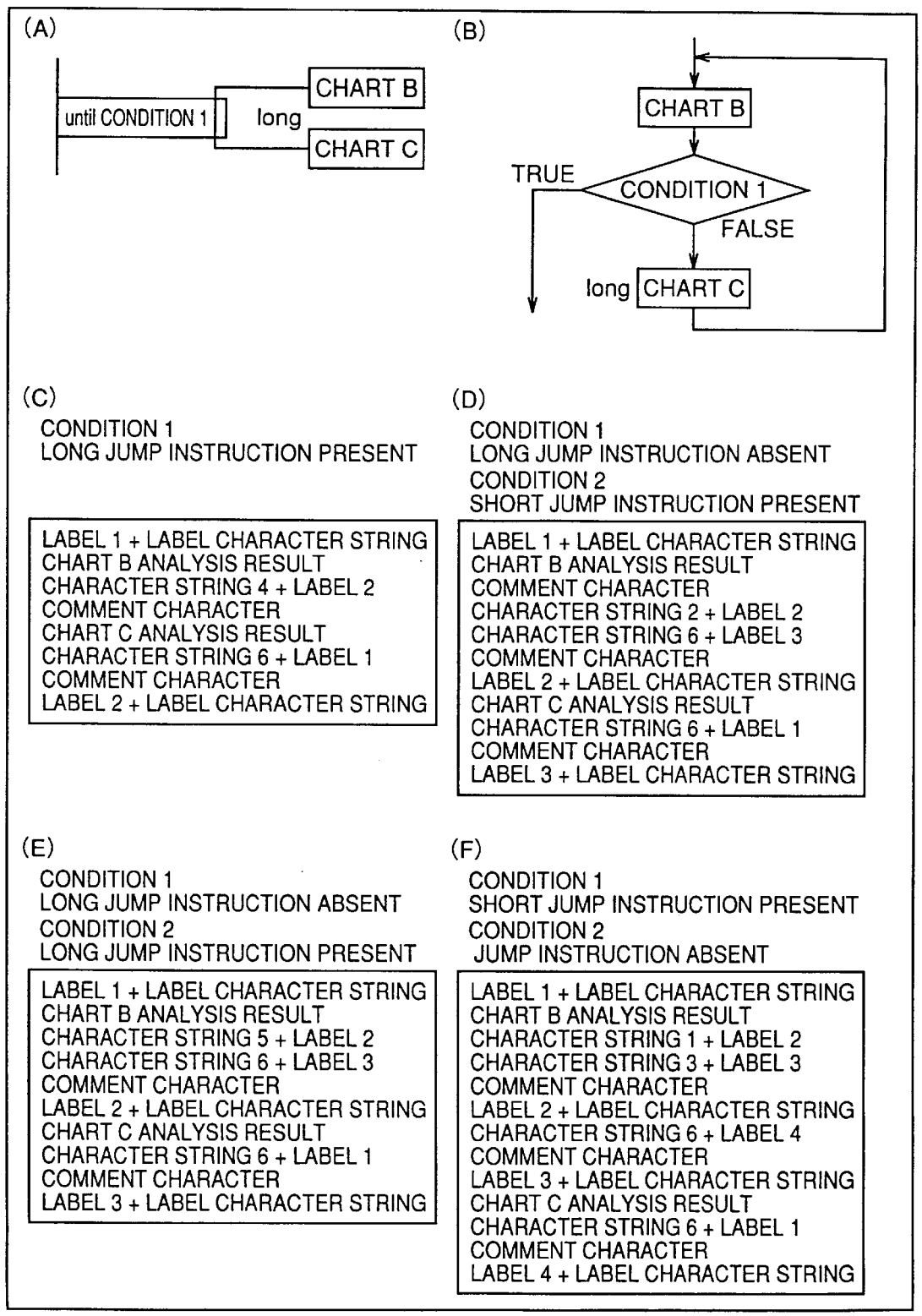

An "N+½" structure shown at (A) in FIG. 74 corresponds to the "N+½" structure shown in FIG. 58. This "N+½" structure internally includes chart C requiring a LONG JUMP instruction for jumping, and is equivalent to the flowchart at (B) in FIG. 74. Depending on presence and absence of the SHORT JUMP instructions and LONG JUMP instructions corresponding to condition 1=true and condition 2=true, this structure automatically generates the assembler source by applying the automatic source generation rules shown at (C)–(F) in FIG. 74.

Figure 75:
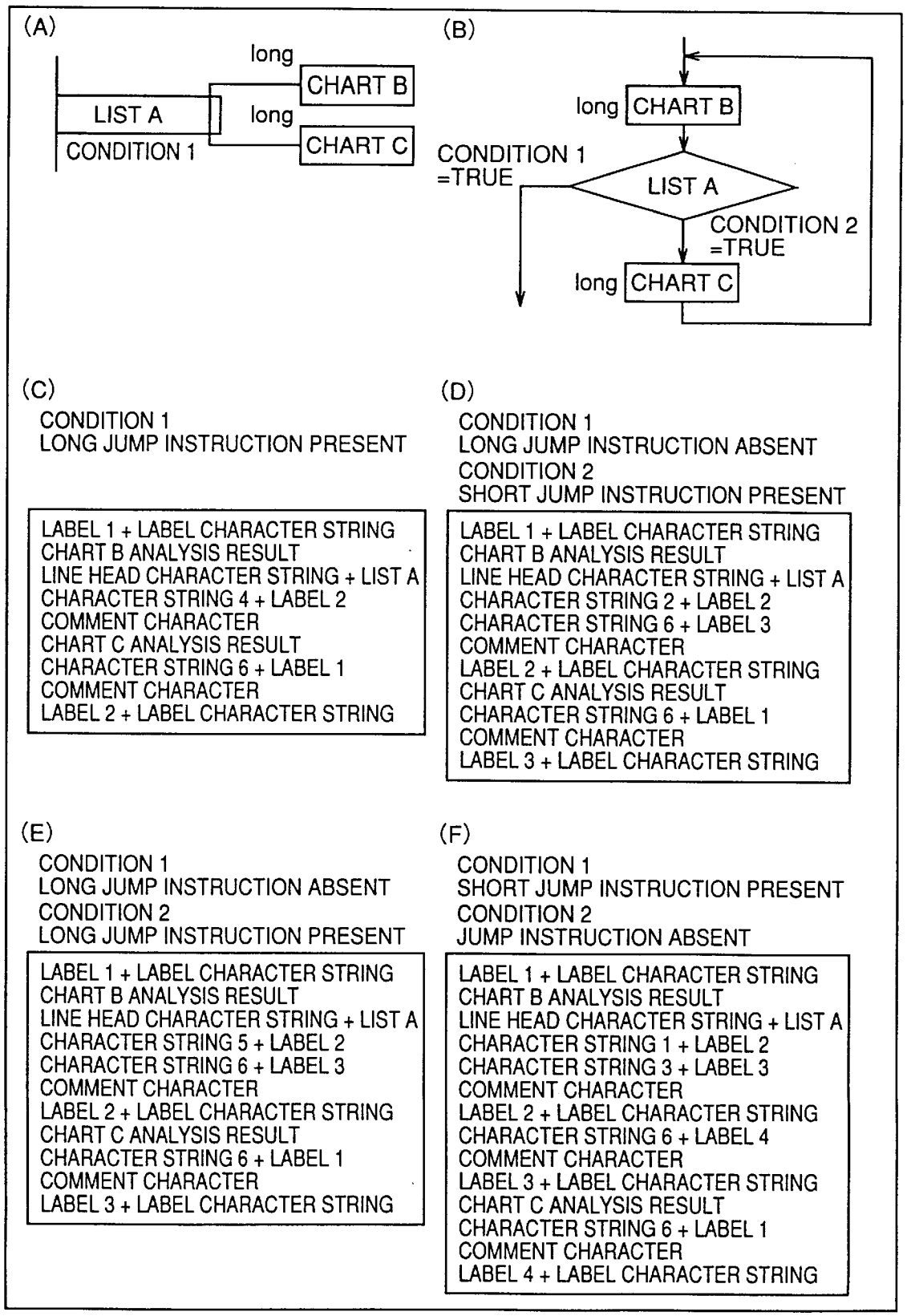

An "N+½" structure shown at (A) in FIG. 75 is that shown in FIG. 59. This structure internally includes charts B and C requiring a LONG JUMP instruction for jumping, and is equivalent to the flowchart at (B) in FIG. 75. Depending on presence and absence of the SHORT JUMP instructions and LONG JUMP instructions corresponding to condition 1=true and condition 2=true, this structure automatically generates the assembler source by applying the automatic source generation rules shown at (C)–(F) in FIG. 75.

Figure 76:
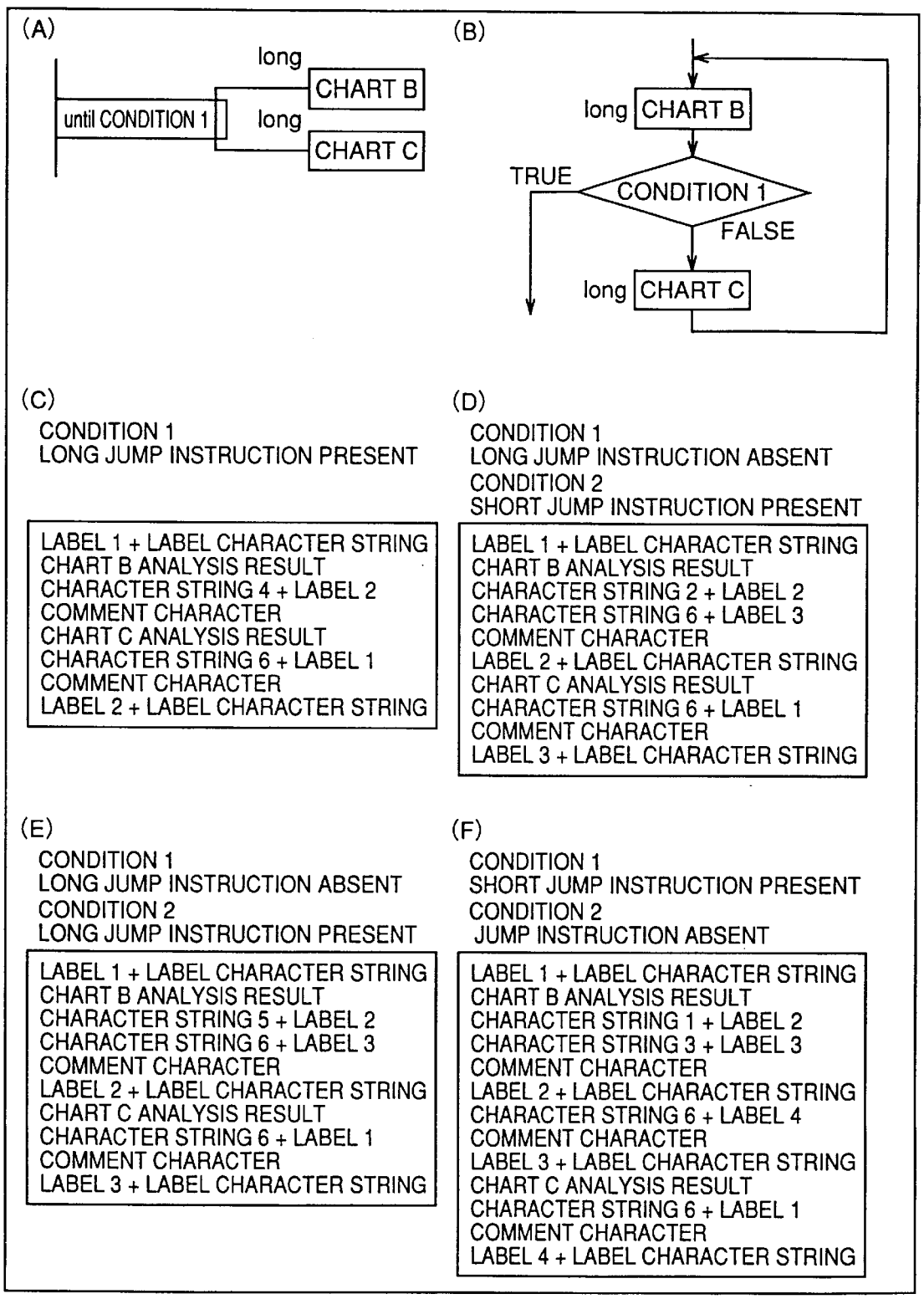

FIG. 76 shows, at (A), an "N+½" structure corresponding to FIG. 60. This "N+½" structure internally includes charts B and C requiring a LONG JUMP instruction for jumping, and is equivalent to the flowchart at (B) in FIG. 76. Depending on presence and absence of the SHORT JUMP instructions and LONG JUMP instructions corresponding to condition 1=true and condition 2=true, this structure automatically generates the assembler source by applying the automatic source generation rules shown at (C)–(F) in FIG. 76.

Figure 77:
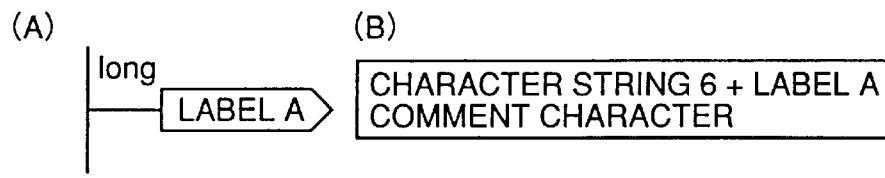
FIG. 77 shows rules of automatic generation of an assembler source program from a jump structure in the second embodiment.

FIG. 77 shows automatic source generation rules for a jump structures. FIG. 77 shows, at (A), the jump structure shown in FIG. 61, and the corresponding source generation output is shown at (B) in FIG. 77. The jump structure itself is represented by one line of assembler instruction, so that a LONG JUMP instruction is not required for jumping over it. However, the jump instruction itself may be a SHORT JUMP instruction or a LONG JUMP instruction. Therefore, as shown at (A) in FIG. 77, the left end of the jump structure box is represented by thick line, which defines that the employed jump instruction is the LONG JUMP instruction. In this case, therefore, as shown at (B) in FIG. 77, the employed jump instruction is character string 6 (see FIG. 64).

Figure 78:
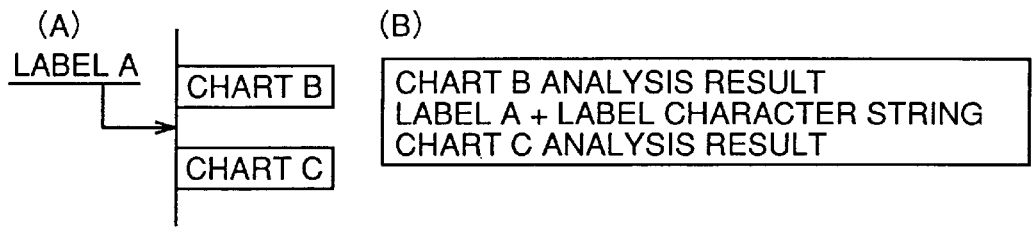
FIG. 78 shows rules of automatic generation of an assembler source program from a label structure in the second embodiment.

FIG. 78 shows automatic source generation rules for a label structure. The label structure does not include a jump instruction. Therefore, there is no difference between the automatic source generation rules shown at (B) in FIG. 78 and the automatic source generation rules in the first embodiment shown at (B) in FIG. 25.

Figure 79:
FIG. 79 shows rules of automatic generation of an assembler source program from a sequential processing structure in the second embodiment.

FIG. 79 shows source generation rules for the sequential processing structure. The automatic source generation rules shown at (B) in FIG. 79 are the same as the generation rules in the first embodiment shown at (B) in FIG. 26. In the case of FIG. 79, however, a LONG JUMP instruction is required for jumping over this sequential processing structure (list A). If a jump instruction for jumping over the sequential processing structure is present, therefore, the jump instruction must be a LONG JUMP instruction.

Figures 80, 81:
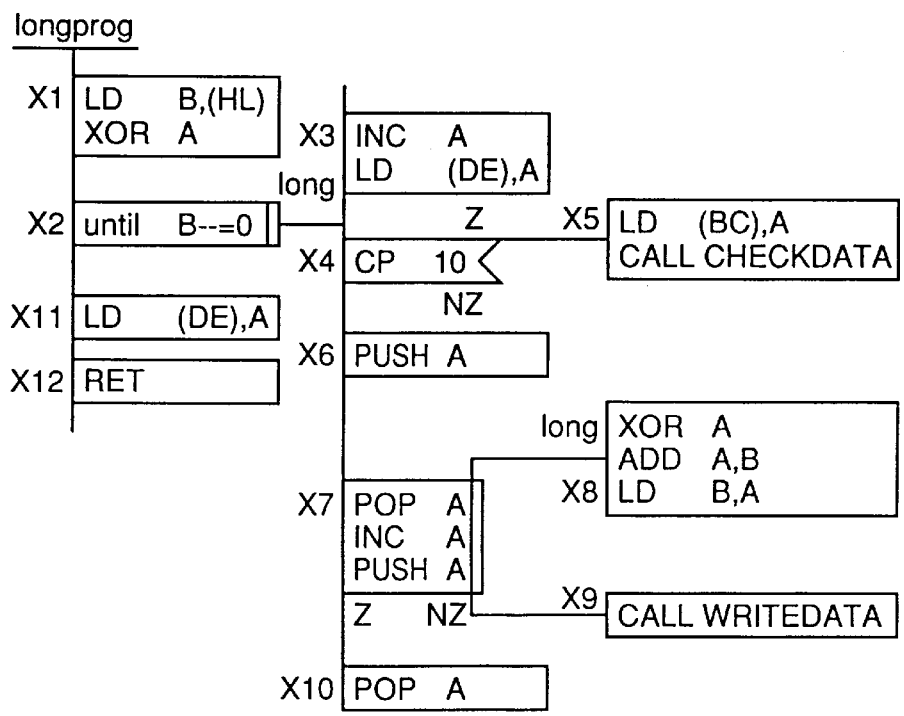
FIG. 80 shows a table actually used in the device of the second embodiment.
FIG. 81 shows an example of a tree structure chart automatically converted into an assembler source program by the device of the second embodiment.

Description will be given on the second embodiment, in which the expression format of the above extended tree structure chart is used for describing the tree structure chart, and this tree structure chart is converted into the assembler source program. As hardware, this second embodiment uses the same one as the first embodiment shown in FIG. 27. However, table 420 in the first embodiment shown in FIG. 28 is replaced with a table 440 shown in FIG. 80. Table 440 shown in FIG. 80 is used for automatically generating the assembler source program for Z-80. If an assembler language source program for another CPU is to be generated, it is necessary to utilize another table corresponding to the intended assembler language.

FIG. 81 shows an example of the tree structure chart which will be converted into assembler source program by the second embodiment. The tree structure chart in FIG. 81 has a chart name of "longprog". A specific example using this tree structure chart will be described later.

Description will now be given on table 440 in FIG. 80. Table 440 is prepared by applying an assembler language expression for Z-80 to a table, of which basic concept is expressed as table 430 shown in FIG. 64. The 1st line in table 440 is a comment line, and is not relevant to the automatic source generation.

The 2nd line is a line head character string inserted to the head of the assembler command line. This embodiment uses a character string " " (eight spaces). The 3rd line is a comment character added to the head of the comment line. This embodiment uses ";". The 4th line defines a character string added after the label in the label line. This embodiment uses ":".

The 5th–15th lines define a SHORT JUMP instruction and a LONG JUMP instruction related to a series of condition branches. More specifically, 5th line defines a SHORT JUMP instruction JR and a LONG JUMP instruction "JP". Since both the condition and opposite condition are defined by null characters, it can be understood that the jump instructions "JR" and "JP" are absolute jump instructions.

The 6th and 7th lines define condition branch instructions related to condition flag "C". Condition "C" and condition "NC" are opposite conditions with respect to each other. If C=true, a SHORT JUMP instruction "JR C," is employed or a LONG JUMP instruction "JP C," is employed. If NC=true, a SHORT JUMP instruction "JR NC," or a LONG JUMP instruction "JP NC," is employed.

The 8th and 9th lines define condition branch instructions related to a condition flag "Z". Condition "Z" and condition "NZ" are opposite conditions with respect to each other. If Z=true, a SHORT JUMP instruction "JR Z," or a LONG JUMP instruction "JP Z," is employed. If NZ=true, a SHORT JUMP instruction "JR NZ," or a LONG JUMP instruction "JP NZ," is employed.

The 10th and 11th lines define condition branch instructions related to condition flags "PO" and "PE". Conditions "PO" and "PE" are opposite conditions with respect to each other. Neither condition determination "PO" nor "PE" has a SHORT JUMP instruction. However, a LONG JUMP instruction can be used as a SHORT JUMP instruction without causing a particular problem, so that a LONG JUMP instruction is defined as a SHORT JUMP instruction for convenience's sake. In this embodiment, it is assumed as follows. If PO=true, both the SHORT JUMP instruction and LONG JUMP instruction employ "JP PO,". If PE=true, both the SHORT JUMP instruction and LONG JUMP instruction employ "JP PE,".

The 12th and 13th lines define a condition branch instruction related to condition flags "P" and "M". Conditions "P" and "M" are opposite conditions with respect to each other. Neither condition determination "P" nor "M" has a SHORT JUMP instruction. However, a LONG JUMP instruction can be used as a SHORT JUMP instruction without causing a particular problem, so that a LONG JUMP instruction is defined as a SHORT JUMP instruction for convenience's sake. In this embodiment, if P=true, both the SHORT JUMP instruction and LONG JUMP instruction employ "JP P,". If M=true, both the SHORT JUMP instruction and LONG JUMP instruction "JP M,".

The 14th and 15th lines define a condition branch instruction related to conditions "B--=0" and "B--< >0". Conditions "B--=0" and "B--< >0" are opposite conditions with respect to each other. Here, the jump instruction corresponding to "B--=0"=true is present neither as a SHORT JUMP instruction nor as a LONG JUMP instruction. If "B--< >0"=true, a SHORT JUMP instruction "DJNZ" is present, but a LONG JUMP instruction is not present. Therefore, when the automatic source generation algorithm refers to a LONG JUMP instruction corresponding to "B--< >0"=true, the automatic generation is interrupted, and an error message is issued. Conditions "B--=0" and "B--< >0" are condition descriptions representing "B--=0=true, if "a value obtained by subtracting 1 from B register of Z-80" is 0, and representing "B--< >0"=true, if not 0.

Figure 82:
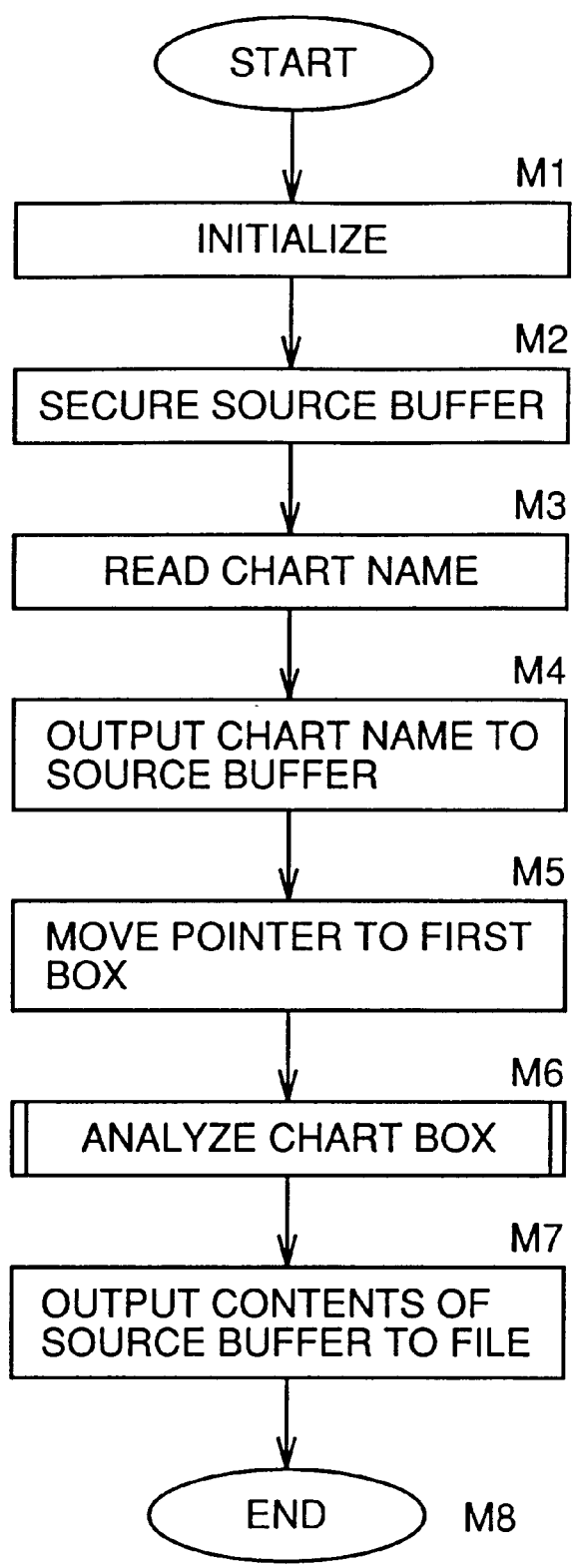
FIG. 82 is a flowchart of a main program of processing for automatically generating an assembler source program in the embodiment of the second embodiment.

In the device of the second embodiment, the assembler source program is automatically generated from the extended tree structure chart containing SHORT JUMP and LONG JUMP descriptions in accordance with specific processing shown in flowcharts of figures starting from FIG. 82. This embodiment has been described in connection with generation of the assembler source program of Z-80. However, table 440 in FIG. 80 may be replaced with another table for another assembler language, whereby a source program for another kind of assembler language may be generated in accordance with the processing in these flowcharts. Processing in FIGS. 83–102 has a structure allowing recursive call, as was the case in the chart box analysis processing of the first embodiment.

FIG. 82 is a flowchart of a main program of automatic generation algorithm. Steps M1–M8 in this flow correspond to steps B1–B8 in the main program of first embodiment shown in FIG. 29, and have the same contents, respectively. Therefore, they will not be described below in detail.

Figure 83:
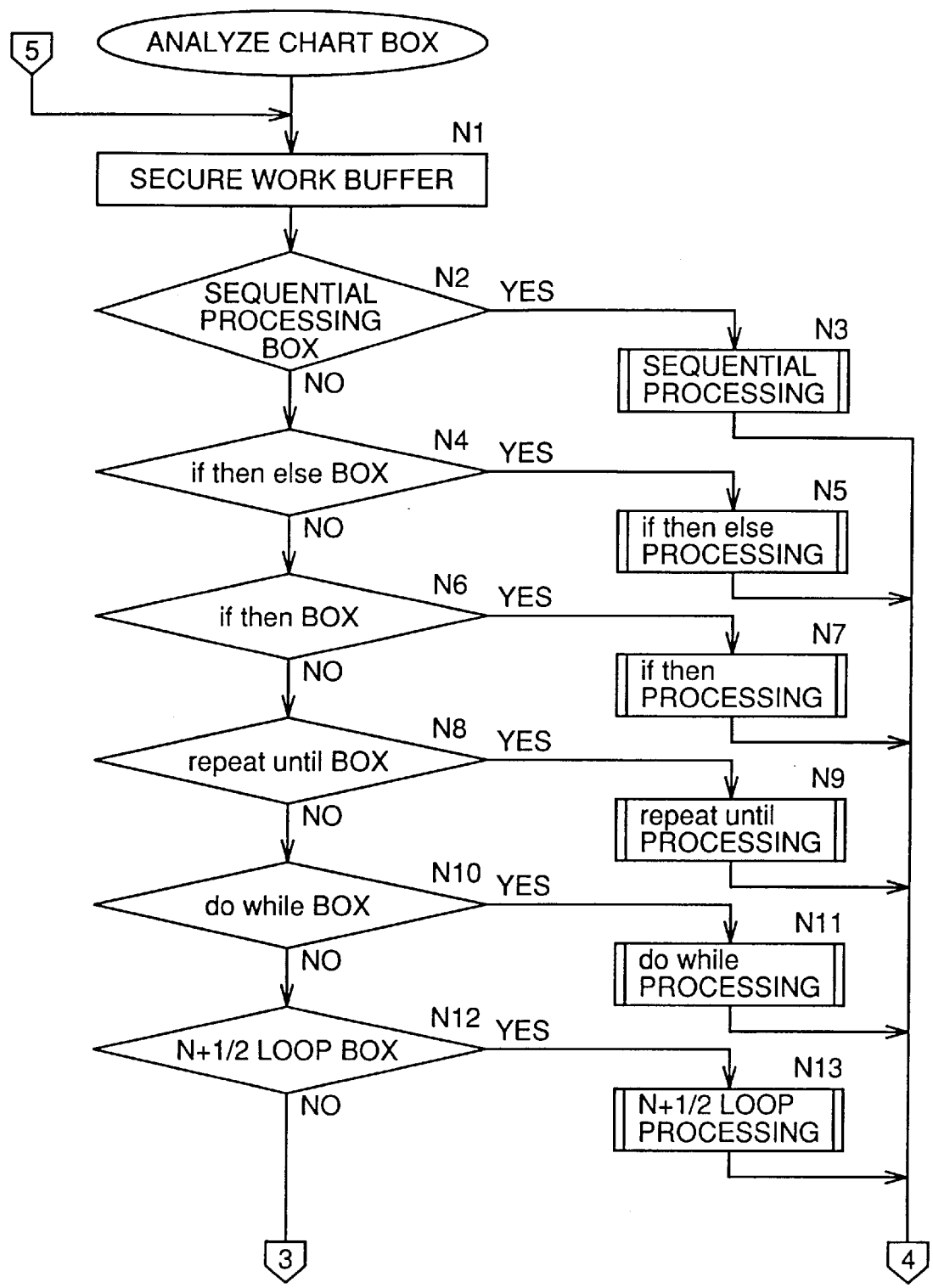
FIGS. 83 and 84 are flowcharts of subroutines of a chart box analysis processing in the second embodiment.
Figure 84:
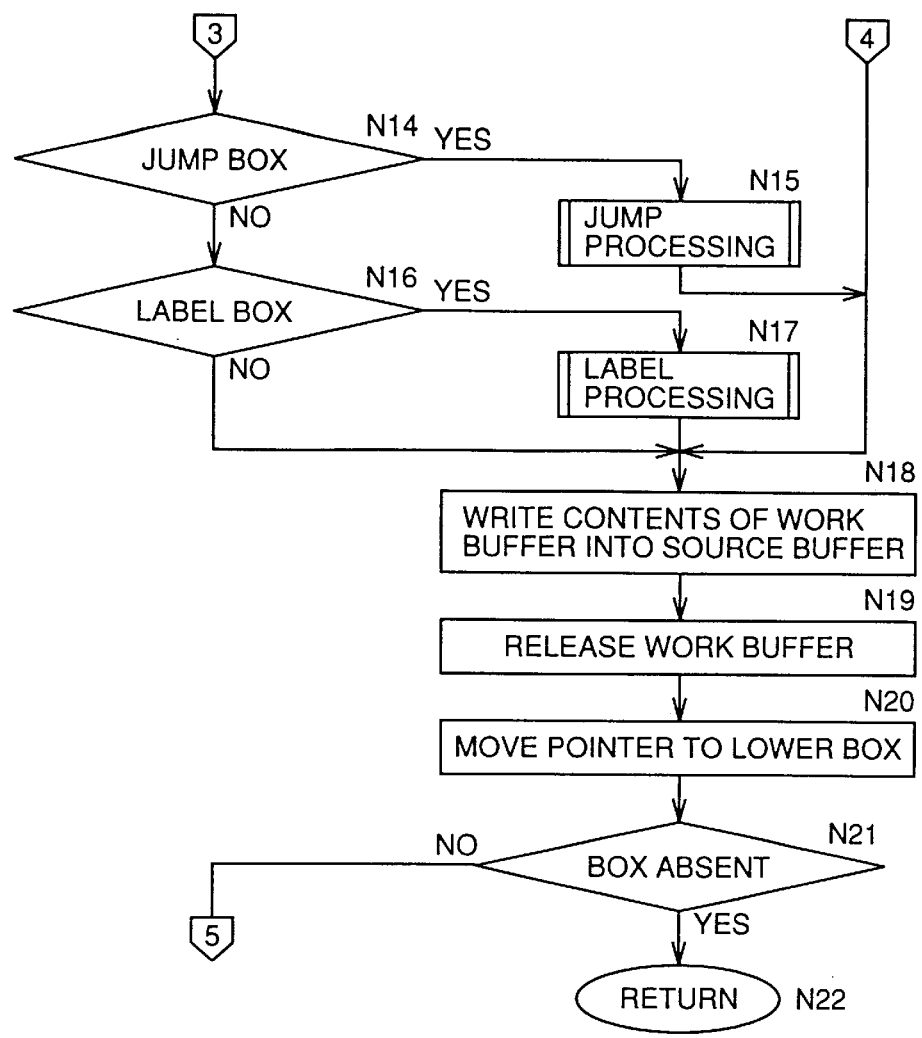

FIGS. 83 and 84 show flowcharts of chart box analysis processing which is a subroutine for actually analyzing the tree structure chart to generate and store the assembler source program in the source buffer. Steps N1–N22 shown in FIGS. 83 and 84 are the same as the steps C1–C22 in the chart box analysis processing of the first embodiment shown in FIGS. 30 and 31, respectively. Therefore, FIGS. 83 and 84 will not be described below in detail.

In this embodiment, the source program can be generated even if the tree structure chart has a LONG JUMP structure. In actual programming, a majority of tree structures include only SHORT JUMP instructions in many cases. For the automatic generation rules of the assembler program in the case where only SHORT JUMP instructions are used, the processing shown in the flowcharts used in the first embodiment can be used as it is. In this description, therefore, if a LONG JUMP is not present in the tree structure, the automatic generation rules for the corresponding structure which is already described in the first embodiment are utilized. In this case, the interpretation of each generation rule in the first embodiment is also used.

Figure 85:
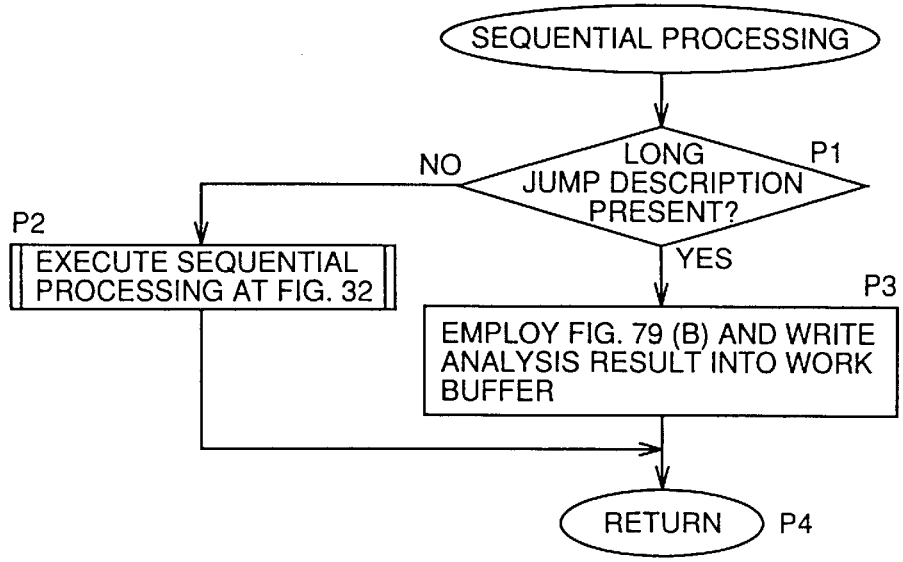
FIG. 85 is a flowchart of a subroutine of automatic generation processing of the assembler source program from the sequential processing structure in the second embodiment.

FIG. 85 shows a flowchart of subroutine processing for converting the sequential processing structure called at step N3 in the chart box analysis processing in FIG. 83 into the assembler source program. At step P1, it is determined whether a LONG JUMP description is present in the target sequential processing box or not. If there is no LONG JUMP description, the control advances to P2, and assembler source program generation processing for the case where only the SHORT JUMP is present as shown in FIG. 32 is executed. If the LONG JUMP description is present, the control advances to P3. At P3, the generation rules at (B) in FIG. 79 are employed to generate and write the assembler source program into the work buffer. After step P2 or P3, the control advances to P4, and the subroutine is finished.

Figure 86:
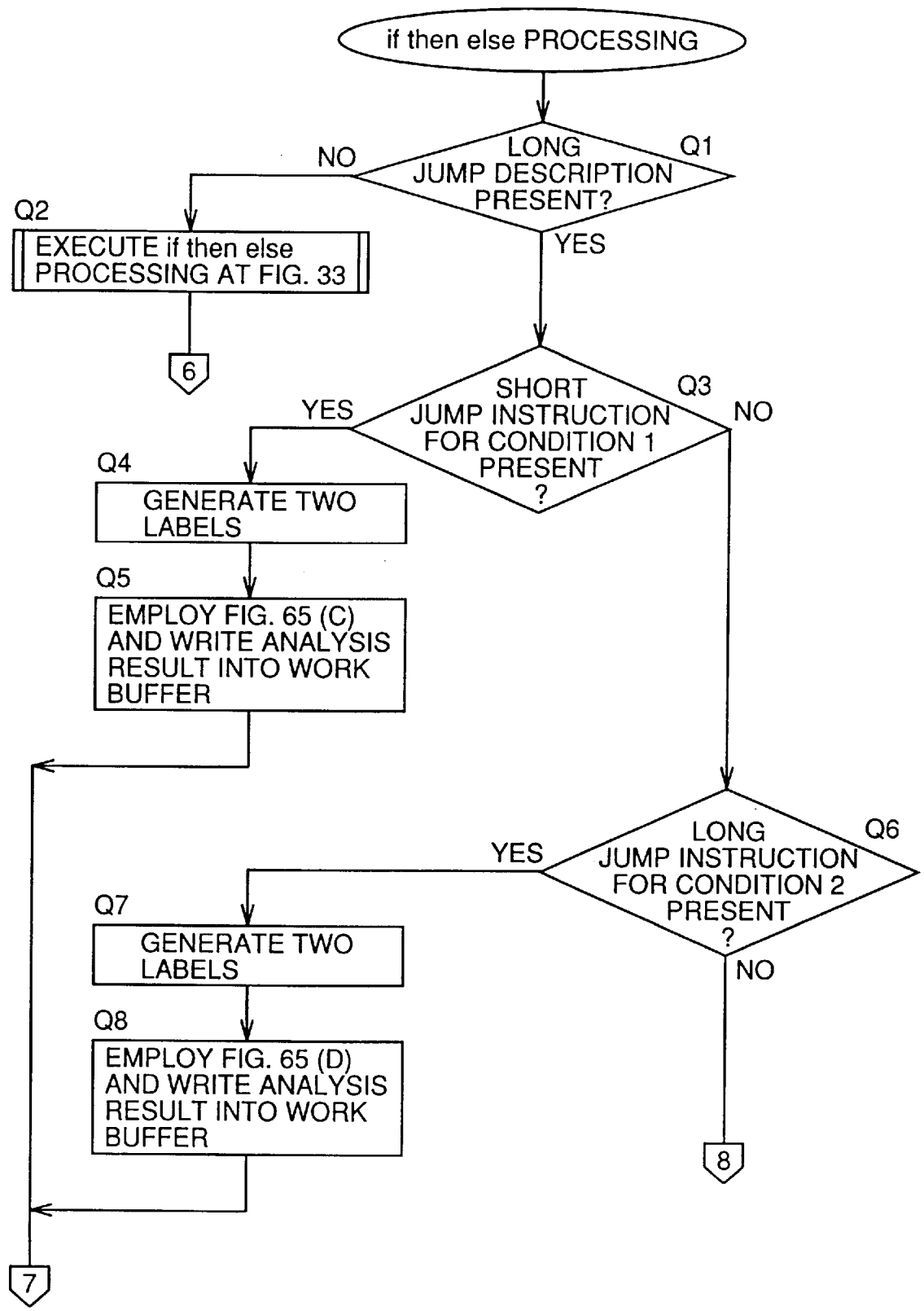
FIGS. 86 and 87 are flowcharts of subroutines of processing for automatically generating an assembler source program from an "if then else" structure in the second embodiment.

FIG. 86 is a flowchart showing subroutine processing for converting the "if then else" structure called at step N5 in FIG. 83 into the assembler source program. First, at step Q1, it is determined whether a LONG JUMP description is present in the target "if then else" structure or not. If there is no LONG JUMP description, the control advances to step Q2, and the assembler source program generation processing for the case where only the SHORT JUMP is present as shown in FIG. 33 is executed, and the control advances to step Q14 for finishing the processing.

If it is determined at Q1 that the LONG JUMP description is present, the control advances to Q3. At Q3, it is determined whether a SHORT JUMP instruction corresponding to condition 1=true is present or not. If a SHORT JUMP instruction corresponding to condition 1=true is present, the control advances to Q4. At Q4, two new label names which will be used later at step Q5 are generated. At Q5, the automatic generation rules shown at (C) in FIG. 65 are employed to generate and write the assembler source program into the work buffer. Then, the control advances to step Q14 in FIG. 87, and the subroutine is finished.

If it is determined at step Q3 that the SHORT JUMP instruction corresponding to condition 1=true is not present 3, the control advances to step Q6. At Q6, it is determined whether a LONG JUMP instruction corresponding to condition 2=true is present or not. If the LONG JUMP instruction corresponding to condition 2=true is present, the control advances to Q7. At Q7, two new label names which will be used later are generated. At Q8, the automatic generation rules shown at (D) in FIG. 65 are employed to generate and write the assembler source program into the work buffer, and then the control advances to Q14 in FIG. 87 for finishing the processing.

Figure 87:
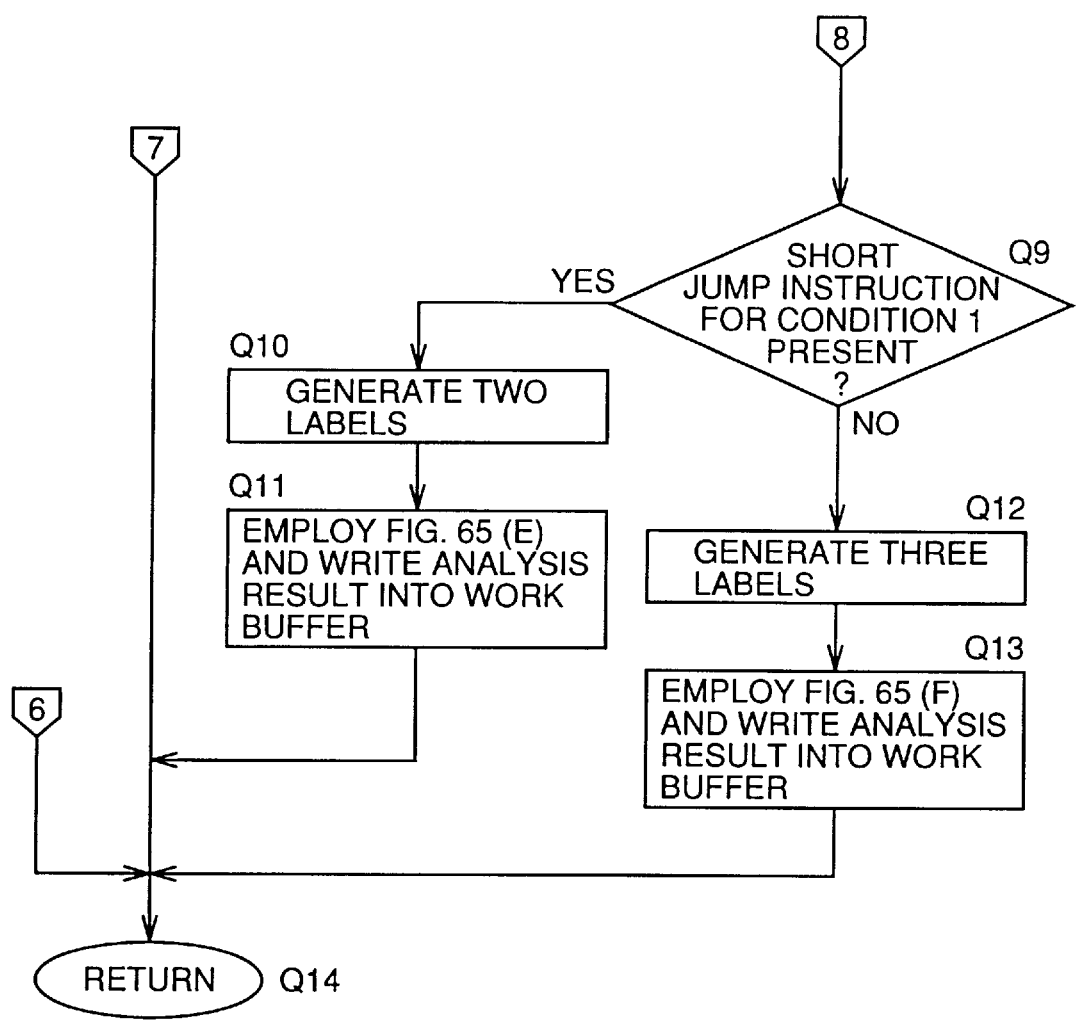

If it is determined at Q6 that the LONG JUMP instruction corresponding to condition 2=true is not present, the control advances to Q9 in FIG. 87. At Q9, it is determined whether a LONG JUMP instruction corresponding to condition 1=true is present or not. If the LONG JUMP instruction corresponding to condition 1=true is present, the control advances to Q10. At Q10, two new label names which will be used at Q11 are generated. At step Q11, the automatic generation rules at (E) in FIG. 65 are employed to generate and write the assembler source program into work buffer, and then the control advances to Q14 for finishing the processing.

If it is determined at Q9 that the LONG JUMP instruction corresponding to condition 1=true is not present, the control advances to Q12. At Q12, three new label names which will be used later are generated. At Q13, the automatic generation rules at (F) in FIG. 65 are employed to generate and write the assembler source program into work buffer, and then the control advances to Q14 for finishing the processing.

Figure 88:
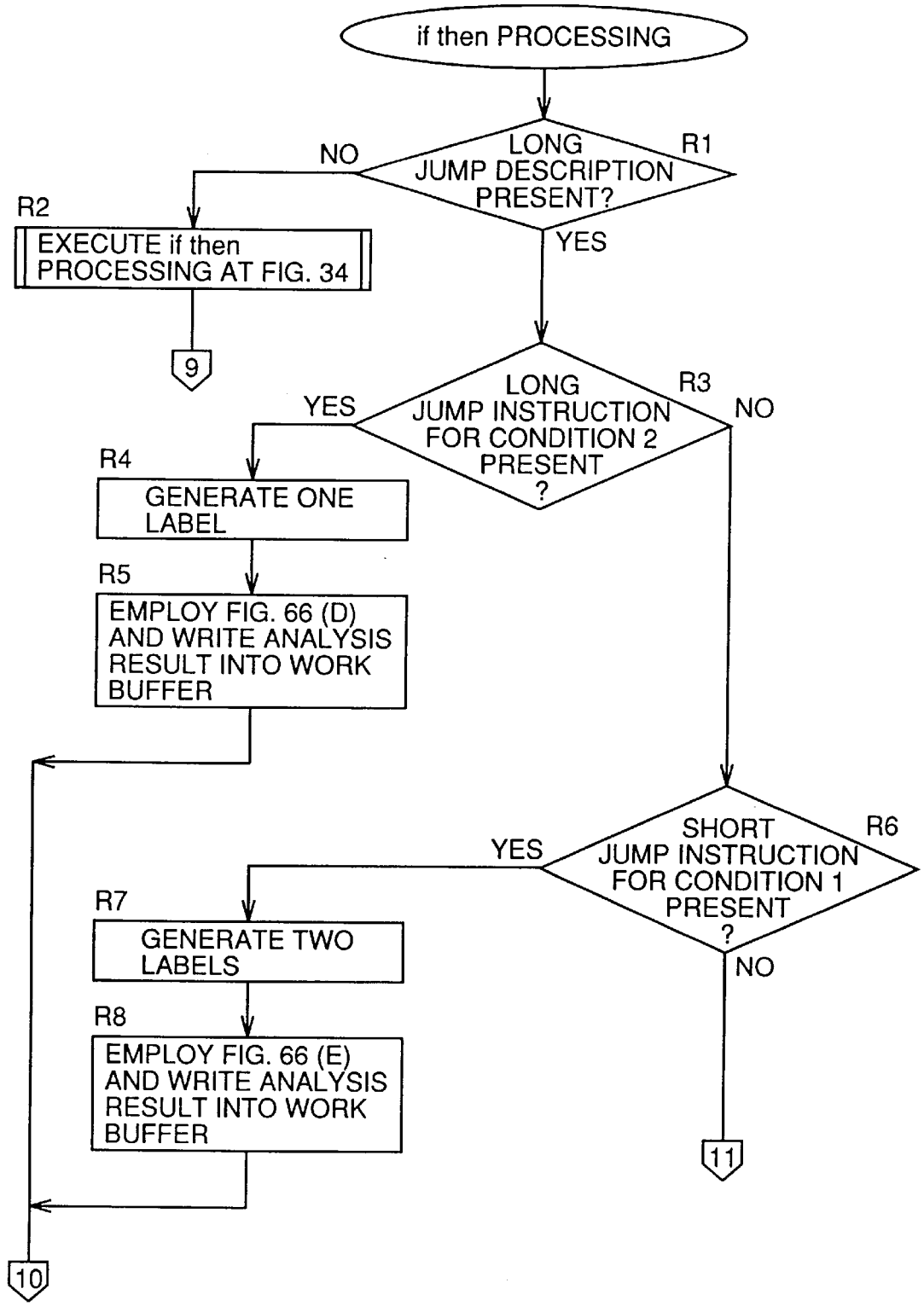
FIGS. 88 and 89 are flowcharts of subroutines of processing for automatically generating an assembler source program from an "if then" structure in the second embodiment.
Figure 89:
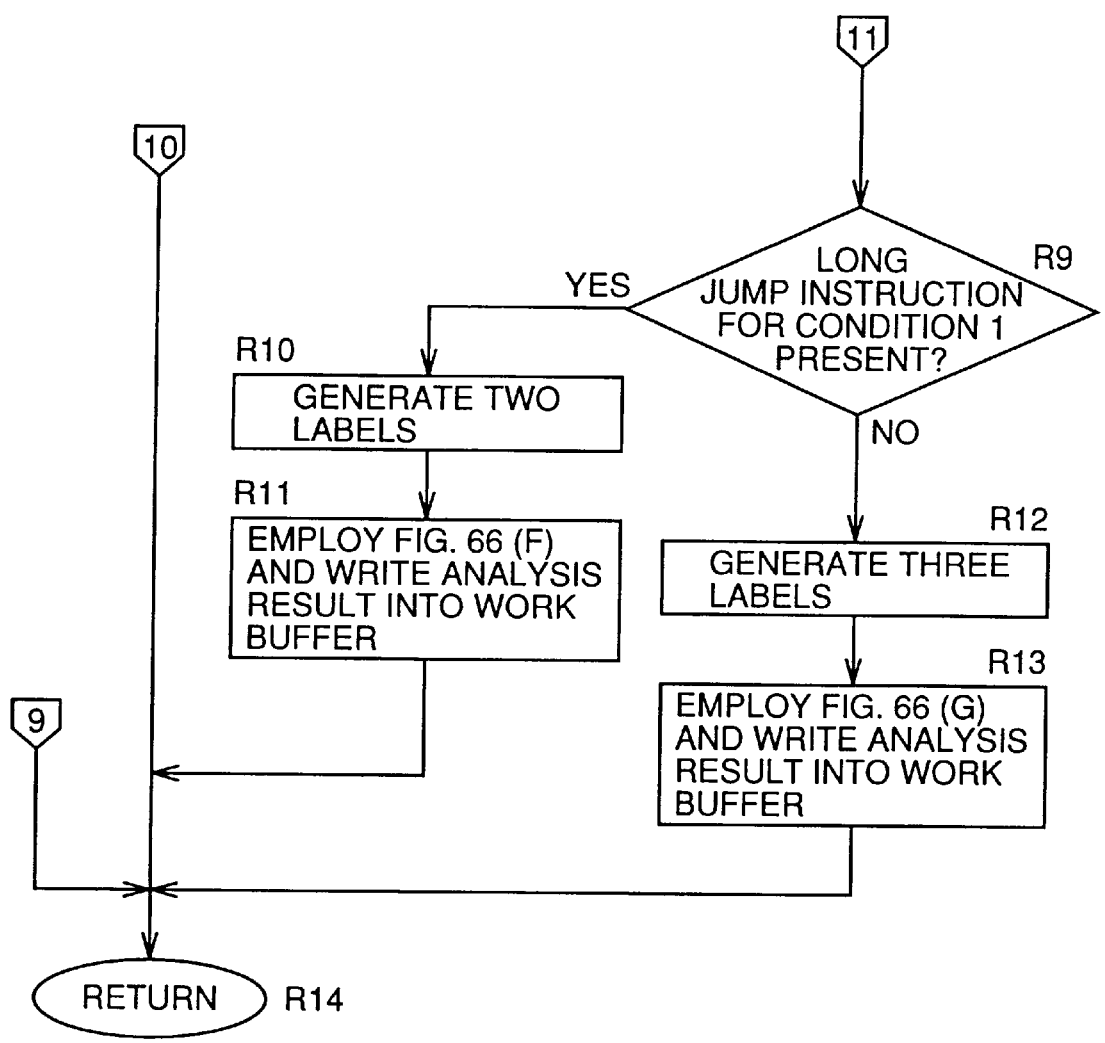

FIG. 88 is a flowchart showing subroutine processing for converting the "if then" structure called at N7 in FIG. 83 into the assembler source. Processing R1–R14 in FIGS. 88 and 89 is basically the same as the processing Q1–Q14 in FIGS. 86 and 87. If only SHORT JUMP instructions are present, the "if then" processing in FIG. 34 is executed (R2). If the target box contains a LONG JUMP structure, (D)–(G) in FIG. 66 are employed to generate and write the assembler source into the work buffer depending on presence and absence of the SHORT JUMP instruction and LONG JUMP instructions corresponding to condition 1=true and condition 2=true. Thereafter, the control advance to R14, and this subroutine is finished. As already described, the flows in FIGS. 88 and 89 are similar to those in FIGS. 86 and 87, and therefore will not be described later in detail.

Figure 90:
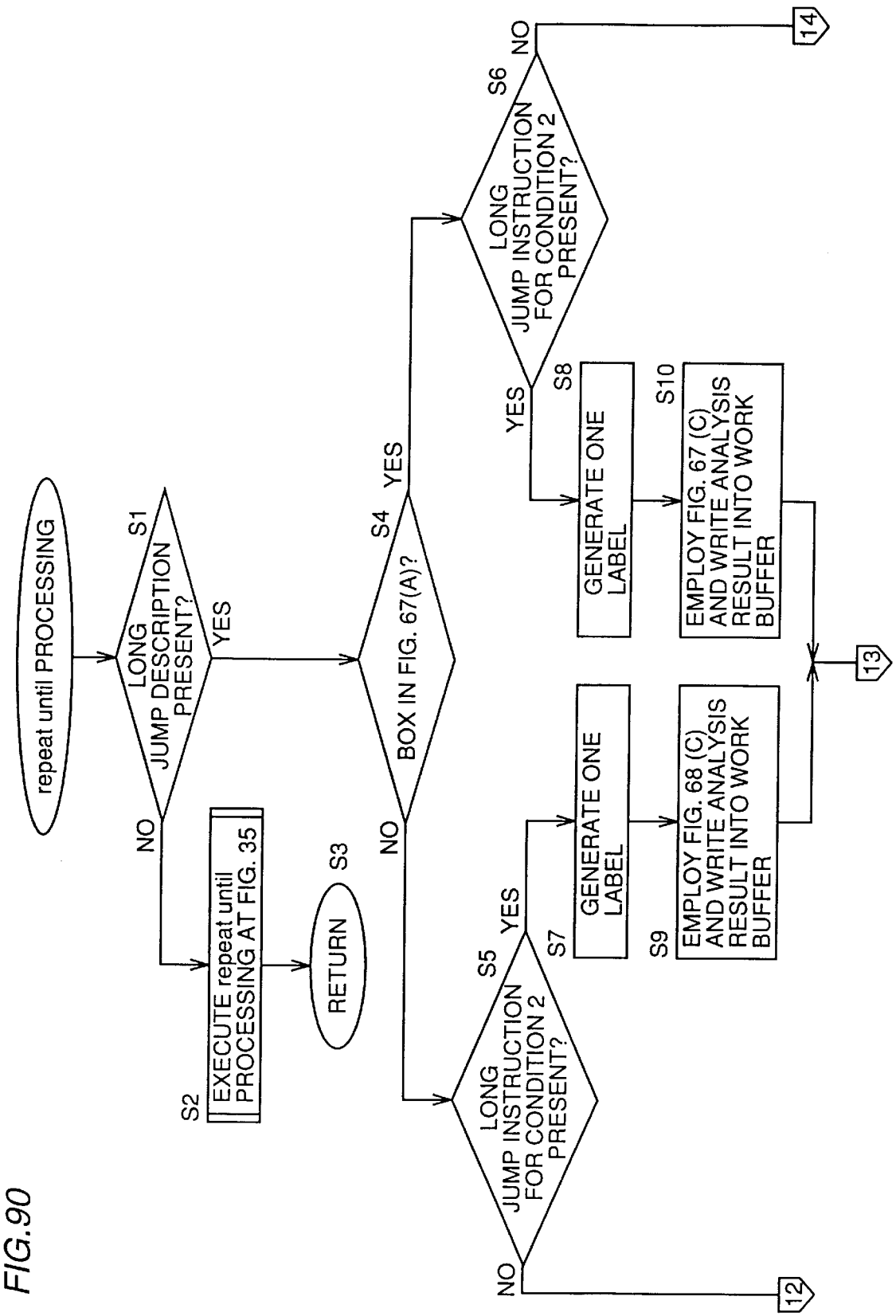
FIGS. 90–92 are flowcharts of subroutines of processing for automatically generating an assembler source program from a "repeat until" structure in the second embodiment.
Figure 91:
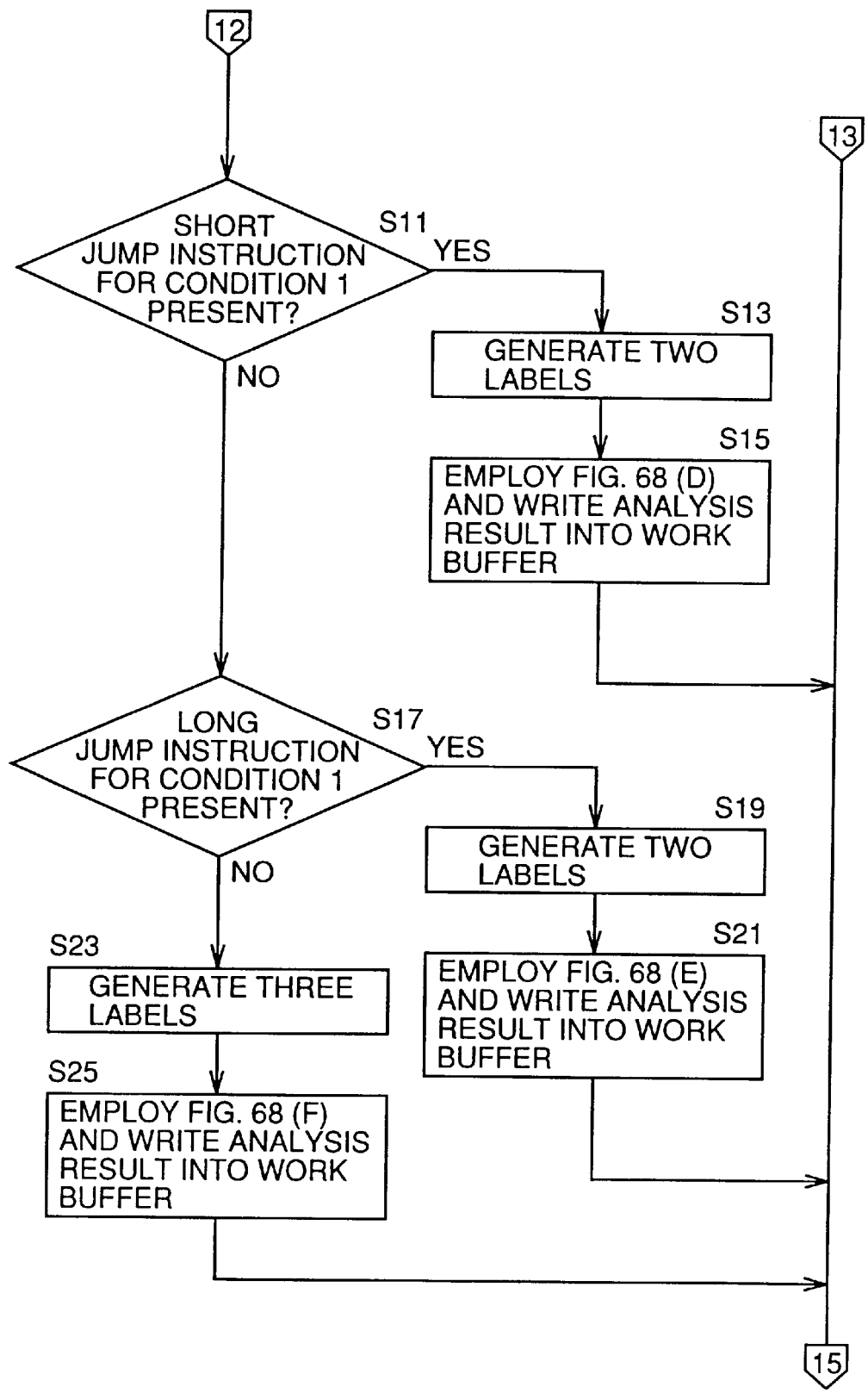
Figure 92:
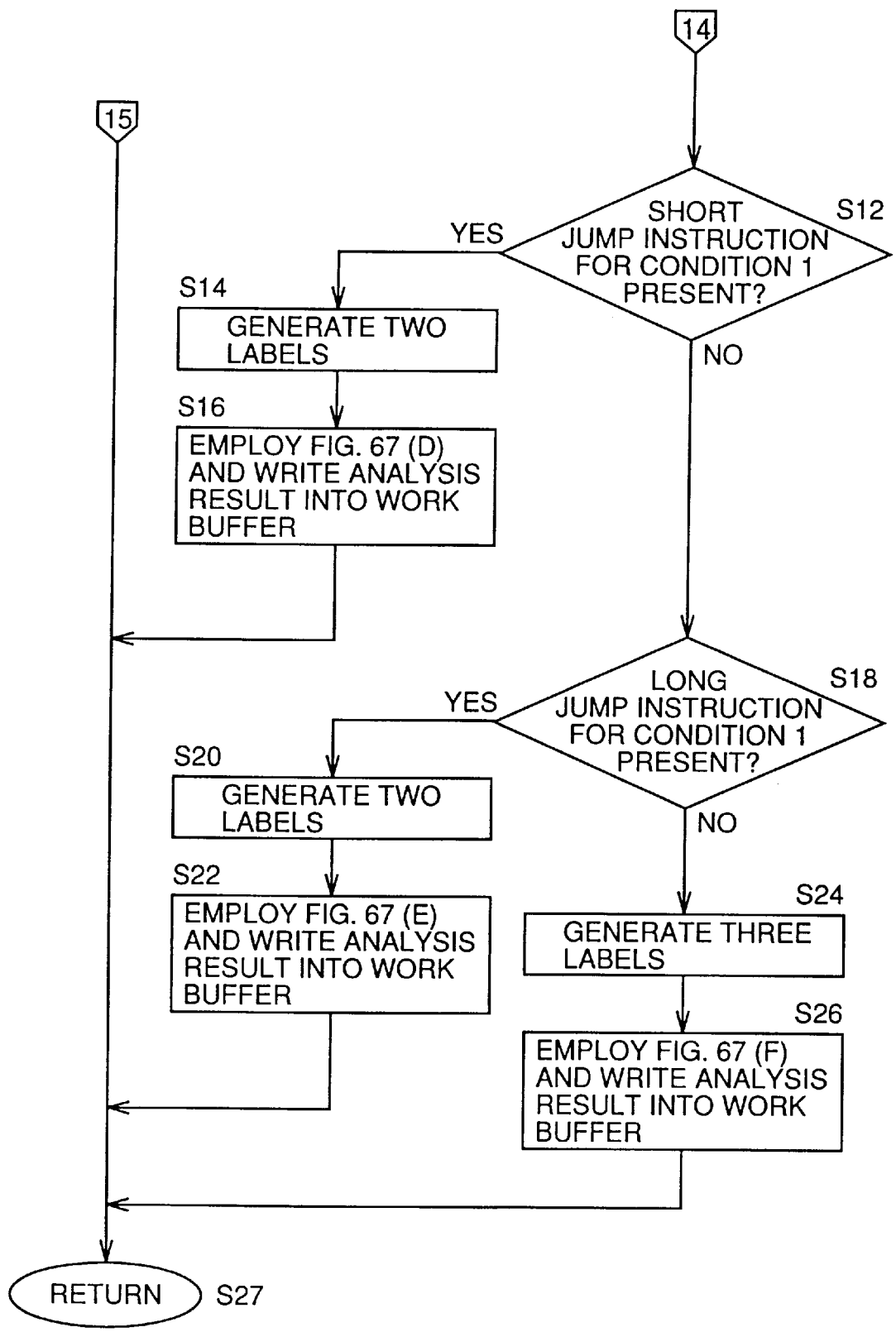

FIGS. 90–92 are flowcharts of subroutine processing for converting the "repeat until" structure called at N9 in FIG. 83 into the assembler source program. At step S1, it is determined whether a LONG JUMP description is present in the target "repeat until" structure. If the LONG JUMP description is not present, the control advances to S2, and processing is executed for generating the assembler source program from the "repeat until" structure including only the SHORT JUMP instructions shown in FIG. 35. Then, this subroutine is finished at step S3.

If it is determined at S1 that the LONG JUMP description is present, the control advances to S4. At S4, it is determined whether the target "repeat until" structure is the box shown at (A) in FIG. 67 or not. If the box is the box at (A) in FIG. 67, the control advances to S6, and otherwise the control advances to S5.

At and after S6, the automatic generation rules at (C)–(F) in FIG. 67 are employed to generate and write the assembler source program into the work buffer, depending on presence and absence of the SHORT JUMP instructions and LONG JUMP instructions corresponding to condition 1=true and condition 2=true (S8, S10, S14, S16, S20, S22, S24 and S26). Thereafter, the control advances to S27, and this subroutine is finished.

If it is determined at S4 that the box is not the box at (A) in FIG. 67, processing is performed as follows at and after S5. The automatic generation rules at (C)–(F) in FIG. 68 are employed depending on presence and absence of the SHORT JUMP instructions and LONG JUMP instructions corresponding to condition 1=true and condition 2=true, and the assembler source program is generated and written into the work buffer (S7, S9, S13, S15, S19, S21, S23 and S25). Thereafter, the control advances to S27, and this subroutine is finished.

Figure 93:
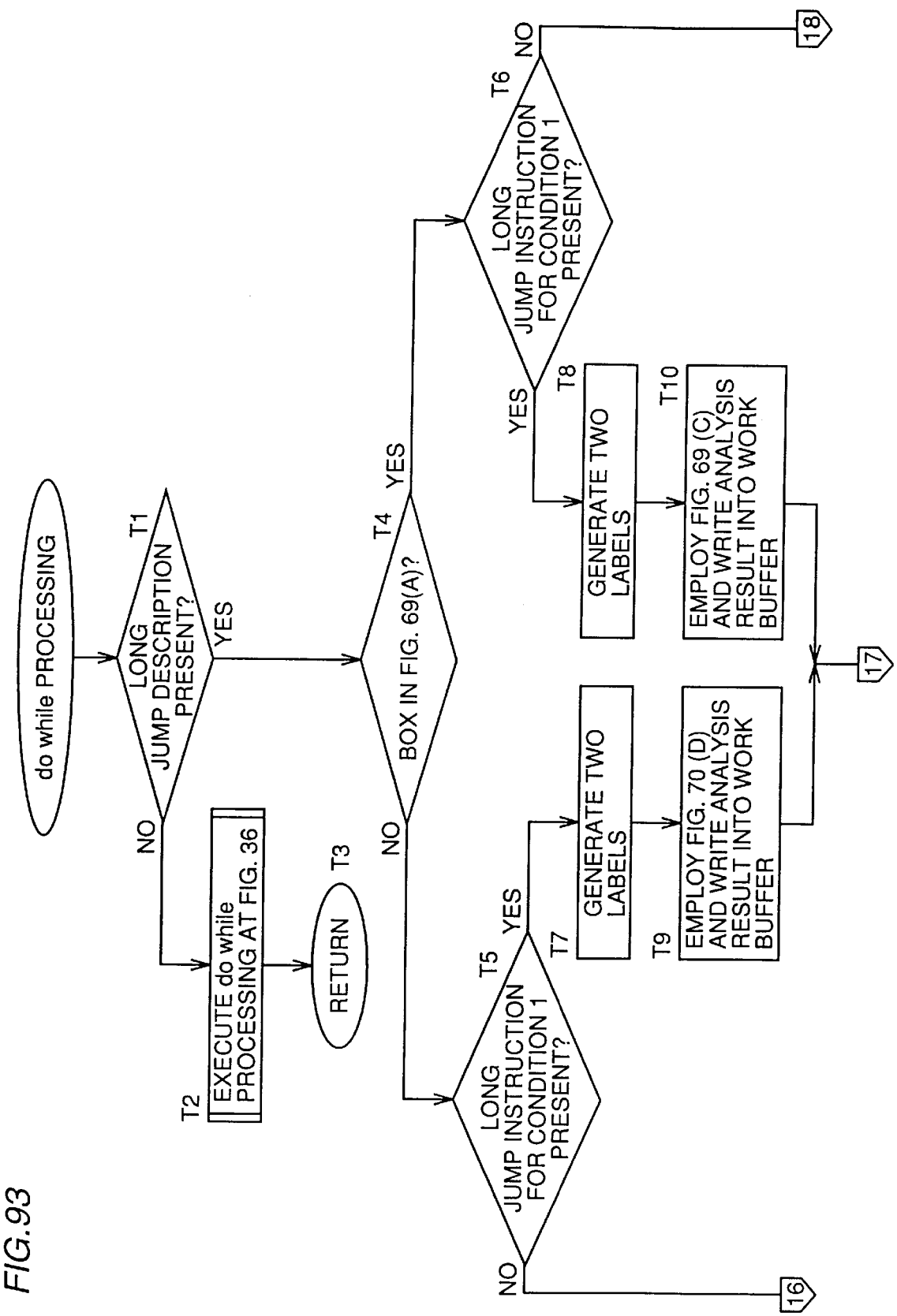
FIGS. 93–95 are flowcharts of subroutines of processing for automatically generating an assembler source program from a "do while" structure in the second embodiment.
Figure 94:
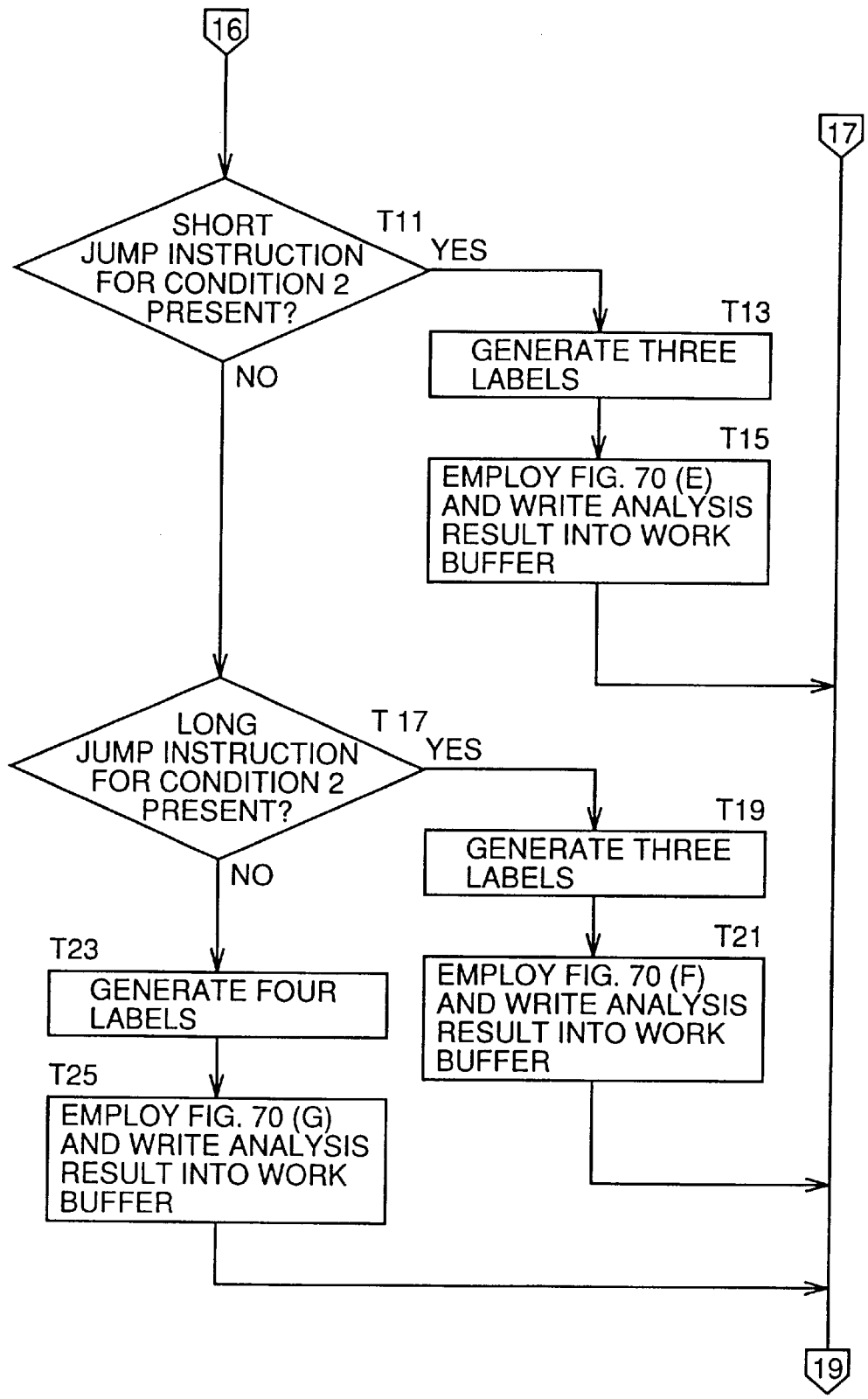
Figure 95:
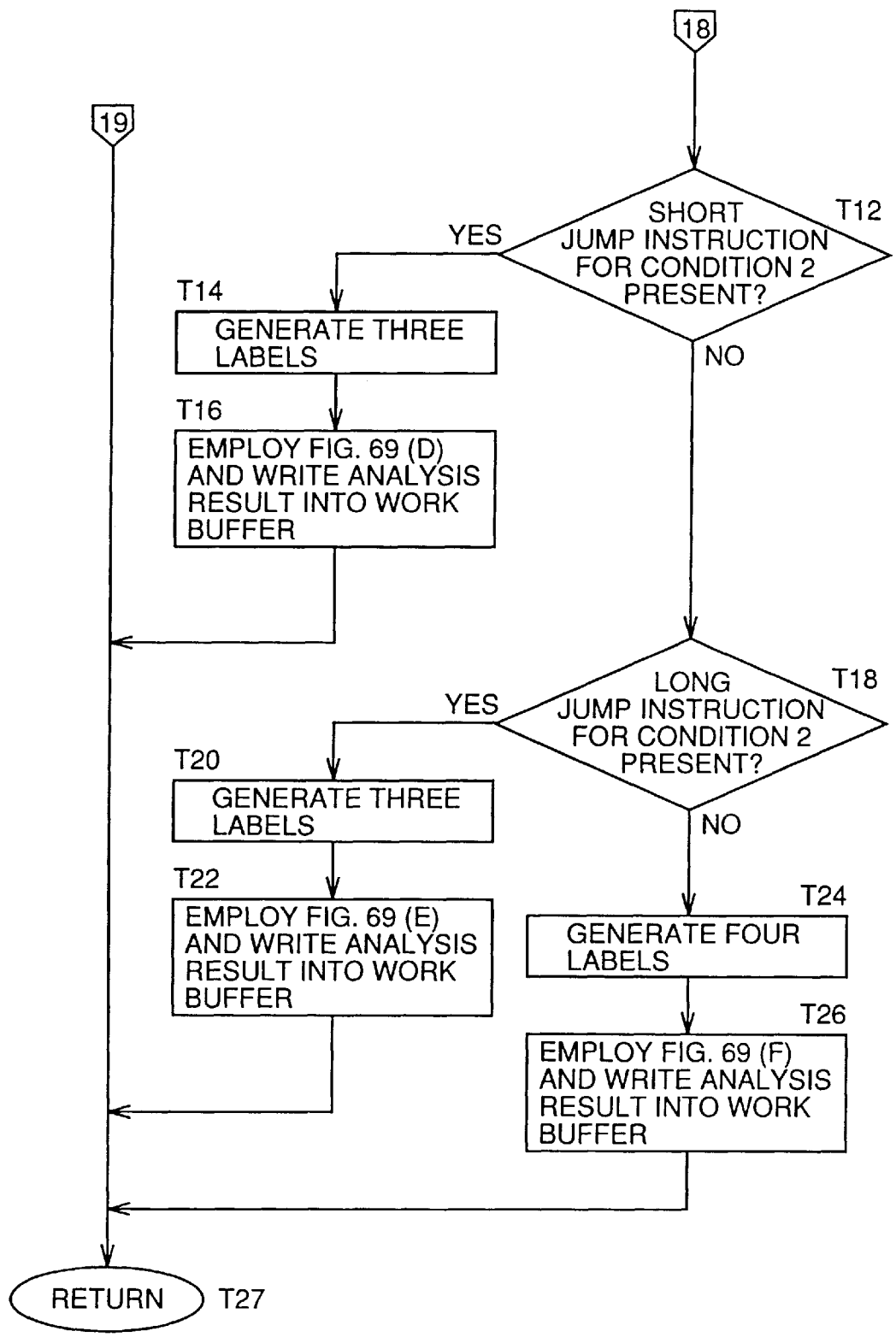

FIGS. 93–95 are flowcharts of the subroutine processing for converting the "do while" structure called at N11 in FIG. 83 into the assembler source program. First at T1, it is determined whether a LONG JUMP description is present in the target "do while" structure or not. If the LONG JUMP description is not present, the control advances to T2. At T2, processing is executed for generating the assembler source from the "do while" processing at the time of only the SHORT JUMP shown in FIG. 36. Thereafter, the control advances to T3, and this subroutine is finished.

If it is determined at T1 that the LONG JUMP description is present, the control advances to T4. At T4, it is determined whether the target box of "do while" structure is the box at (A) in FIG. 69. If it is the box at (A) in FIG. 69, the control advances to T6, and, if not, the control advances to T5.

If the box of the "do while" structure of the process target is the box at (A) in FIG. 69, the processing is performed at and after step T6 as follows. Depending on presence and absence of the SHORT JUMP instructions and LONG JUMP instructions corresponding to condition 1=true and condition 2=true, the automatic generation rules at (C)–(F) in FIG. 69 are employed to generate and write the assembler source program into the work buffer (T8, T10, T14, T16, T20, T22, T24 and T26). Thereafter, the control advances to T27, and this subroutine is finished.

When the control advances from T4 to T5, the processing is performed as follows at and after T5. Depending on presence and absence of the SHORT JUMP instructions and LONG JUMP instructions corresponding to condition 1=true and condition 2=true, the automatic generation rules at (D)–(G) in FIG. 70 are employed to generate and write the assembler source program into the work buffer (T7, T9, T13, T15, T19, T21, T23 and T25). Thereafter, the control advances to T27, and this subroutine is finished.

Figure 96:
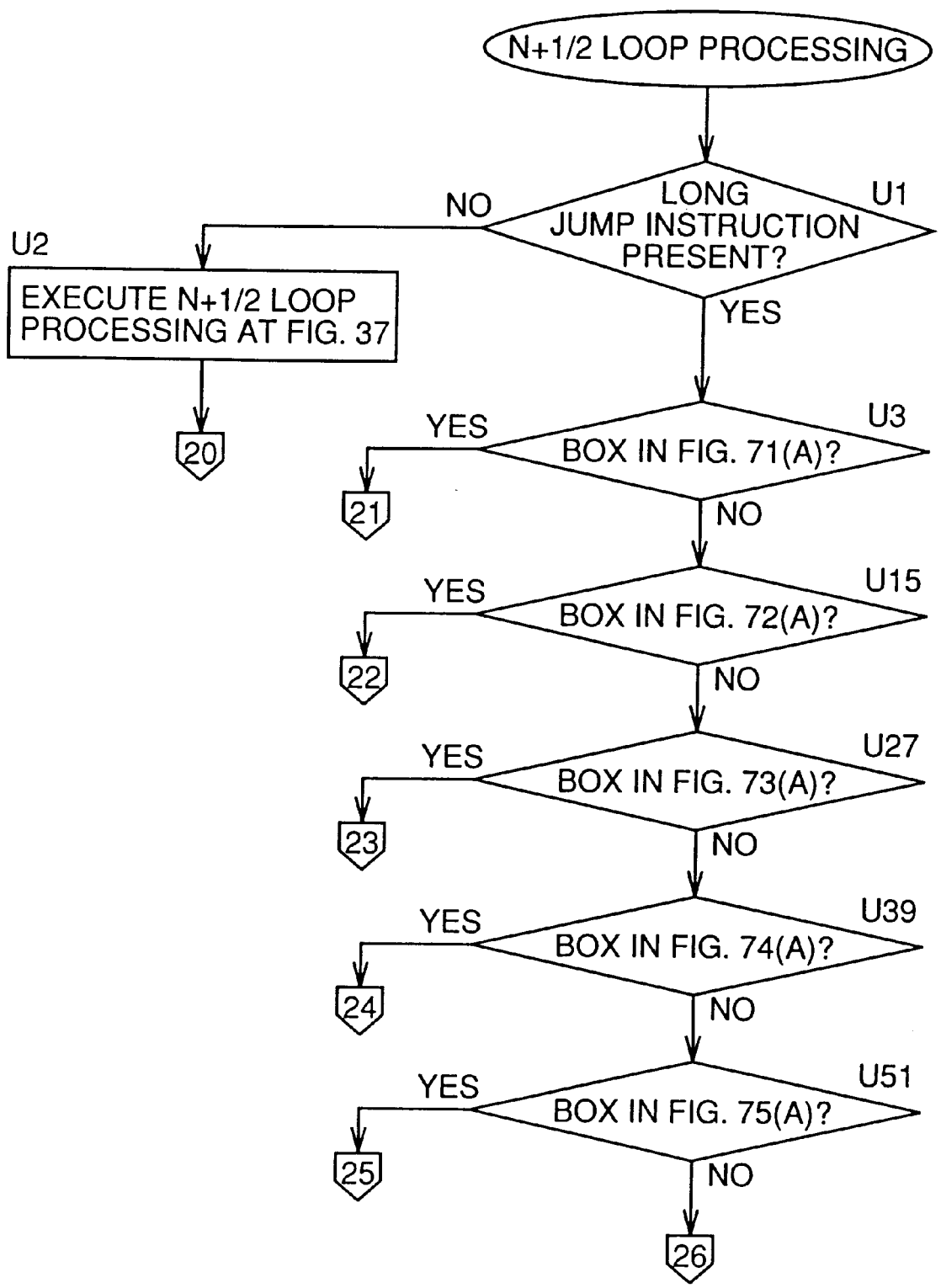
FIGS. 96–102 are flowcharts of subroutines of processing for automatically generating an assembler source program from an "N+½" structure in the second embodiment.
Figure 97:
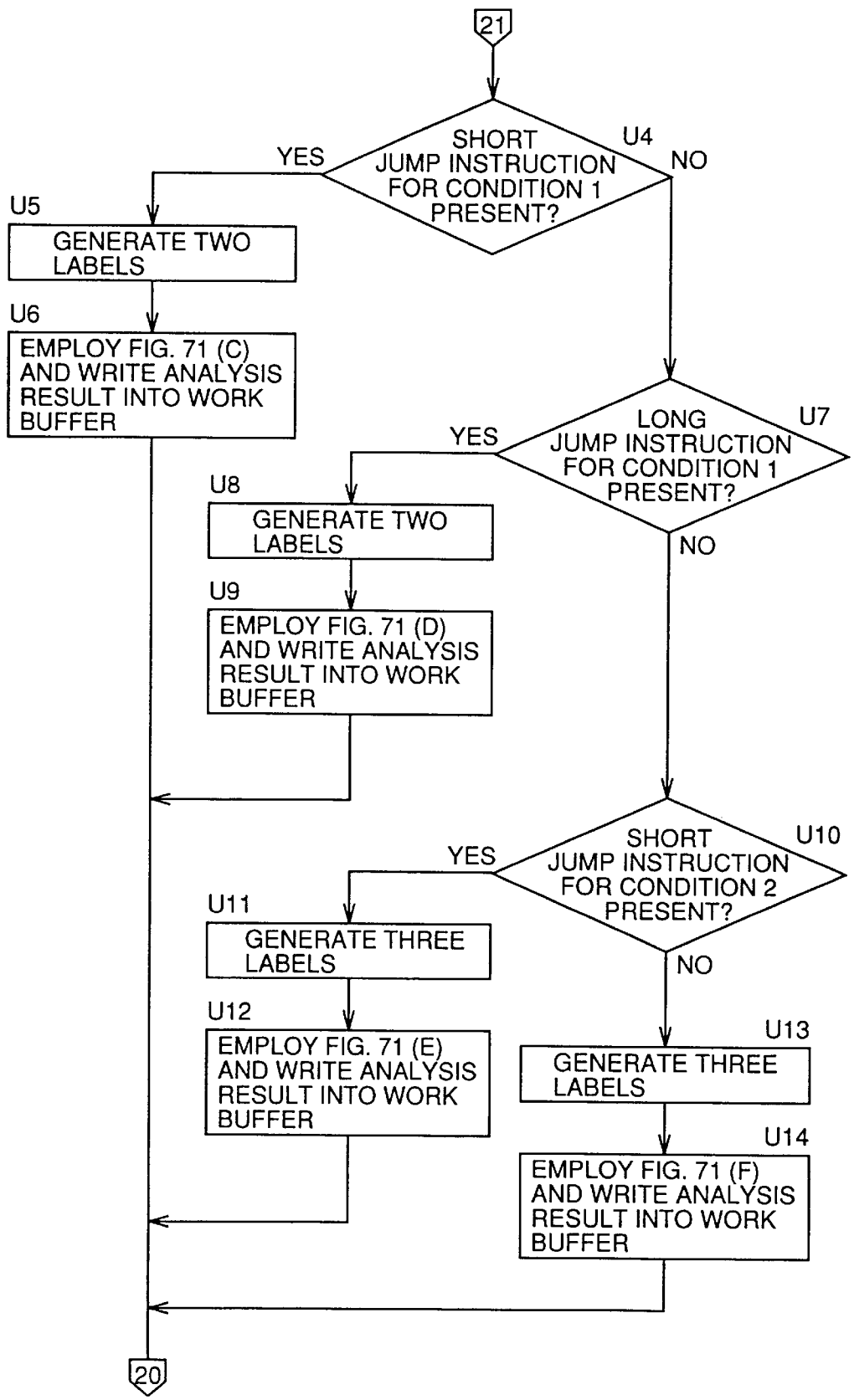
Figure 98:
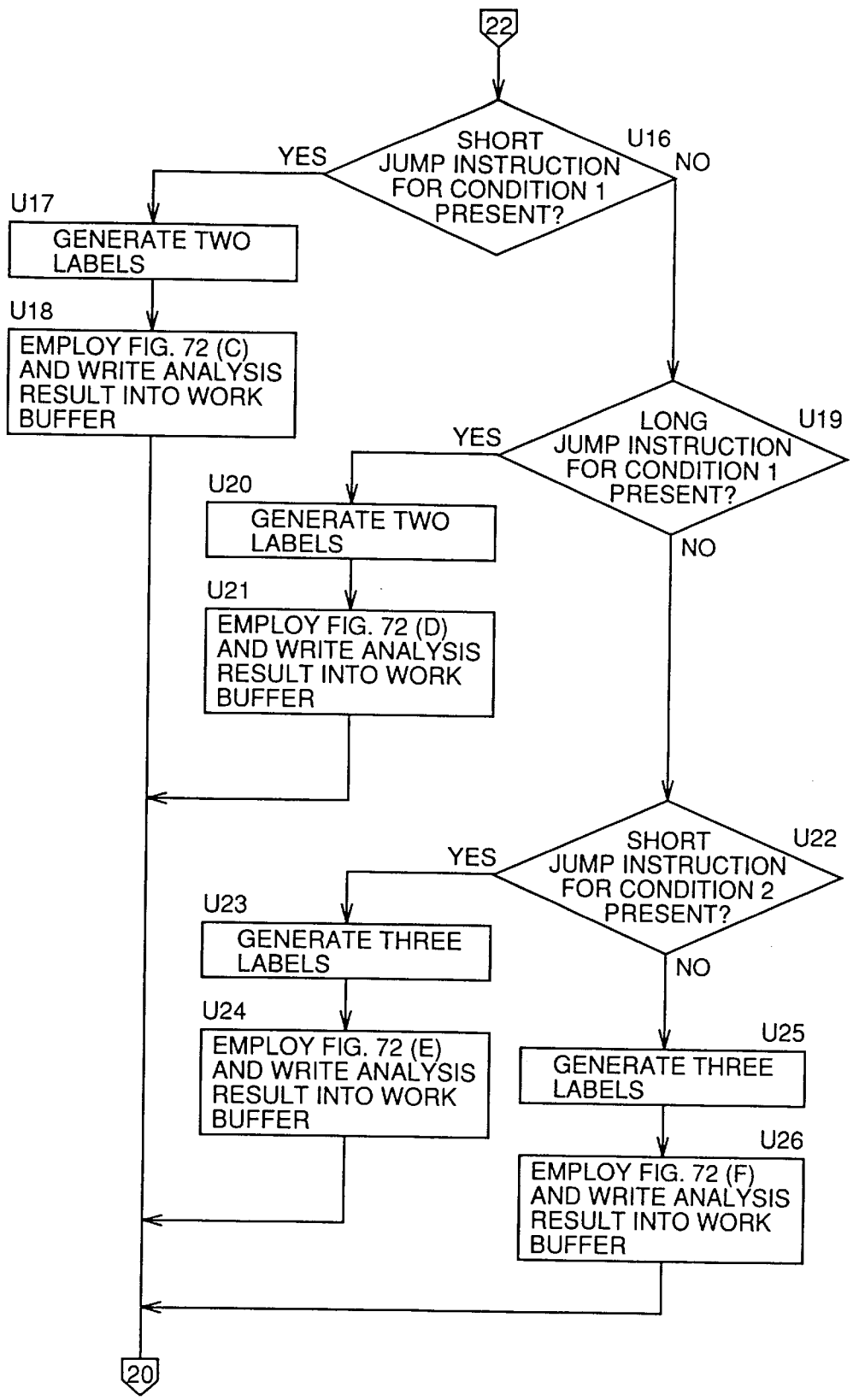
Figure 99:
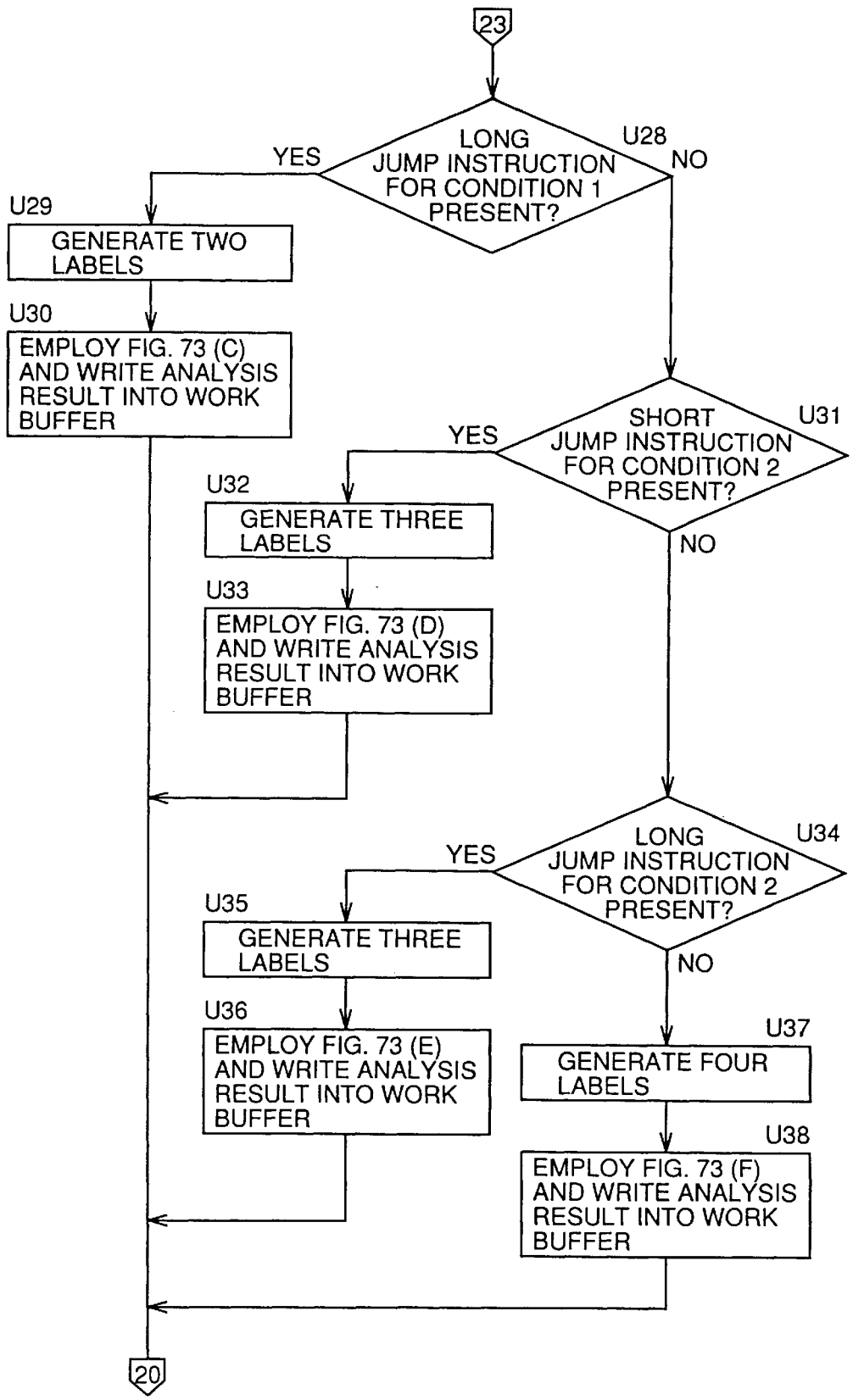
Figure 100:
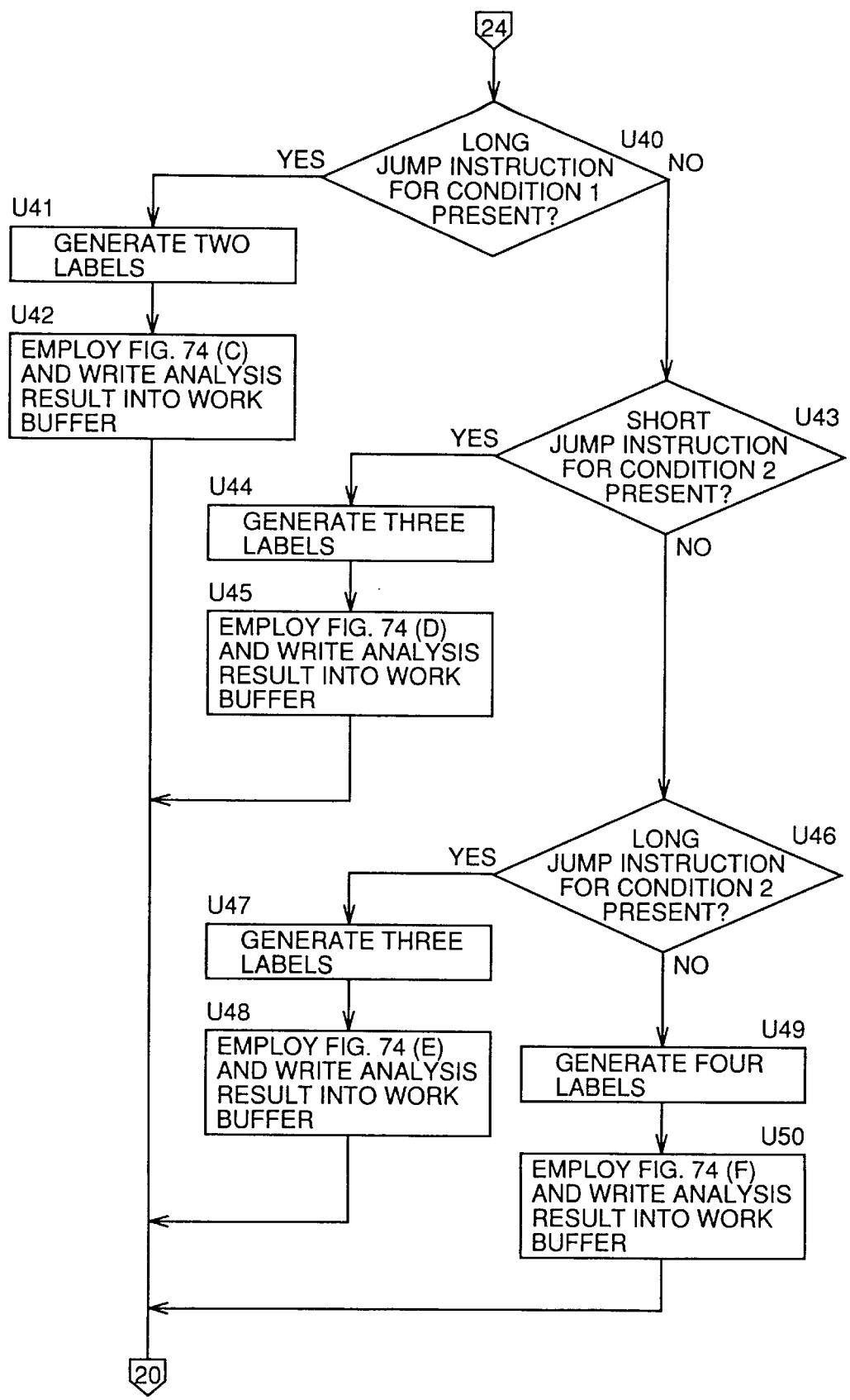
Figure 101:
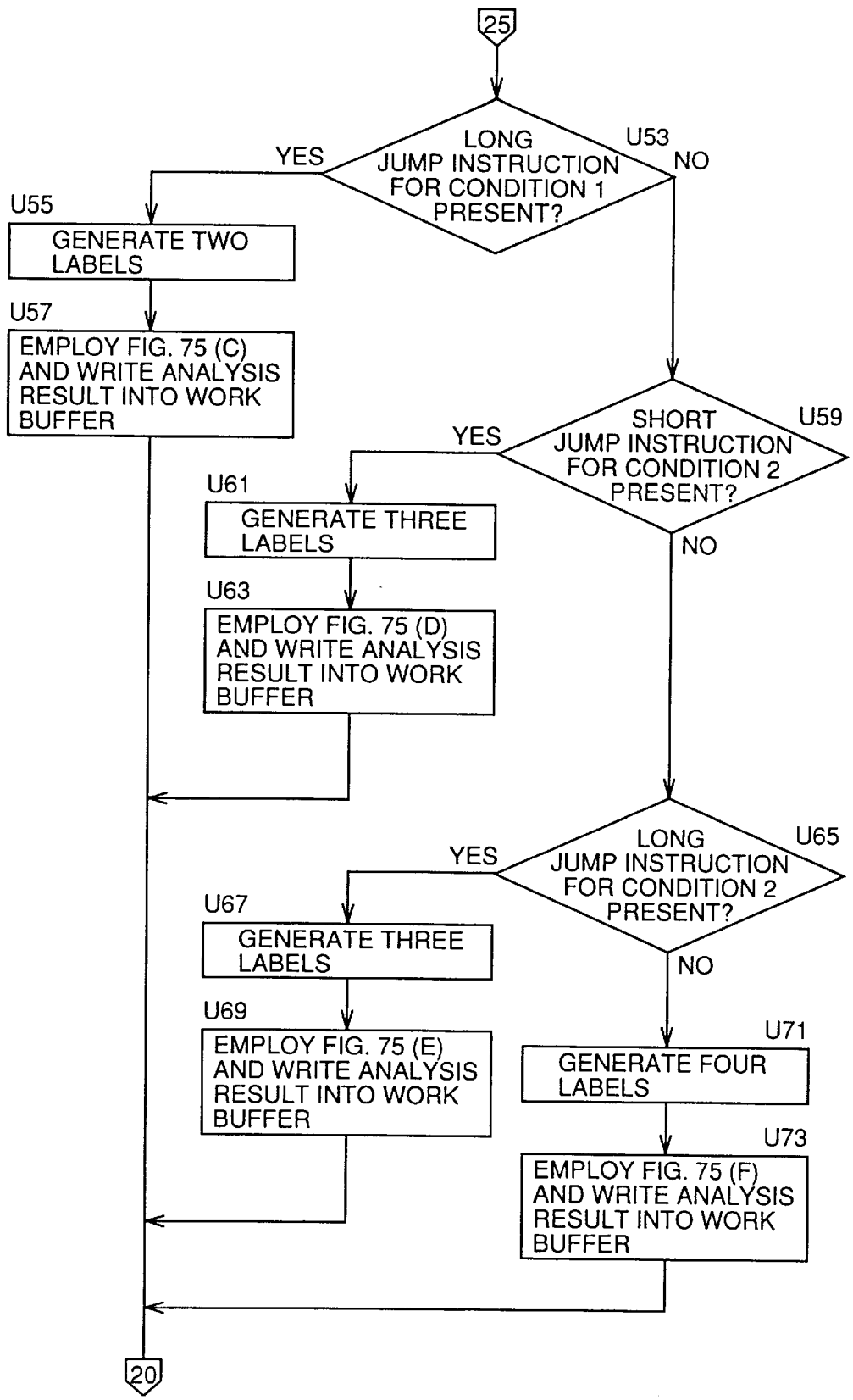

FIGS. 96–102 are flowcharts of the subroutine processing for converting the "N+½" structure called at N13 in FIG. 83 into the assembler source program. Referring to FIG. 96, it is first determined at U1 whether a LONG JUMP description is present in the target "N+½" structure or not. If there is no LONG JUMP description, the control advances to U2. At U2, the assembler source generation processing is executed in accordance with the loop processing of "N+½" in FIG. 37. Thereafter, the control advances to U74 in FIG. 101, and this subroutine is finished.

If it is determined at U1 that the LONG JUMP description is present, the control advances to U3. At U3, it is determined whether the "N+½" target structure is the box at (A) in FIG. 71. If it is determined that it is the box at (A) in FIG. 71, the control advances to U4 in FIG. 97. At and after U4, the processing is performed as follows. Depending on presence and absence of the SHORT JUMP instructions and LONG JUMP instructions corresponding to condition 1=true and condition 2=true, the automatic generation rules shown at (C)–(F) in FIG. 71 are employed to generate and write the assembler source program into the work buffer (U5, U6, U8, U9, U11, U12, U13 and U14). After this control, the control advances to U74 in FIG. 101, and this subroutine is finished.

If it is determined at U3 in FIG. 96 that the target box is not the box at (A) in FIG. 71, the control advances to U15. At U15, it is determined whether the target "N+½" structure is the box at (A) in FIG. 72. If it is the box at (A) in FIG. 72, the control advances to U16 in FIG. 98. At and after U16, the processing is performed as follows. Depending on presence and absence of the SHORT JUMP instructions and LONG JUMP instructions corresponding to condition 1=true and condition 2=true, the automatic generation rules respectively shown at (C)–(F) in FIG. 72 are employed to generate and write the assembler source program into the work buffer (U17, U18, U20, U21, U23, U24, U25 and U26). Thereafter, the control advances to U74 in FIG. 101, and this subroutine is finished.

Referring to FIG. 96 again, if it is determined at U15 that the target structure is not the box at (A) in FIG. 72, the control advances to U27. At U27, it is determined whether the target "N+½" structure is the box at (A) in FIG. 73 or not. If it is the box at (A) in FIG. 73, the control advances to U28 in FIG. 99. At and after U28, the processing is performed as follows. Depending on presence and absence of the SHORT JUMP instructions and LONG JUMP instructions corresponding to condition 1=true and condition 2=true, the automatic generation rules shown at (C)–(F) in FIG. 73 are employed to generate and write the assembler source program into the work buffer (U29, U30, U32, U33, U35, U36, U37 and U38). Thereafter, this subroutine is finished.

Referring further to FIG. 96, if it is determined at U27 that the target structure is not the box at (A) in FIG. 73, the control advances to U39. At U39, it is determined whether the target "N+½" structure is the box at (A) in FIG. 74 or not. If it is the box at (A) in FIG. 74, the control advances to U40 in FIG. 100. At and after U40, the processing is performed as follows. Depending on presence and absence of the SHORT JUMP instructions and LONG JUMP instructions corresponding to condition 1=true and condition 2=true, the automatic generation rules respectively shown at (C)–(F) in FIG. 74 are employed to generate and write the assembler source program into the work buffer (U41, U42, U44, U45, U47, U48, U49 and U50). Thereafter, this subroutine is finished.

Referring to FIG. 96 again, if it is determined at U39 that the target structure is not the box at (A) in FIG. 74, the control advances to U51. At U51, it is determined whether the "N+½" structure is the box at (A) in FIG. 75 or not. If it is determined that it is the box at (A) in FIG. 75, the control advances to U53 in FIG. 101. At and after U53, the processing is performed as follows. Depending on presence and absence of the SHORT JUMP instructions and LONG JUMP instructions corresponding to condition 1=true and condition 2=true, the automatic generation rules respectively shown at (C)–(F) in FIG. 75 are employed to generate and write the assembler source program into the work buffer (U55, U57, U61, U63, U67, U69, U71 and U73). Thereafter, this subroutine is finished.

Figure 102:
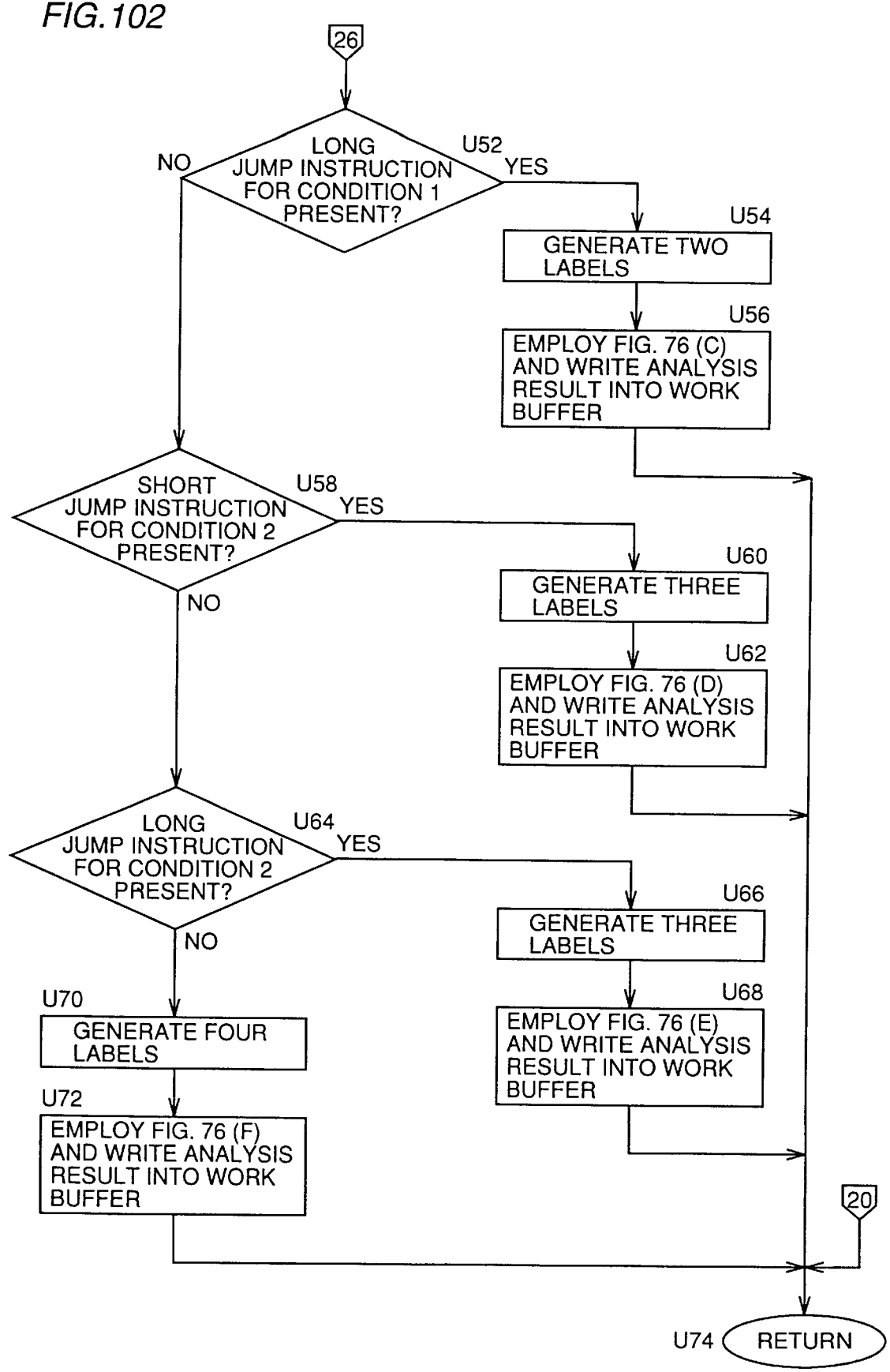

At U51, if it is determined that the target structure is not the box at (A) in FIG. 75, the control advances to U52 in FIG. 102. At and after U52, the processing is performed as follows. Depending on presence and absence of the SHORT JUMP instructions and LONG JUMP instructions corresponding to condition 1=true and condition 2=true, the automatic generation rules respectively shown at (C)–(F) in FIG. 76 are employed to generate and write the assembler source program into the work buffer (U54, U56, U60, U62, U66, U68, U70 and U72). Thereafter, the control advances to U74, and this subroutine is finished.

Figure 103:
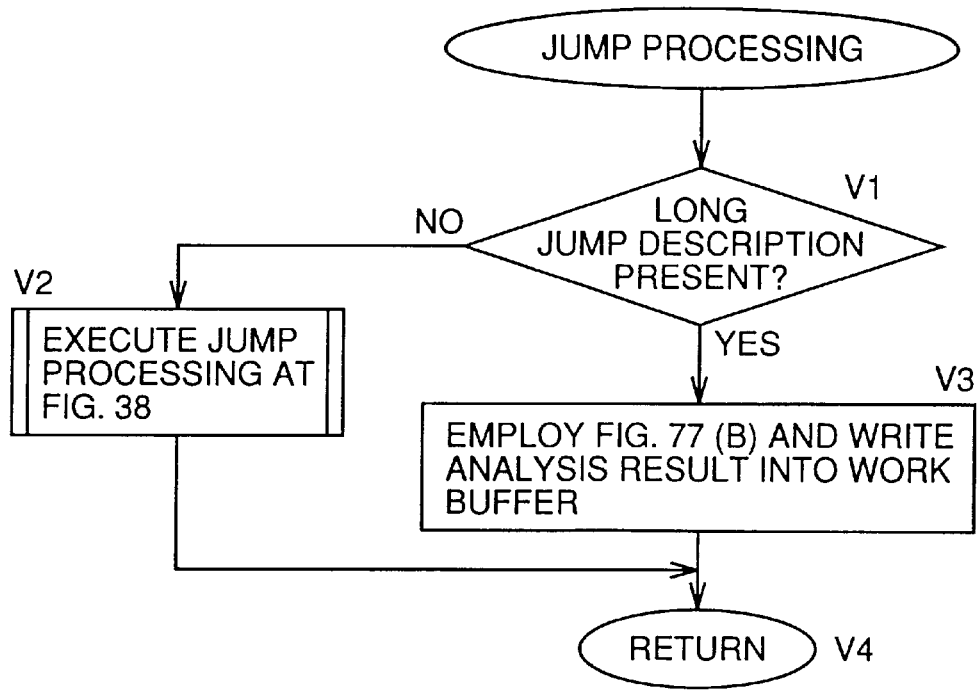
FIG. 103 is a flowchart of a subroutine of processing for automatically generating an assembler source program from a jump processing structure in the second embodiment.

FIG. 103 shows a flowchart of the subroutine of the jump processing called at N15 in FIG. 84. Referring to FIG. 103, it is determined at V1 whether a LONG JUMP description is present in the target JUMP processing structure or not. If the LONG JUMP description is not present, the control advances to V2, and the jump processing for only the SHORT JUMP shown in FIG. 38 is executed. Then, the processing is finished (V4).

If it is determined that the LONG JUMP description is present, the control advances to V3. At V3, the automatic generation rules shown at (B) in FIG. 77 are employed to generate and write the assembler source program into the work buffer. Thereafter, the control advances to V4, and this subroutine is finished.

Figure 104:
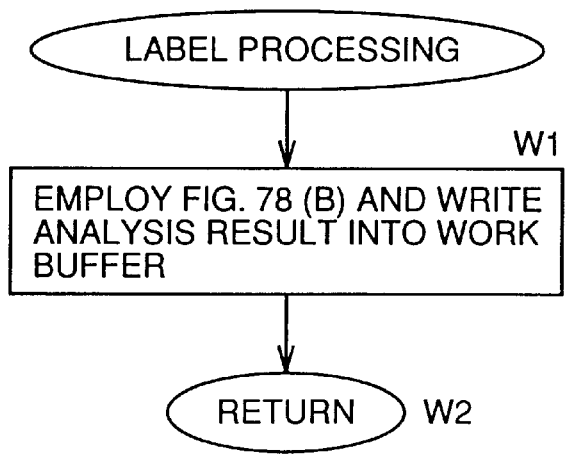
FIG. 104 is a flowchart of a subroutine of processing for automatically generating an assembler source program from a label processing structure in the second embodiment.
Figure 105:
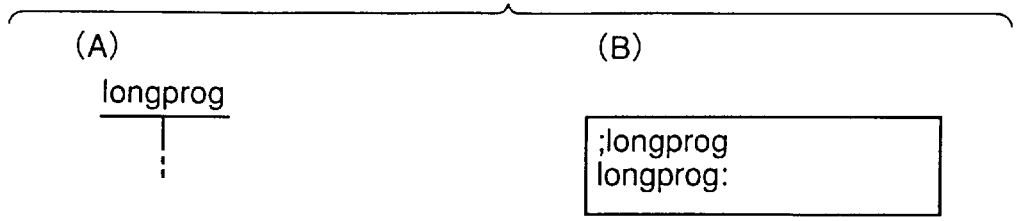
Figure 106:
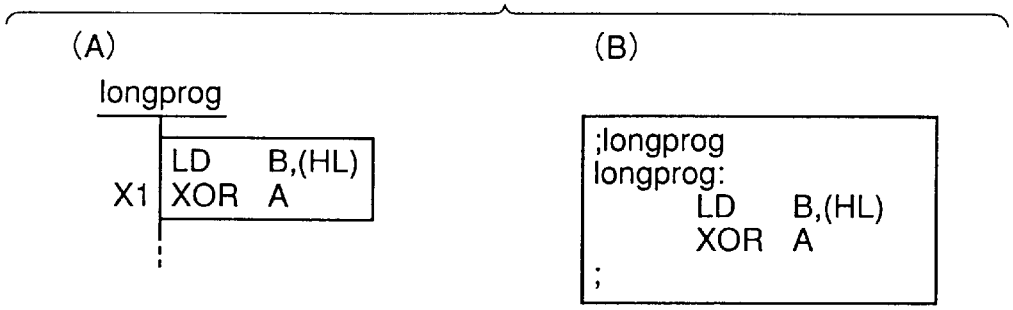

FIG. 104 is a flowchart of subroutine processing for converting the label processing structure called at N17 in FIG. 84 into the assembler source program. As already described, the label processing structure is a structure unrelated to the LONG JUMP and SHORT JUMP. Therefore, for conversion of the label processing structure, processing is first performed at step W1 to employ the automatic generation rules shown at (B) in FIG. 78, and thereby the assembler source program is generated and written into the work buffer. Thereafter, the control advances to 2, and this processing is finished.

FIGS. 105–110 show steps of automatically converting the tree structure chart "longprog" shown in FIG. 81 into assembler source program with the device of this second embodiment. The table used for this purpose is table 440 in FIG. 80.

First, the main program shown in FIG. 82 is activated. After initializing the arguments and securing the source buffer, the chart name "longprog" of the tree structure chart shown in FIG. 81 is read and output into the source buffer. A read portion of the tree structure chart is shown at (A) in FIG. 105, and a result of output into the source buffer is shown at (B) in FIG. 105.

Then, the processing advances to the chart box analysis in FIG. 83 and following figures. The initial tree structure in the tree structure chart shown in FIG. 81 is a sequential processing box X1. Therefore, in accordance with the processing in FIG. 85, the assembler source program is automatically generated and output into the source buffer. The tree structure to be converted is shown at (A) in FIG. 106, and the result of output into the source buffer is shown at (B) in FIG. 106.

Referring again to FIG. 81, the tree structure to be analyzed subsequently is a "repeat until" structure X2. This structure is converted into the assembler source program in accordance with the flowcharts shown in FIGS. 90–92. According to determination at S1 in FIG. 90, this "repeat until" structure internally has a structure having a LONG JUMP description, so that the control advances to S4. According to determination at S4, this "repeat until" structure is the box at (A) in FIG. 67, so that the control advances to S5. From table 440 in FIG. 80, it is found that neither SHORT JUMP instruction nor LONG JUMP instruction is present as the jump instruction corresponding to the condition of "B--=0"=true. As a jump instruction corresponding to the opposite condition "B--< >0"=true is not present as a LONG JUMP instruction, but is present only as a SHORT JUMP instruction. Therefore, the control advances to S23 and S25, and the result shown at (B) in FIG. 107 is obtained.

Figure 107:
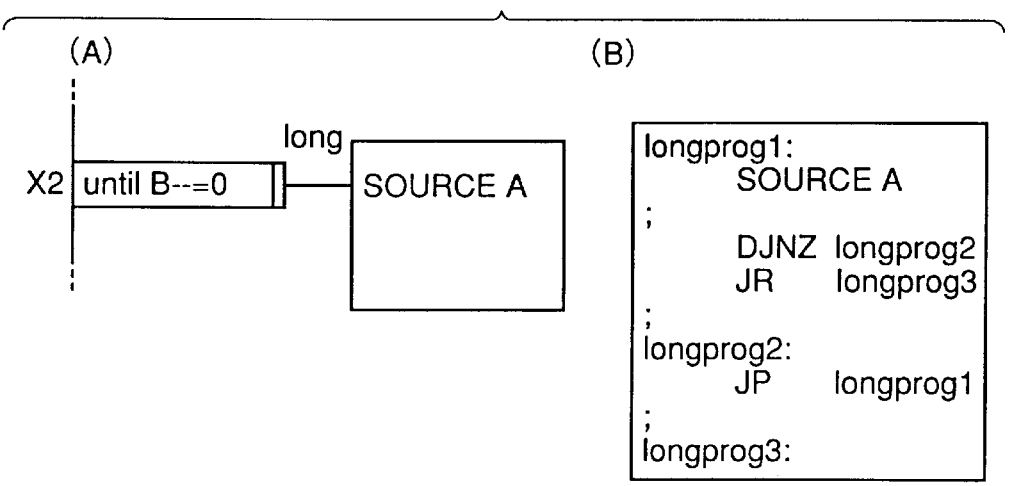
Figure 108:
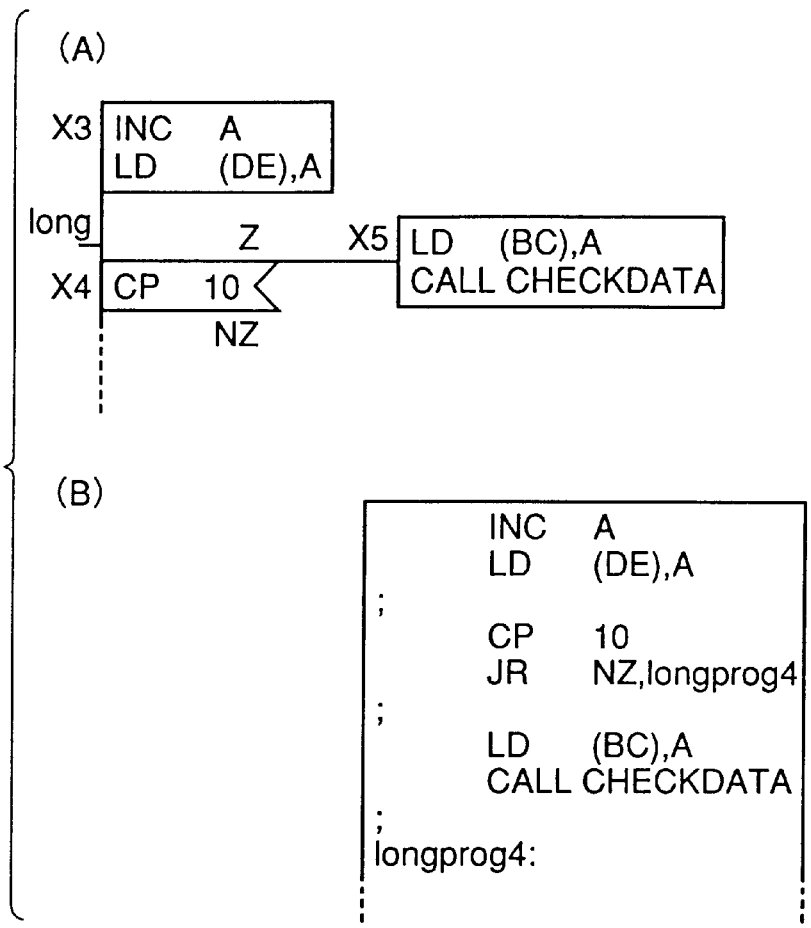

However, the "repeat until" structure shown at (A) in FIG. 107 internally includes the tree structure ("source A") from X3 to X10 shown in FIG. 81, so that a new second work buffer is secured, and the chart box analysis processing in FIG. 83 and the following figures is recursively called. The recursively called chart box analysis routine further analyzes the tree structure from X3 to X10 to perform the automatic source generation, and returns the result thereof. FIG. 108 shows, at (A), a portion of the recursively analyzed chart. FIG. 108 shows, at (B), source analysis contents of the chart portion sent to the second work buffer, and corresponds to (A) in FIG. 108. In this manner, the assembler source program is automatically generated from the tree structure chart from X3 to X10, and is output into the second work buffer, results of which are shown at (A) in FIG. 109.

Upon finishing the recursively called chart box analysis routine, the results at (A) in FIG. 109 are used to generate the "repeat until" structure X2 (FIG. 81) generated in the work buffer. The assembler source program of whole the "repeat until" structure X2 thus generated is shown at (B) in FIG. 109. This assembler source program is further output into the source buffer as shown at N18 in FIG. 84. In this manner, the assembler source program, which is shown in FIG. 110, is automatically generated from the tree structure chart from X1 to X12 in FIG. 81 and is output to the source file. This is identical with the assembler source program of Z-80 into which the tree structure chart in FIG. 81 is automatically converted.

Third Embodiment

Figures 111, 112, 113:
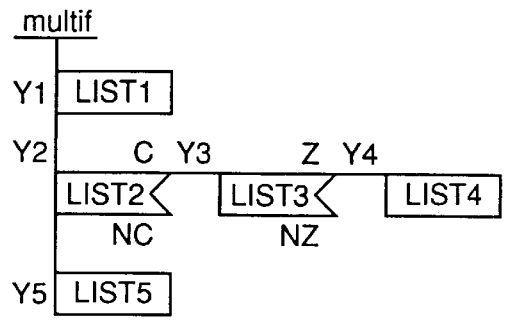
FIG. 111 shows an example of a tree structure chart for pointing out a problem in processing for automatically generating an assembler source program.
FIG. 112 shows the assembler source program automatically generated from the tree structure chart shown in FIG. 111.
FIG. 113 shows a program prepared by deleting overlapped labels from the assembler source program in FIG. 112.

With respect to the automatically generated source lists in the foregoing two embodiments, the following problem may arise. Consideration will be made on the case where a tree structure chart shown, e.g., in FIG. 111 is converted into the assembler source program. In this case, this tree structure chart "multif" has two "if then" structures Y2 and Y3 structurally having the same return locations. Therefore, automatic generation of the assembler source program in accordance with the above embodiment results in successive generation of two labels "multif2" and "multif1" at the same position in the source list, as shown in FIG. 112.

There is no special meaning in overlapping these two labels, but these two labels increase the complexity of the source program, and wastefully increases the size or volume of the program.

If the labels are generated at the same location, therefore, name of one of the labels is assigned also to the other, and an unnecessary label is deleted for preventing generation of a redundant label. Thereby, the generated assembler source program is simplified to allow more easy understanding, and wasteful increase in source program volume can be prevented. The source list from which the redundant label is removed is shown in FIG. 113.

Figure 114:
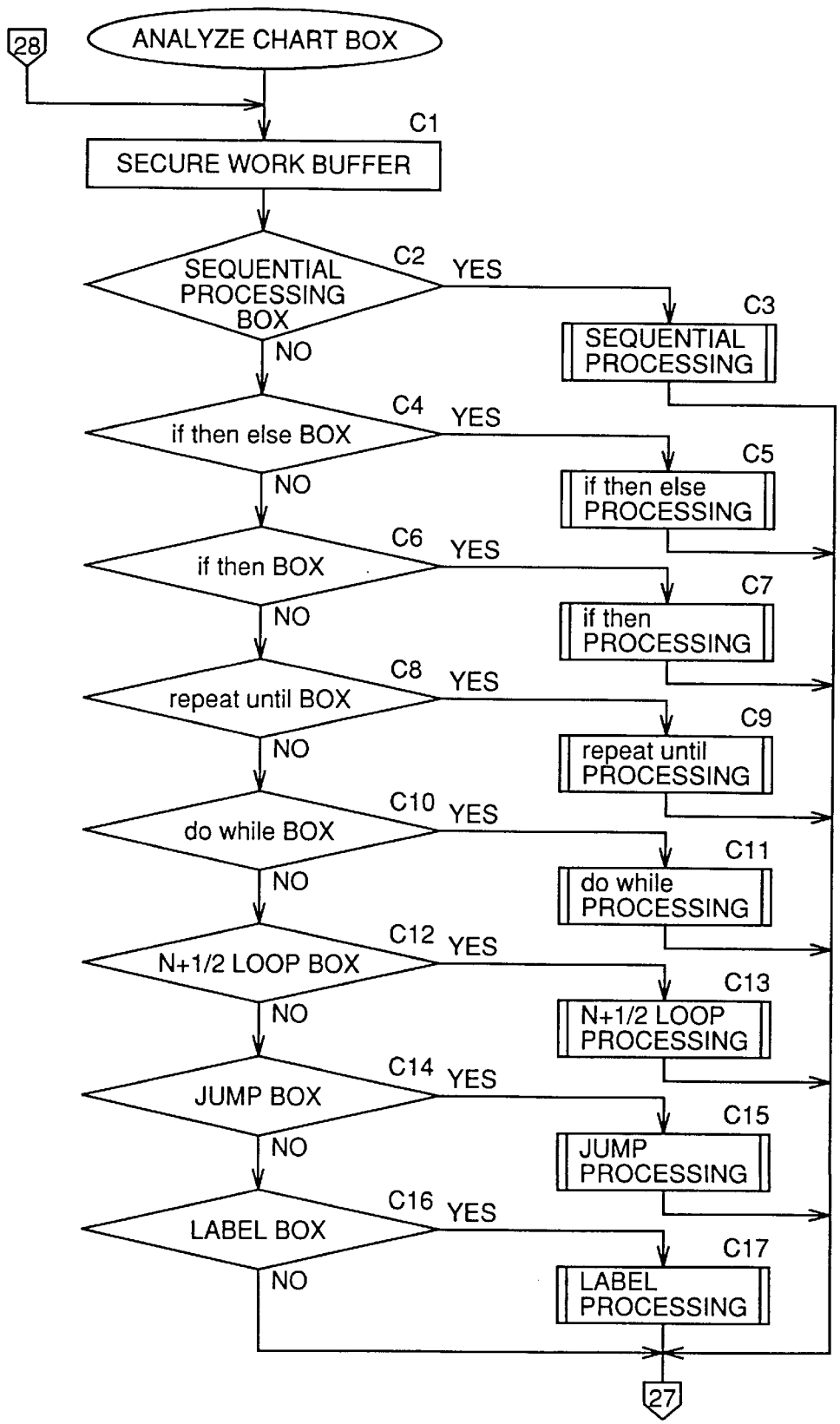
FIG. 114 is a flowchart of a subroutine of a chart box analysis in a program executed by a device of a third embodiment.
Figure 115:
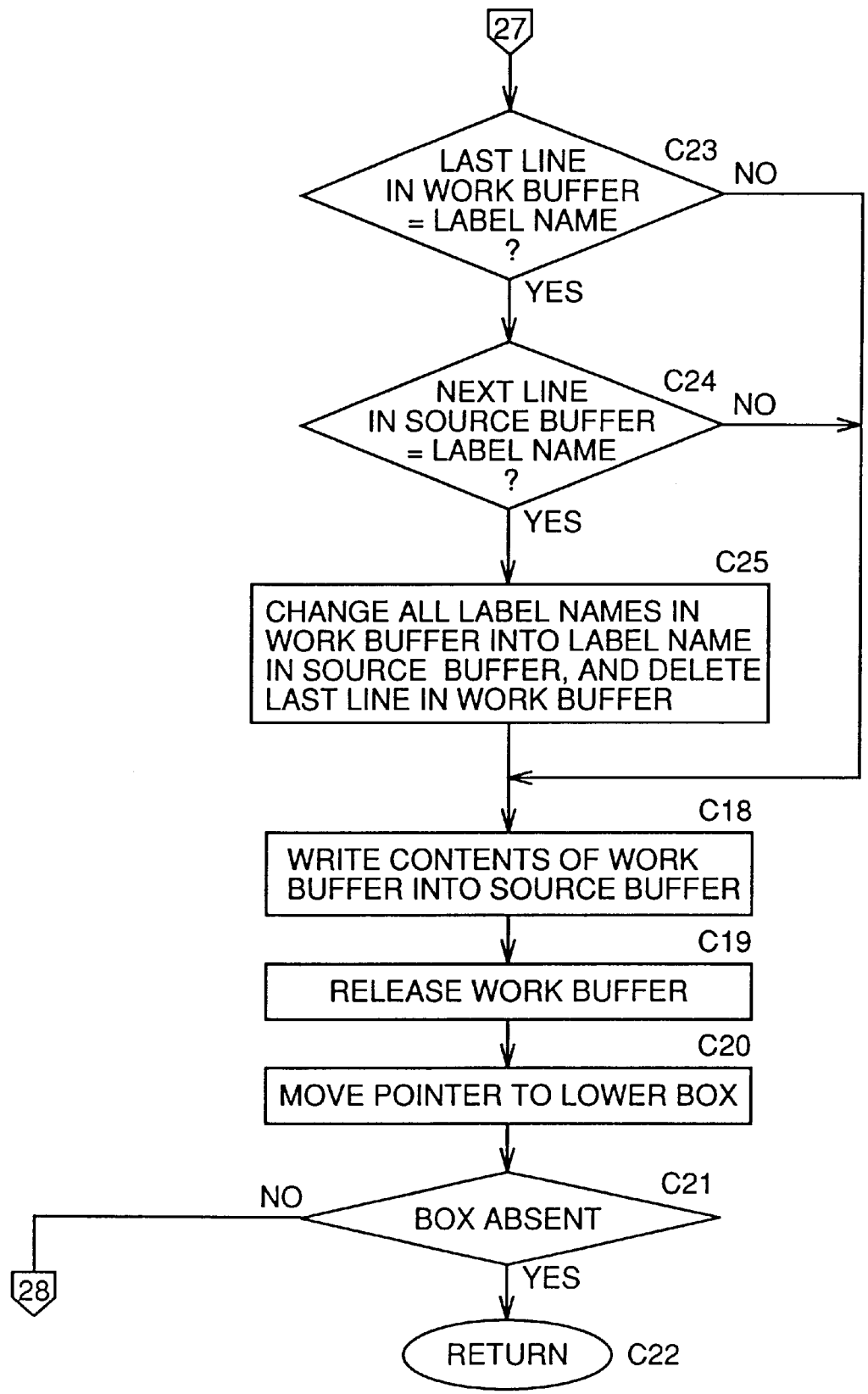
FIG. 115 is a flowchart of a subroutine of a chart box analysis in the program executed by the device of the third embodiment.

As a method of detecting such redundant labels and simplifying the labels, the chart box analysis routine may be modified as shown in FIGS. 114 and 115. The chart box analysis subroutine in FIGS. 114 and 115 is different from the chart box analysis routine of the first embodiment in FIGS. 30 and 31 in that steps C23–C25 are arranged before step C18 for deleting overlapped labels. FIGS. 114 and 115 are the same as FIGS. 30 and 31 except for the above difference, and will not be described below in detail.

Referring particularly to FIG. 115, it is determined at step C23 whether the last line in the work buffer is a label name or not. If it is not a label name, overlapping of labels cannot occur, so that the control advances to C18, and contents of the work buffer are written into the source buffer. If it is determined at C23 that the last line in work buffer is the label name, the control advances to C24.

At C24, it is determined whether the next line in source buffer is a label name or not. If the next line in source buffer is not a label name, overlapping of labels does not occur, so that the control advances to C18.

If the next line in source buffer is a label name, the control advances to C25. At C25, all the label names, which are referred to in the assembler source program in the work buffer, are changed into the same label name as that detected at C24, and the last line in work buffer is deleted. After this processing, the control advances to C18.

Owing to addition of the processing from C23 to C25, it is possible to avoid wasteful overlapping of the label names in the ultimately generated assembler source program.

In the foregoing embodiments, the method of describing the tree structure chart corresponding to the assembler language is extended with respect to the PAD chart, as described above. However, the invention can be applied to another tree structure chart. For example, the invention can be applied to a structuring flowchart, SPD chart, YACC chart and HCP chart. Further, the embodiments have been described in connection with the case where the source program for the assembler language is generated. However, the invention may be applied to non-structured languages other than the assembler language.

In the foregoing embodiments, automatic generation of the assembler source program from the tree structure chart is performed using the same procedures without depending on the CPU and assembler language. Therefore, the table determining the basic instruction reference table may be a table file separated from the automatic generation program for allowing maintenance in accordance with every change of the CPU or assembler language. Also, the source program may internally have the above table as a fixed data table dedicated to a single language or CPU.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An assembler language source program generating device for generating a source program of an arbitrary assembler language based on an extended tree structure chart, said extended tree structure chart being extended to allow source line description in a box related to branch and description of a corresponding description determination condition in each box related to the branch, comprising:

a memory for storing a table describing a description form of an instruction in a target assembler language in accordance with a format common to different assembler languages; and means for generating the source program in the assembler language being operable to generate the source program in the assembler language based on the extended tree structure chart in accordance with a predetermined conversion procedure independent of a type of the assembler language, said means for generation being operable, for generation of the source program from a certain box, to generate an instruction suitable for said target assembler language with reference to a description form of the instruction in said table based on the source line description and the description of the determination condition in said corresponding box.

2. The assembler language source program generating device according to claim 1, wherein said table describes a relationship between complementary condition determination instructions in the target assembler language, and said means for generation includes means operable, for generation of the source program from the box describing branch, to generate the branch instruction suitable for said target assembler language by determining a utilizable branch instruction with reference to the description form of the branch instruction in said table and a relationship between said complementary condition determination instructions based on the source line description and the description of the determination condition in the corresponding box.

3. The device according to claim 2, wherein each of the descriptions of the relationships between said complementary condition determination instructions includes a description specifying establishment of a condition for said condition determination instruction, a description specifying establishment of an opposite condition complementary to said condition, and a prototype of a source program line description of a branch instruction to be generated correspondingly to establishment of the condition related to said condition determination instruction.

4. The device according to claim 3, wherein said means for generating the branch instruction includes:
   first searching means responsive to detection of a condition determination instruction in a certain box for searching descriptions of relationships between said complementary condition determination instructions for a description having, as a description of establishment of a corresponding condition, a description matching with a description of the determination condition in said certain box; and
   means for generating the source program for processing at the time of establishment of the determination condition of said certain box in accordance with the prototype of the source program line description in the description looked up by said first searching means.

5. The device according to claim 4, wherein said means for generating the branch instruction further includes:
   second searching means responsive to description of the box at the time of failure of said condition determination instruction for searching descriptions of relationships between said complementary condition determination instructions for a description having, as a description of establishment of a corresponding condition, a description matching with a description specifying establishment of the opposite condition of the condition of said determination condition instruction; and
   means for generating the source program for processing at the time of failure of the determination condition of said certain box in accordance with the prototype of the source program line description in the description looked up by said second searching means.

6. The device according to claim 5, wherein said extended tree structure chart is further extended to allow:
   description of differentiation between a LONG JUMP instruction and a SHORT JUMP instruction in the box related to a jump instruction, and
   source line description in the box related to branch for allowing description in a form common to different assembler languages.

7. The device according to claim 6, wherein said table stores the LONG JUMP instruction and the SHORT JUMP instruction as separate instructions.

8. The device according to claim 7, wherein said means for generation differentiates the LONG JUMP instruction and the SHORT JUMP instruction from each other based on said extended tree structure chart.

9. The device according to claim 8, wherein said means for generation may generate a label line in the source program.

10. The device according to claim 9, further comprising:

means for detecting a plurality of label lines generated substantially successively in the source program by said means for generation; and successive label line deleting means for deleting a predetermined label line(s) in the plurality of successively generated label lines detected by said successive label line detecting means.

11. The device according to claim 10, wherein said successive label line deleting means deletes all the plurality of successively generated label lines detected by said successive label line detecting means except for predetermined one label line.

12. The device according to claim 11, wherein said predetermined one in said plurality of label lines is the last one in said plurality of label lines.

13. The device according to claim 3, wherein said means for generating the branch instruction includes:
   first searching means responsive to detection of a condition determination instruction in a certain box for searching descriptions of relationships between said complementary condition determination instructions for a description having, as a description of establishment of a corresponding condition, a description matching with a description of the determination condition in said certain box;
   second searching means responsive to description of the box at the time of failure of said condition determination instruction for searching descriptions of relationships between said complementary condition determination instructions for a description having, as a description of establishment of a corresponding condition, a description matching with a description specifying establishment of the opposite condition of the condition of said determination condition instruction; and
   means for generating the source program for processing at the time of failure of the determination condition of said certain box in accordance with a prototype of the source program line description in the description looked up by said second searching means.

14. The device according to claim 1, wherein said extended tree structure chart is further extended to allow:
   description of differentiation between a LONG JUMP instruction and a SHORT JUMP instruction in the box related to a jump instruction, and
   source line description in the box related to branch for allowing description in a form common to different assembler languages.

15. The device according to claim 14, wherein said table stores the LONG JUMP instruction and the SHORT JUMP instruction as separate instructions.

16. The device according to claim 15, wherein said means for generation differentiates the LONG JUMP instruction and the SHORT JUMP instruction from each other based on said extended tree structure chart.

17. The device according to claim 16, wherein said means for generation may generate a label line in the source program.

18. The device according to claim 17, further comprising:

means for detecting a plurality of label lines generated successively in the source program by said means for generation; and successive label line deleting means for deleting a predetermined label line in the plurality of successively generated label lines detected by said successive label line detecting means.

19. The device according to claim 18, wherein said successive label line deleting means deletes all the plurality of successively generated label lines detected by said successive label line detecting means except for predetermined one label line.

20. The device according to claim 19, wherein said predetermined one in said plurality of label lines is the last one in said plurality of label lines.

21. An assembler language source program generating device for generating a source program of an arbitrary assembler language based on a tree chart extended to allow description in a format common to different assembler languages by allowing description of differentiation between a LONG JUMP instruction and a SHORT JUMP instruction in a box related to a branch instruction and allowing source line description in the box related to branch, comprising:

a memory for storing a table describing a description form of the instruction in the target assembler language in accordance with a format common to different assembler languages, said table storing the LONG JUMP instruction and the SHORT JUMP instruction as separate instructions; and means for generating the source program in the assembler language based on the tree structure chart, without depending on a type of the assembler language, in accordance with a predetermined conversion procedure differentiating the LONG JUMP instruction and the SHORT JUMP instruction from each other, said module for generation being operable, for generation of the source program from a certain box, to generate an instruction suitable for said target assembler language with reference to a description form of the instruction in said table based on the source line description in the corresponding box and the description relating to differentiation between the LONG JUMP instruction and the SHORT JUMP instruction.

22. An assembler source program generating device for generating a source program of an arbitrary assembler language based on an extended tree structure chart extended to allow source line description in a box related to condition determination and allow each box to describe a determination condition for the box related to the condition determination, comprising:

a memory for storing a table describing a description form of an instruction in a target assembler language in accordance with a format common to different assembler languages;

means for generating the source program in the assembler language based on the tree structure chart in accordance with a predetermined conversion procedure independent of a type of the assembler language, said means for generation may generate a label line in the source program for generating the source program from a certain box;

successive label line detecting means for detecting a plurality of label lines generated substantially successively in the source program by said module for generation; and label line deleting means for deleting the plurality of successively generated label lines detected by said successive label line detecting means except for a certain one.

23. The device according to claim 22, wherein said successive label line deleting means deletes all the plurality of successively generated label lines detected by said successive label line detecting means except for predetermined one label line.

24. The device according to claim 23, wherein said predetermined one in said plurality of label lines is the last one in said plurality of label lines.

25. A machine-executable program stored in a machine-readable storage medium for generating a source program in an arbitrary assembler language based on an extended tree structure chart, said extended tree structure chart being extended to allow source line description in a box related to branch and description of a corresponding determination condition in each box related to branch, comprising:

a table describing a description form of an instruction in a target assembler language in accordance with a format common to different assembler languages; and a module for generating the source program in the assembler language, said module for generation generating the source program in the assembler language in accordance with a predetermined conversion procedure independent of a type of the assembler language based on the extended tree structure chart, and said module for generation being operable, for generation of the source program from a certain box, to generate an instruction matching with said target assembler language with reference to a description form of the instruction in said table stored based on the source line description and the description of the determination condition in the corresponding box.

26. The assembler language source program generating program according to claim 25, wherein said table describes a relationship between complementary condition determination instructions in the target assembler language, and said module for generation includes a module operable, for generation of the source program from the box describing branch, to generate the branch instruction suitable for said target assembler language by determining a utilizable branch instruction with reference to the description form of the branch instruction in said table and a relationship between said complementary condition determination instructions based on the source line description and the description of the determination condition in the corresponding box.

27. The program according to claim 26, wherein each of the descriptions of the relationships between said complementary condition determination instructions includes a description specifying establishment of a condition for said condition determination instruction, a description specifying establishment of an opposite condition complementary to said condition, and a prototype of a source program line description of a branch instruction to be generated correspondingly to establishment of the condition related to said condition determination instruction.

28. The program according to claim 27, wherein said module for generating said branch instruction includes:
- first searching module responsive to detection of a condition determination instruction in a certain box for searching descriptions of relationships between said complementary condition determination instructions for a description having, as a description of establishment of a corresponding condition, a description matching with a description of the determination condition in said certain box; and
- a module for generating the source program for processing at the time of establishment of the determination condition of said certain box in accordance with the prototype of the source program line description in the description looked up by said first searching module.

29. The program according to claim 28, wherein said module for generating said branch instruction further includes:
- a second searching module responsive to description of the box at the time of failure of said condition determination instruction for searching descriptions of relationships between said complementary condition determination instructions for a description having, as a description of establishment of a corresponding condition, a description matching with a description specifying establishment of the opposite condition of the condition of said determination condition instruction; and
- a module for generating the source program for processing at the time of failure of the determination condition of said certain box in accordance with the prototype of the source program line description in the description looked up by said second searching module.

30. The program according to claim 29, wherein said extended tree structure chart is further extended to allow:
- description of differentiation between a LONG JUMP instruction and a SHORT JUMP instruction in the box related to a jump instruction, and
- source line description in the box related to branch for allowing description in a form common to different assembler languages.

31. The program according to claim 30, wherein said table stores the LONG JUMP instruction and the SHORT JUMP instruction as separate instructions.

32. The program according to claim 31, wherein said module for generation differentiates the LONG JUMP instruction and the SHORT JUMP instruction from each other based on said extended tree structure chart.

33. The program according to claim 32, wherein said module for generation may generate a label line in the source program.

34. The program according to claim 33, further comprising:
- a module for detecting a plurality of label lines generated substantially successively in the source program by said module for generation; and
- a successive label line deleting module for deleting a predetermined label line in the plurality of successively generated label lines detected by said successive label line detecting module.

35. The device according to claim 34, wherein said successive label line deleting module deletes all the plurality of successively generated label lines detected by said successive label line detecting module except for predetermined one label line.

36. The program according to claim 35, wherein said predetermined one in said plurality of label lines is the last one in said plurality of label lines.

37. The program according to claim 27, wherein said module for generating said branch instruction includes:
- a first searching module responsive to detection of a condition determination instruction in a certain box for searching descriptions of relationships between said complementary condition determination instructions for a description having, as a description of establishment of a corresponding condition, a description matching with a description of the determination condition in said certain box;
- a second searching module responsive to description of the box at the time of failure of said condition determination instruction for searching descriptions of relationships between said complementary condition determination instructions for a description having, as a description of establishment of a corresponding condition, a description matching with a description specifying establishment of the opposite condition of the condition of said determination condition instruction; and
- a module for generating the source program for processing at the time of failure of the determination condition of said certain box in accordance with the prototype of the source program line description in the description looked up by said second searching module.

38. The program according to claim 25, wherein said extended tree structure chart is further extended to allow:
- description of differentiation between a LONG JUMP instruction and a SHORT JUMP instruction in the box related to a jump instruction, and
- source line description in the box related to branch for allowing description in a form common to different assembler languages.

39. The program according to claim 38, wherein said table stores the LONG JUMP instruction and the SHORT JUMP instruction as separate instructions.

40. The program according to claim 39, wherein said module for generation differentiates the LONG JUMP instruction and the SHORT JUMP instruction from each other based on said extended tree structure chart.

41. The program according to claim 40, wherein said extended tree structure chart allows description instructing generation of said label line, and said module for generation detects the description instructing generation of said label line and thereby generates the label line in the source program.

42. The program according to claim 41, further comprising:
- a module for detecting a plurality of label lines generated successively in the source program by said module for generation; and
- a successive label line deleting module for deleting a predetermined label line(s) in the plurality of successively generated label lines detected by said successive label line detecting module.

43. The program according to claim 42, wherein said successive label line deleting module deletes all the plurality of successively generated label lines detected by said successive label line detecting module except for predetermined one label line.

44. The device according to claim 43, wherein said predetermined one in said plurality of label lines is the last one in said plurality of label lines.

45. A machine-executable assembler language source program generating program stored in a machine-readable storage medium for generating a source program in an arbitrary assembler language based on an extended tree structure chart extended to allow description in a format common to different assembler languages by allowing description of differentiation between a LONG JUMP instruction and a SHORT JUMP instruction in a box related to a branch instruction and allowing a source line description in the box related to branch, comprising:

a table describing a description form of an instruction in a target assembler language in accordance with the format common to the different assembler languages, said table storing the LONG JUMP instruction and the SHORT JUMP instruction as separate instructions; and a module for generating the source program in the assembler language based on the tree structure chart, without depending on a type of the assembler language, in accordance with a predetermined conversion procedure differentiating the LONG JUMP instruction and the SHORT JUMP instruction from each other, said module for generation operable, for generation of the source program from a certain box, to generate an instruction matching with said target assembler language with reference to a description form of the instruction in said table based on the source line description in the corresponding box and the description relating to differentiation between the LONG JUMP instruction and the SHORT JUMP instruction.

46. A machine-executable assembler language source program generating program stored in a machine-readable storage medium for generating a source program in an arbitrary assembler language based on an extended tree structure chart extended to allow source line description in a box related to condition determination and description, in each box, of a determination condition for the box related to the condition determination, comprising:

a table describing a description form of an instruction in a target assembler language in accordance with a format common to the different assembler languages; and a module for generating the source program in the assembler language based on the tree structure chart in accordance with a predetermined conversion procedure independent of a type of the assembler language, said module for generation having a possibility of generating a label line in the source program in generating the source program from a certain box;

a successive label line detecting module for detecting a plurality of labels generated substantially successively in the source program by said module for generation; and a label line deleting module for deleting the plurality of successively generated label lines detected by said successive label line detecting module except for a specific one.

47. The program according to claim 46, wherein said successive label line deleting module deletes all the plurality of successively generated label lines detected by said successive label line detecting module except for predetermined one label line.

48. The device according to claim 47, wherein said predetermined one in said plurality of label lines is the last one in said plurality of label lines.

* * * * *